US008083523B2

(12) United States Patent
De Ley et al.

(10) Patent No.: US 8,083,523 B2
(45) Date of Patent: Dec. 27, 2011

(54) METHOD FOR DEVELOPING COGNITIVE SKILLS USING SPELLING AND WORD BUILDING ON A COMPUTING DEVICE

(75) Inventors: Logan E. De Ley, Alameda, CA (US); William M. Jenkins, Pacifica, CA (US); Virginia A. Mann, Dana Point, CA (US); Steven L. Miller, Pacifica, CA (US)

(73) Assignee: Scientific Learning Corporation, Oakland, CA (US)

( * ) Notice: Subject to any disclaimer, the term of this patent is extended or adjusted under 35 U.S.C. 154(b) by 856 days.

(21) Appl. No.: 11/349,675

(22) Filed: Feb. 8, 2006

(65) Prior Publication Data

US 2006/0194175 A1  Aug. 31, 2006

Related U.S. Application Data

(63) Continuation of application No. 10/957,886, filed on Oct. 4, 2004, now abandoned, and a continuation of application No. 11/342,938, filed on Jan. 30, 2006, now abandoned, which is a continuation of application No. 10/957,886.

(60) Provisional application No. 60/508,597, filed on Oct. 3, 2003, provisional application No. 60/569,601, filed on May 10, 2004.

(51) Int. Cl.
*G09B 5/00* (2006.01)

(52) U.S. Cl. ........................................ 434/169; 434/159

(58) Field of Classification Search .................. 434/156, 434/167, 169, 159; 273/299; 704/260
See application file for complete search history.

(56) References Cited

U.S. PATENT DOCUMENTS

| | | | |
|---|---|---|---|
| 3,939,578 A | | 2/1976 | Coffey |
| 4,035,932 A | | 7/1977 | Massey |
| 4,308,017 A | * | 12/1981 | Laughon et al. ............. 434/169 |
| 5,256,067 A | | 10/1993 | Gildea et al. |
| 5,303,042 A | | 4/1994 | Lewis et al. |
| 5,451,163 A | | 9/1995 | Black |
| 5,474,456 A | | 12/1995 | Paiken |
| 5,885,083 A | | 3/1999 | Ferrell |
| 6,019,607 A | | 2/2000 | Jenkins et al. |
| 6,022,221 A | | 2/2000 | Boon |
| 6,155,834 A | | 12/2000 | New, III |
| 6,164,974 A | | 12/2000 | Carlile et al. |
| 6,190,173 B1 | | 2/2001 | Jenkins et al. |

(Continued)

OTHER PUBLICATIONS

Puzzler's Paradise. Solution to Word Ladders, online tutorial. [online] [Retrieved on Feb. 15, 2011]. Retrieved from the Internet URL:<http://www.puzzlersparadise.com/page1021.html>.*

*Primary Examiner* — Xuan Thai
*Assistant Examiner* — Peter Egloff
(74) *Attorney, Agent, or Firm* — James W. Huffman

(57) ABSTRACT

Methodologies for improving a student's phonemic awareness, decoding, spelling, oral and written comprehension are described herein. The method is embodied in a suite of twelve exercises operable on a computing device. The exercises are geared towards training of 1st and 2nd grade students but are not limited to that. The methods present an entertaining screen environment, with target stimulus, and foil or distracter stimulus presented visually, textually, and aurally. The student is required to identify the target stimulus from the distracter stimulus within the context of each exercise. Progress from easier trials to more difficult trials is made as the student successfully completes particular difficulty levels.

52 Claims, 37 Drawing Sheets

U.S. PATENT DOCUMENTS

| | | |
|---|---|---|
| 6,199,042 B1 | 3/2001 | Kurzweil |
| 6,299,452 B1 | 10/2001 | Wasowicz et al. |
| 6,341,959 B1 | 1/2002 | Wen et al. |
| 6,364,666 B1 | 4/2002 | Jenkins et al. |
| 6,468,084 B1 | 10/2002 | MacMillan |
| 6,468,085 B1 | 10/2002 | Bergan et al. |
| 6,511,324 B1 | 1/2003 | Wasowicz |
| 6,632,096 B1 | 10/2003 | Sumimoto |
| 6,685,477 B1 | 2/2004 | Goldman et al. |
| 6,726,486 B2 * | 4/2004 | Budra et al. .............. 434/169 |
| 6,755,657 B1 | 6/2004 | Wasowicz |
| 7,052,278 B2 * | 5/2006 | Johnson et al. .............. 434/156 |
| 7,059,860 B2 | 6/2006 | Linden-Henry |
| 7,062,220 B2 | 6/2006 | Haynes et al. |
| 7,080,983 B2 * | 7/2006 | Barker .............. 434/167 |
| 7,359,859 B2 | 4/2008 | Wen et al. |
| 7,386,453 B2 | 6/2008 | Polanyi et al. |
| 2002/0076675 A1 | 6/2002 | Budra et al. |
| 2002/0090596 A1 | 7/2002 | Sosoka et al. |
| 2003/0027112 A1 | 2/2003 | Warneke et al. |
| 2003/0077559 A1 | 4/2003 | Braunberger et al. |

\* cited by examiner

Fig. 3

| Task Area | Name | Cognitive Skills | Goal |
|---|---|---|---|
| Phonemic Awareness | Bear Bags | • Memory—working memory<br>• Attention—focused attention<br>• Processing—build auditory processing skill by distinguishing speech sounds and learning to recognize their differences | Improve phonemic awareness, understanding of alphabetic principles (phonics), and decoding of one-syllable words. |
| Decoding | Flying Fish | • Memory—working memory and long-term memory<br>• Attention—sustain attentional focus while monitoring a stream of possible answers for the correct word<br>• Processing—auditory and visual processing | To improve decoding skills, identification of sight words, and auditory memory. |
| Vocabulary | Quail Mail | • Memory—hold a spoken word in working memory while forming associations between picture, spoken word, and written word and recalling semantic information to categorize the word<br>• Attention—focused attention<br>• Processing—auditory and visual processing | This exercise encourages flexibility during reading and automatic access to the various dimensions of vocabulary. |
| Spelling | Magic Rabbit | • Memory—hold a spoken word in working memory while recalling letter-sound associations from long-term memory<br>• Attention—focused attention<br>• Processing—auditory and visual processing<br>• Sequencing—use positional cues to identify a missing letter or reorder the letters of a "scrambled" word | To improve spelling and sensitivity to letter-sound correspondences. |
| Sentence Comp. | Bedtime Beasties | • Memory—hold an incomplete sentence in working memory while recalling vocabulary and punctuation rules from long-term memory<br>• Attention—sustained attention<br>• Processing—auditory and visual processing<br>• Sequencing—using word order to comprehend sentences and help identify the missing parts | To improve vocabulary skills and sentence comprehension. |
| Paragraph Comp. | Buzz Fly | • Memory—use both working memory and long term memory to integrate and comprehend passage segments, and to recall the gist and details to answer questions<br>• Attention—use divided attention to listen while reading along; sustain attention across multiple passage segments and questions<br>• Processing—coordinate the auditory and visual processing of two perceptual streams: speech and written text<br>• Sequencing—track temporal and causal event sequences in passages | To improve listening comprehension and working memory skills as measured by performance on multiple-choice questions. |

*Fig. 4*

| Task Area | Name | Cognitive Skills | Goal |
|---|---|---|---|
| Phonemic Awareness | Bear Bags: More Lunch | • Memory—working memory<br>• Attention—focused attention<br>• Processing—build auditory processing skill by distinguishing speech sounds and learning to recognize their differences | Improve phonemic awareness, understanding of alphabetic principles (phonics), and decoding of one-syllable words. |
| Decoding | Fish Frenzy | • Memory—working memory and long-term memory<br>• Attention—sustain attentional focus while monitoring a stream of possible answers for the correct word<br>• Processing—auditory and visual processing | To improve decoding skills, identification of sight words, and auditory memory. |
| Spelling | Magic Bird | • Memory—hold a word in working memory while recalling letter-sound associations from long-term memory<br>• Attention—focused attention<br>• Processing—auditory and visual processing<br>• Sequencing—use positional cues to identify missing letters | To improve spelling and sensitivity to letter-sound correspondences. |
| Sentence Comp. | Leaping Lizards | • Memory—hold an incomplete sentence in working memory while recalling vocabulary, grammar, and punctuation rules from long-term memory<br>• Attention—sustained attention<br>• Processing—visual processing<br>• Sequencing—use word order to comprehend sentences and help identify missing parts | To improve vocabulary skills and sentence comprehension. |
| Critical Reading | Ant Antics | • Memory—use working memory to compare similar phrases and sentences<br>• Attention—focused and sustained attention<br>• Processing—visual processing<br>• Sequencing—use word order and grammar to identify subtle differences in meaning among phrases and sentences | To improve sentence comprehension. |
| Paragraph Comp. | Dog Bone | • Memory—use both working memory and long-term memory to integrate and comprehend passage segments, recall gist and details to answer questions, and recognize previously heard passages as a support for rereading<br>• Attention—use divided attention to listen while reading along; sustain attention across multiple passage segments and questions<br>• Processing—coordinate the auditory and visual processing of two perceptual streams: speech and written text<br>• Sequencing—track temporal and causal event sequences in passages | To improve listening and reading comprehension and working memory skills as measured by performance on multiple-choice questions. |

…

METHOD FOR DEVELOPING COGNITIVE SKILLS USING SPELLING AND WORD BUILDING ON A COMPUTING DEVICE

CROSS REFERENCE TO RELATED APPLICATION(S)

This application is a continuation of U.S. patent application Ser. No. 10/957,886, filed Oct. 4, 2004, now abandoned entitled "METHOD FOR DEVELOPING COGNITIVE SKILLS IN READING". That application claimed priority from U.S. Provisional applications: 60/508,597 filed Oct. 3, 2003; and 60/569,601 filed May 10, 2004.

This application is also a continuation of U.S. patent application Ser. No. 11/342,938, filed Jan. 30, 2006 now abandoned entitled "METHOD FOR DEVELOPING COGNITIVE SKILLS IN READING", which is a continuation of U.S. patent application Ser. No. 10/957,886, referenced above.

FIELD OF THE INVENTION

This invention relates in general to the field of education training in reading, and more specifically to a computer software program for cognitive skills training to help students become better readers.

BACKGROUND OF THE INVENTION

The present application relates to a computer software program entitled "Fast ForWord Language to Reading" developed by Scientific Learning Corporation. Founded in 1996, Scientific Learning (Nasdaq: SCIL) combines the latest advances in brain research and proprietary technology to create products and services that develop learning and communication skills. Based on more than 30 years of neuroscience research, Scientific Learning's Fast ForWord® family of products use patented technology to target the language and reading skills widely recognized as the keys to all learning. Each product's interactive exercises integrate proprietary CD-ROM and Internet technology to create an optimal learning environment that adapts to the level of each student. Patented Web-based tracking tools provide ongoing monitoring of each student's progress. In March of 1997, after an extensive field trial with almost 500 children at 35 sites, the Company launched its first Fast ForWord® product, Fast ForWord Language software, an Internet and CD-ROM product that develops the fundamental language skills that are the building blocks for reading success. This product is described in the following U.S. Pat. No. 5,927,988 entitled "METHOD AND APPARATUS FOR TRAINING OF SENSORY AND PERCEPTUAL SYSTEMS IN LLI SUBJECTS"; U.S. Pat. No. 6,159,014 entitled "METHOD AND APPARATUS FOR TRAINING OF COGNITIVE AND MEMORY SYSTEMS IN HUMANS"; and U.S. Pat. No. 6,261,101 entitled "METHOD AND APPARATUS FOR COGNITIVE TRAINING OF HUMANS USING ADAPTIVE TIMING OF EXERCISES"; each of which is hereby incorporated by reference for all purposes. Numerous other patents have been issued to Scientific Learning Corporation for its inventions.

The Fast ForWord Language to Reading software builds upon the technology developed by Scientific Learning Corporation, and provides a highly efficient, targeted workout that isolates and develops Learning MAPs—Memory, Attention, Processing, and Sequencing—in the context of reading skills that correlate directly to school curriculum standards, including Phonemic awareness; Phonics, Decoding and Advanced Decoding; Spelling and Vocabulary, Word recognition and fluency; and Sentence and passage comprehension.

SUMMARY

The present invention provides a method for improving phonemic awareness in students. The invention is intended for execution on a computing device capable of displaying and aurally presenting words and/or phonemes. The method utilizes a number of exercises to train students, the exercises presenting information aurally and visually, and requiring the student to make selections based on the information presented. The selections are recorded, with the exercise tracking progress according to the selections.

Various embodiments of a system and method for improving spelling and sensitivity to letter-sound correspondences in a person, e.g., a child student, are provided, e.g., for improving spelling and sensitivity to letter-sound correspondences.

In one embodiment, a stimulus word set comprising a plurality of stimulus words may be provided, although in other embodiments, the stimulus words may be organized in any of various ways, i.e., multiple sets, etc. A first stimulus word from the stimulus word set may be presented to the person via a computing device. For example, the first stimulus word may be presented audibly and/or textually. A letter may be then removed from the textually presented stimulus word. For example, the letter may disappear from the word, leaving a blank space. A second stimulus word may then be audibly presented that differs from the first stimulus word by one letter corresponding to the removed letter. In other words, the first and second stimulus word may differ by one letter in the position of the removed letter. In some embodiments, at least a portion of the stimulus words includes consonant-vowel-consonant letter sequences, possibly with fourth letter being a silent e, e.g., in the beginning levels. Additionally, in some embodiments, a graphical illustration of the second stimulus word may be presented approximately when audibly presenting the second stimulus word.

In some embodiments, the audibly presenting the second stimulus word may be repeated in response to user input. In other words, the person may re-invoke the audible presentation of the second stimulus word as needed. In one embodiment, the audibly presenting the first stimulus word and the audibly presenting the second stimulus word may be performed via headphones attached to the computing device.

A plurality of letters may then be presented to the person via the computing device, where one of the letters correctly replaces the removed letter to textually spell the second stimulus word. The person may be required to select a letter from the plurality of letters to replace the removed letter to spell the second stimulus word, after which a determination may be made as to whether the person selected the letter correctly.

The method may further include indicating if the person selected the letter correctly. For example, a respective sound indicating correctness or incorrectness of the selected letter may be played, a respective graphical indication of correctness or incorrectness of the selected letter may be presented, and/or points may be awarded based on the correctness of the selected letter. Additionally, or alternatively, any incorrectly selected letter may be grayed out. In some embodiments, textually presenting the stimulus word and presenting the plurality of letters may include presenting letters on respective tiles (one the display of the computing device).

The presenting the first stimulus word, the removing, the audibly presenting the second stimulus word, the presenting the plurality of letters, the requiring, and the determining may be repeated for each stimulus word in at least a first subset of the stimulus word set, where the repeating improves spelling and sensitivity to letter-sound correspondences in the person.

In some embodiments, the presenting the first stimulus word, the removing, the audibly presenting the second stimulus word, the presenting the plurality of letters, the requiring, and the determining for each stimulus word in the stimulus word set, may compose performing a trial in a beginning level of one or more beginning levels, and the method may further include performing one or more trials in an advanced level of one or more advanced levels, where the one or more beginning levels and the one or more advanced levels are comprised in a plurality of levels.

For example, performing a trial in an advanced level may include aurally presenting a third stimulus word from the stimulus word set to the person via the computing device, then presenting letters of the third stimulus word in a scrambled order to the person via the computing device. In one embodiment, a graphical illustration of the third stimulus word may be presented approximately when audibly presenting the third stimulus word. The person may then be required to rearrange the presented letters to spell the third stimulus word, and a determination made as to whether the person spelled the third stimulus word correctly. The aurally presenting the third stimulus word, the presenting the letters, the requiring the person to rearrange the presented letters, and the determining may be repeated for each stimulus word in at least a second subset of the stimulus word set to improve spelling and sensitivity to letter-sound correspondences in the person.

In some embodiments, for each beginning level, stimulus words may be grouped to represent a reduced set of letters, where respective pluralities of letters presented to the person are from the reduced set of letters. For each advanced level, stimulus words may not be grouped to represent a reduced set of letters, and thus, the respective pluralities of letters presented to the person are not constrained to the reduced set of letters.

Note that in some embodiments, the plurality of letters may include one or more foil letters that do not correctly replace the removed letter to textually spell the second stimulus word. For the first level and the second level, the foil letters may be from a fixed list of easy to discriminate letters, whereas, for the third level and the fourth level, the foil letters may be from a fixed list of hard to discriminate letters.

For each of at least a subset of the stimulus words, the second stimulus word of a trial may serve as the first stimulus word in an immediately subsequent trial. In other words, the first stimulus word of a second trial, which may be referred to as a probe word, may be the second stimulus word of the immediately preceding trial.

The stimulus word set preferably includes a plurality of open units, each including a respective plurality of stimulus words, where a unit includes a specified set of trials. The method may include performing trials for each of the plurality of open units included in the stimulus word set. Moreover, if the person fails a unit, the unit may be repeated until the person passes the unit, or the person fails the unit a specified number of times.

In some embodiments, performing trials for each of the plurality of open units included in the stimulus word set may include setting a current level to a first level, where the first level includes the first beginning level of the one or more beginning levels, setting a current unit to a first unit of the plurality of open units at the first level, and performing the presenting the first stimulus word, the removing, the audibly presenting the second stimulus word, the presenting the plurality of letters, the requiring, and the determining for each stimulus word in the current unit at the first level.

Passing a unit may include successfully performing a specified percentage of trials in the unit, where the performing trials for each of the plurality of open units included in the stimulus word set may include: if the person fails the current unit a specified number of times, leaving the current unit open for later presentation to the person, and if there are further open units at the current level, incrementing the current unit to a next open unit in the first level and performing trials in the current unit. If the person passes the current unit and there are more open units at the first level, the current unit may be incremented to the next open unit in the first level and trials performed in the current unit. If the person passes the current unit and there are no more open units at the first level, a second level may be opened as the current level, where the second level is the first advanced level, the current unit may be set to a first open unit in the second level, and trials performed in the current unit.

In some embodiments, as the person progresses through the open units, the levels may alternate between beginning levels and advanced levels, e.g., level 1 as a first beginning level, then level 2 as a first advanced level, as described above, then level 3 as a second beginning level, and level 4 as a second advanced level. For example, in one embodiment, once the first beginning level has been performed, and the person is performing units in the second level (the first advanced level), performing trials for each of the plurality of open units included in the stimulus word set may include: if the person fails the current unit a specified number of times, leaving the current unit open for later presentation to the person, and if there are further open units at the second level, incrementing the current unit to a next open unit in the second level and performing trials in the current unit. If the person passes the current unit and there are more open units at the second level, the current unit may be incremented to the next open unit in the second level and trials performed in the current unit. If the person passes the current unit and there are no more open units at the second level, a third level may be opened as the current level, where the third level is or includes a second beginning level. The current unit may be set to a first open unit in the third level, and trials performed in the current unit. If the person fails the current unit a specified number of times, the current unit may be left open for later presentation to the person, and if there are further open units at the third level, the current unit may be incremented to a next open unit in the third level and trials performed in the current unit.

Similarly, if the person passes the current unit and there are more open units at the third level, the current unit may be incremented to the next open unit in the third level and trials performed in the current unit. If the person passes the current unit and there are no more open units at the third level, a fourth level may be opened as the current level, where the fourth level is or includes a second advanced level. The current unit may be set to a first open unit in the fourth level, and trials performed in the current unit. If the person fails the current unit a specified number of times, the current unit may be left open for later presentation to the person, and if there are further open units at the fourth level, the current unit may be incremented to a next open unit in the fourth level and trials performed in the current unit. If the person passes the current unit and there are more open units at the fourth level, the current unit may be incremented to the next open unit in the fourth level and trials performed in the current unit.

Once all the levels have been processed, the person may be allowed to perform trials in remaining open units, e.g., those units that the person failed, and were left open for later presentation to the user. For example, If there are no more open units at the fourth level, and if there are further open units, for each unit in the further open units, the current unit may be set to a next unit of the further open units, and a trial performed for each stimulus word set in the current unit according to the level for the current unit. If the person fails the current unit a specified number of times, the current unit may be kept open for later presentation to the person. Thus, the person may continue performing trials from the further open units until all units have been passed.

Note that in preferred embodiments, performing trials for each of the plurality of open units included in the stimulus word set may be performed over multiple sessions, where each successive session begins approximately where a previous session ends. The sessions may occur a specified number of times each day, for a specified number of days.

In one embodiment, the method may also include providing initial training. For example, the presenting the first stimulus word, the removing, the audibly presenting the second stimulus word, and the automatically replacing the removed letter to spell the second stimulus word, may be demonstrated to the person to clearly indicate what is expected of the person in a trial.

In preferred embodiments, the method elements of the beginning levels, i.e., the presenting the first stimulus word, the removing, the audibly presenting the second stimulus word, the presenting the plurality of letters, the requiring, and the determining, may be performed via a graphical user interface (GUI) displayed on a display of the computing device, as may the method elements of the advanced levels. For example, in one embodiment, the GUI may display two or more of: a student indicator, a time indicator, an initiation button, whereby the person may invoke presenting stimulus words, and a score indicator, possibly among other GUI elements. The GUI may further display a main character, where the main character performs the presenting of the first stimulus word and the presenting of the second stimulus word. For example, the main character may be animated, e.g., may be an animated cartoon character, e.g., a magician rabbit. The main character may perform the presenting the first stimulus word and/or the presenting the second stimulus word aurally, textually, and/or graphically.

Requiring the person to select a letter from the plurality of letters to replace the removed letter to spell the second stimulus word may include requiring the person to perform one or more of: selecting the letter with a pointing device, selecting a button indicating the letter in the GUI with the pointing device, and pressing a key on a keyboard coupled to the computing device corresponding to the letter.

Thus, various embodiments of the systems and methods described herein may facilitate improvement spelling and sensitivity to letter-sound correspondences in a person, e.g., a child student.

Other features and advantages of the present invention will become apparent upon study of the remaining portions of the specification and drawings.

BRIEF DESCRIPTION OF THE DRAWINGS

FIG. 3 is a table illustrating the exercises within the program set Reading 1 according to the present invention.

FIG. 4 is a table illustrating the exercises within the program set Reading 2 according to the present invention.

DETAILED DESCRIPTION

The Language to Reading programs that will be described below are intended to be executed on some form of computing device that has a visual display, acoustic presentation, and some mechanism to indicate selection of options. While such a computing device encompasses everything from PC's, to laptops, to PDA's, and now even cell phones, one skilled in the art will appreciate that the methods of the present invention should not be restricted to the particular mechanisms upon which they are run. But, to provide a context for discussing the methods of the present invention, applicant will briefly describe one of the possible environments in which the methods can be utilized.

Figure 1:
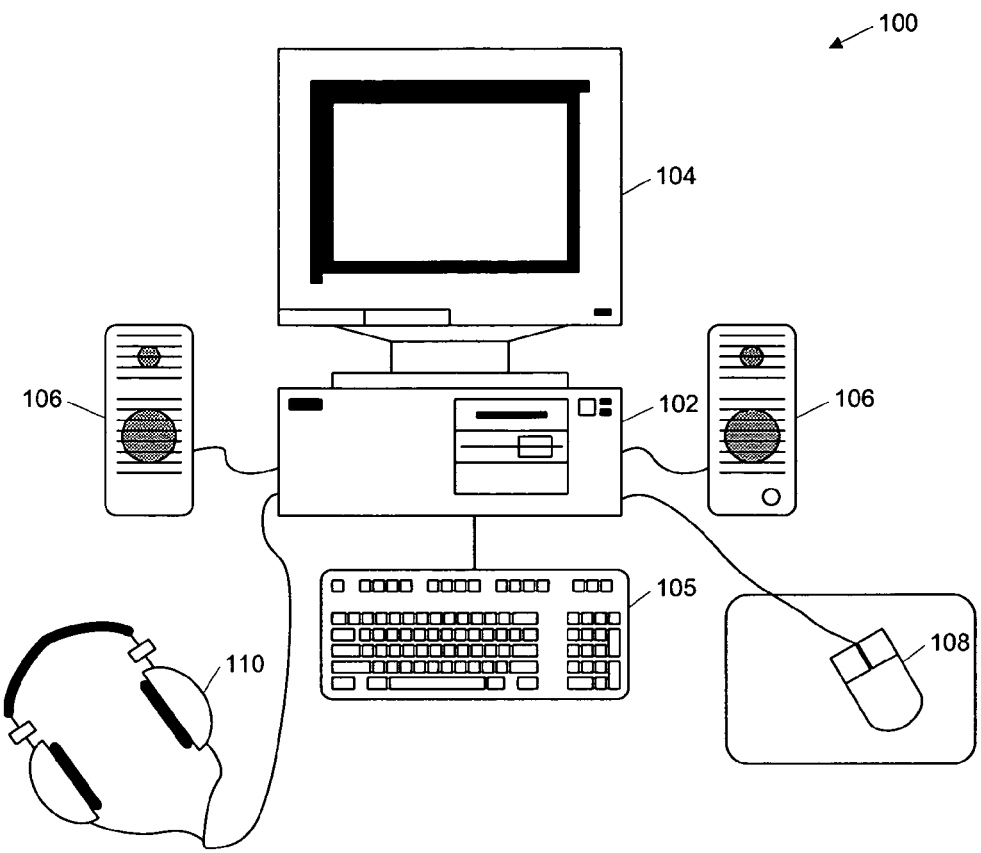
FIG. 1 is block diagram of a personal computing device upon which the present invention operates.

Referring to FIG. 1, a computer system 100 is shown for executing a computer program to train, or retrain a student, according to the present invention. The computer system 100 contains a computer 102, having a CPU, memory, hard disk and CD ROM drive (not shown), attached to a monitor 104. The monitor 104 provides visual prompting and feedback to the student during execution of the computer program. Attached to the computer 102 are a keyboard 105, speakers 106, a mouse 108, and headphones 110. The speakers 106 and the headphones 110 provide auditory prompting and feedback to the student during execution of the computer program. The mouse 108 allows the student to navigate through the computer program, and to select particular responses after visual or auditory prompting by the computer program. The keyboard 105 allows an instructor to enter alpha numeric information about the student into the computer 102. Although a number of different computer platforms are applicable to the present invention, embodiments of the present invention execute on either IBM compatible computers or Macintosh computers.

Figure 2:
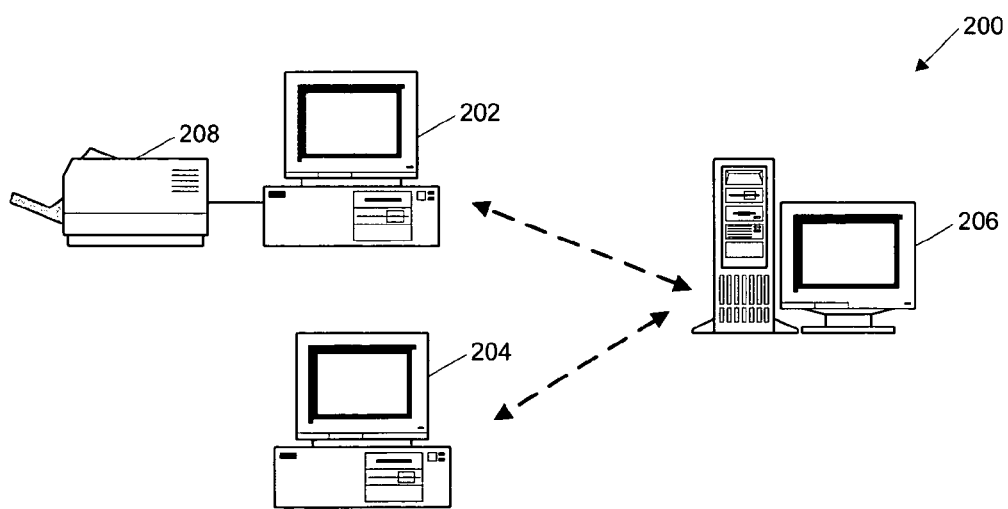
FIG. 2 is a block diagram of a computer network upon which the present invention operates.

Now referring to FIG. 2, a computer network 200 is shown. The computer network 200 contains computers 202, 204, similar to that described above with reference to FIG. 1, connected to a server 206. The connection between the computers 202, 204 and the server 206 can be made via a local area network (LAN), a wide area network (WAN), or via modem connections, directly or through the Internet. A printer 208 is shown connected to the computer 202 to illustrate that a student can print out reports associated with the computer program of the present invention. The computer network 200 allows information such as test scores, exercise statistics, and other student information to flow from a student's computer 202, 204 to a server 206. An administrator can then review the information and can then download configuration and control information pertaining to a particular student, back to the student's computer 202, 204.

The Fast ForWord Reading programs have been separated into two program sets entitled Reading 1 (adapted to 1 st grade reading curriculum), and Reading 2 (adapted to 2nd grade reading curriculum). Within each program set, a number of program exercises have been created, each of which are directed at training particular cognitive skills. FIG. 3 provides an overview of the exercises within program set Reading 1. FIG. 4 provides an overview of the exercises within program set Reading 2. A close examination of these Figures reveals that some of the exercises parallel each other in each of the program sets. That is, Bear Bags in Reading 1 has a parallel exercise Bear Bags: More Lunch in Reading 2. Flying Fish in Reading 1 has a parallel exercise Fish Frenzy in Reading 2. Magic Rabbit in Reading 1 has a parallel exercise Magic Bird in Reading 2. Bedtime Beasties in Reading 1 has a parallel exercise Leaping Lizards in Reading 2. Buzz Fly in Reading 1 has a parallel exercise Dog Bone in Reading 2. The exercise Quail Mail is specific to Reading 1. And, the exercise Ant Antics is specific to Reading 2.

The exercises in both of the exercise sets will now be described in detail. The description will provide a general overview of a exercise, including its goals, its features, and a brief description of the exercise. The description will then outline the tasks of the exercise, and will describe the student's interaction in the exercise. The stimulus sets used to train the student will then be provided. After the description, the reader will be referred to the drawings where s/he will be walked through the exercise play, as if s/he were at the computer, particularly illustrating the novel features of the exercise. Finally, a flow chart illustrating the method of the exercise will be provided. The description of the exercises will begin with the first exercise of program set Reading 1, and will continue until all of the exercises of Reading 1 have been described. The description will then continue with the first exercise of program set Reading 2, and will continue until all of the exercises of Reading 2 have been described.

Figure 5:
FIG. 5 is a screen shot at the beginning of Reading 1 according to the present invention.

Referring to FIG. 5, a screen capture is shown of a startup screen 500 for the Reading 1 program set. The Reading 1 program set includes six exercises 502 including: Bear Bags; Flying Fish; Quail Mail; Magic Rabbit; Bedtime Beasties; and Buzz Fly. The startup screen 500 contains a cursor, or selection tool 504, pictures of each of the exercises 502, and an exit button 506. Although not shown, when the screen 500 is presented, entertaining music is played through the speakers. The student begins one of the exercises by moving the selector 504 on top of the exercise grapheme 502, and indicating the selection (e.g., by clicking the mouse). In one embodiment, after a session for one of the exercises is completed, the student is automatically taken to the next exercise in the set, as appropriate. In an alternative embodiment, the student is taken back to the screen 500 for selection of another exercise. In this embodiment, any exercises already played during the present session are grayed out so that they may not be reselected.

Figure 6:
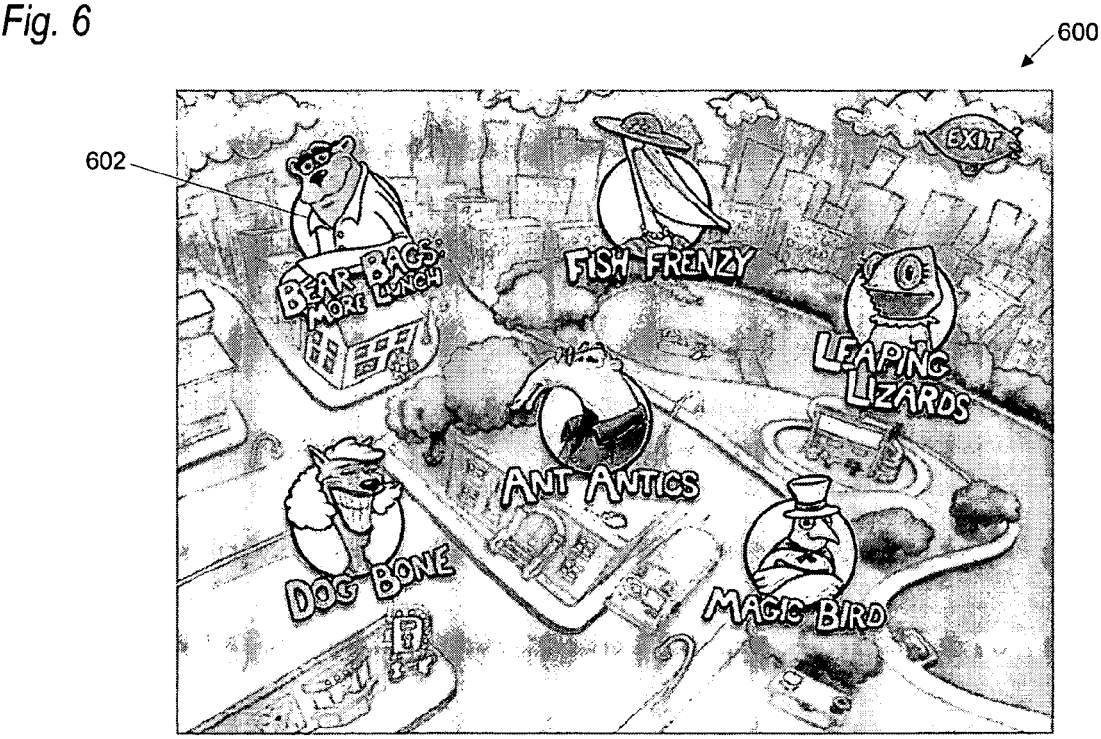
FIG. 6 is a screen shot at the beginning of Reading 2 according to the present invention.

Referring to FIG. 6, a screen capture is shown of a startup screen 600 for the Reading 2 program set. The reading 2 program set includes six exercises 602 including: Bear Bags: More Lunch; Fish Frenzy; Magic Bird; Leaping Lizards; Ant Antics; and Dog Bone. As in FIG. 5, the startup screen 600 contains a cursor, pictures of each of the exercises 602, and an exit button. Selection of the exercises 602 from the screen 600 is similar to that described above with respect to FIG. 5. A description of each of the exercises will now be provided, beginning with Bear Bags in program set Reading 1.

Program Set—Reading 1
Exercise—1: Bear Bags

The goal of this exercise is to improve phonemic awareness, understanding of alphabetic principles (phonics), and decoding of one-syllable words. In this exercise, the student is asked to help Mama Bear sort words (on pieces of toast) into phoneme-based categories (in lunch bags). The exercise develops phonemic awareness along with grapheme/phoneme associations. The exercise starts with initial consonants, and progresses to final consonants, short vowels, and long vowels. Initially, sounds that are easy to discriminate will be contrasted; later the contrasts will involve confusable sounds. The same sorting categories will be presented in two stages; initially sorting stimuli are presented aurally with pictures, later they are presented aurally with text. Because they may be presented as text, the stimulus words have transparent spellings whenever possible. In the sorting exercise the student will sort words into 1, 2, or 4 bins (lunch bags). The words will be sorted on the basis of the phoneme in the position currently targeted. The target phoneme could be the initial or final consonant, or the medial vowel.

The very first time the student works on this exercise, only 1 sorting bin is available for a "familiarization round" of 4 trials only. Otherwise, the student will be presented with either two bins representing two categories, and items presented in blocks of eight, or four bins representing all four categories from a group, with blocks of 20 items. In "Stage 1" a stimulus item is presented—first aurally and then visually with a picture. The student should recognize the phoneme in the target position, and click on the relevant bin to sort the word. The student should master a block of trials (representing a given set of phonemes in a given position) in Stage 1 before advancing to Stage 2. In Stage 1, the student is first presented with 2 bins (block of 8 items) before moving onto 4 bins with items in blocks of 20. In "Stage 2" a stimulus item is presented—first aurally and then visually with the written word. Items are presented in blocks of 20 with 4 bins only. A fluency round is also provided which will give the student an opportunity to develop speed at recognizing and identifying phonemes and mapping graphemes to phonemes. A countdown timer and other visual cues will indicate to the student that this is a fluency round. There are two levels of difficulty in the sound contrasts across bins (i.e., the foil set). An easier level contrasts nonconfusable sounds, whereas a harder level contrasts confusable sounds.

When beginning a new unit, the student is required to click an "OR" button. The categories used in the current unit will be presented in the sorting bins on the screen. In Stage 1, the stimulus is represented as a picture, with an aural presentation just before the word to be sorted pops out of a toaster. The student responds by clicking on a category bin (lunch bag) to sort the word. Sorting bins are labeled with a picture of a sample item, and its written name. The letter(s) corresponding to the target sound are highlighted (in red) in the name of the sample item. The student can also click on a speaker associated with the category to hear the example. Whenever a new category bin or set of bins is displayed, the category's description is aurally presented, with an accompanying highlight on the lunch bag before the first trial begins. For example: For the category initial-/t/, the word to sort is "toy." The word "toy" is aurally presented, then a picture of a toy pops out of the toaster. To complete the trial correctly, the student selects the initial-/t/bin, which is labeled with the written word "tub," and a picture of a bathtub.

In Stage 2, when a student masters a block of categories at Stage 1, they are presented with the same categories at Stage 2. The student is again required to click the OR button. As before, the stimulus is first aurally presented, but now the visual stimulus that drops down is a written word—rather than a picture (for example, [toy]) and the student responds by clicking on the correct category to sort the word. The written stimulus words also have the target phoneme highlighted (in this example, "t" in "toy" is highlighted). The sorting bins at Stage 2 have only the corresponding picture for that category (e.g., pictures of a pig, tub, rat, or cub). This is to prevent a simple visual matching of letter to letter. Instead, the student is encouraged to read the stimulus word, think about the names of the items on the bins, and compare them phonemically. When this set of sounds is mastered, the student can move onto a new set of sounds. The student can also click on a speaker associated with the category to hear the example. Whenever a new category bin or set of bins is displayed (e.g. at the beginning of a new unit), the category's description is aurally presented, with an accompanying highlight on the bin before the first trial begins.

The Fluency Round occurs after mastery of a block in stage 2. The Fluency round has the same characteristics and functionality as a regular round of trials in Stage 2, with the exception that only the shorter versions of correct standard animations play. A timer on the interface indicates the amount of time for the fluency round. The student is given 60 seconds to complete the fluency round.

Stimuli:

There are three types of sound targets and a total of 33 phonemic categories in this exercise. The categories are listed here with the item that will be used to label the sorting bin for that category:

| Initial Consonant | Final Consonant | Vowel |
| --- | --- | --- |
| B-BED | B-TUB | Short |
| C-CUP | D-BED | a-HAT |

-continued

| | | |
|---|---|---|
| D-DOG | G-PIG | e-BED |
| F-FIVE | M-RAM | i-PIG |
| G-GOOSE | N-SUN | o-DOG |
| H-HAT | P-CUP | u-CUP |
| J-JUG | T-HAT | Long |
| K-KITE | | A-CAKE |
| L-LOG | | I-KITE |
| M-MOP | | O-BONE |
| N-NUT | | E-FEET |
| P-PIG | | U-TUBE |
| R-RAM | | |
| S-SUN | | |
| T-TUB | | |
| W-WIG | | |

| STIMULUS/BIN PRESENTATION | STAGE 1 | STAGE 2 | FLUENCY ROUND |
|---|---|---|---|
| STIMULUS BINS | Aural/Picture Picture/Word | Aural/Word Picture | Aural/Word Picture |

Stimulus words are selected based on several criteria. Each category should have approximately 10 words. And, approximately five words for each category should be picturable. Whenever possible, the vocabulary should be at $2^{nd}$ grade level or lower. All words can be presented as text (either during Stage 2, or in Stage 1 when receiving corrective feedback). Therefore all stimuli should be transparently spelled CVCs whenever possible. When there are no other words available, some non-transparent segments, can be included (in fact a few words include consonant clusters and digraphs, e.g., teeth, goat, clam). However, the target segment should be transparent, in accordance with the following rules: Each target segment that is a consonant or soft vowel is spelled with a single letter that is the regular spelling for that sound. When the target segment is a long /A/, /I/, or /O/ it should be spelled with silent-e, long /U/ can be spelled with either silent-e or [oo], and long /E/ should be spelled with [ee].

Figure 7:
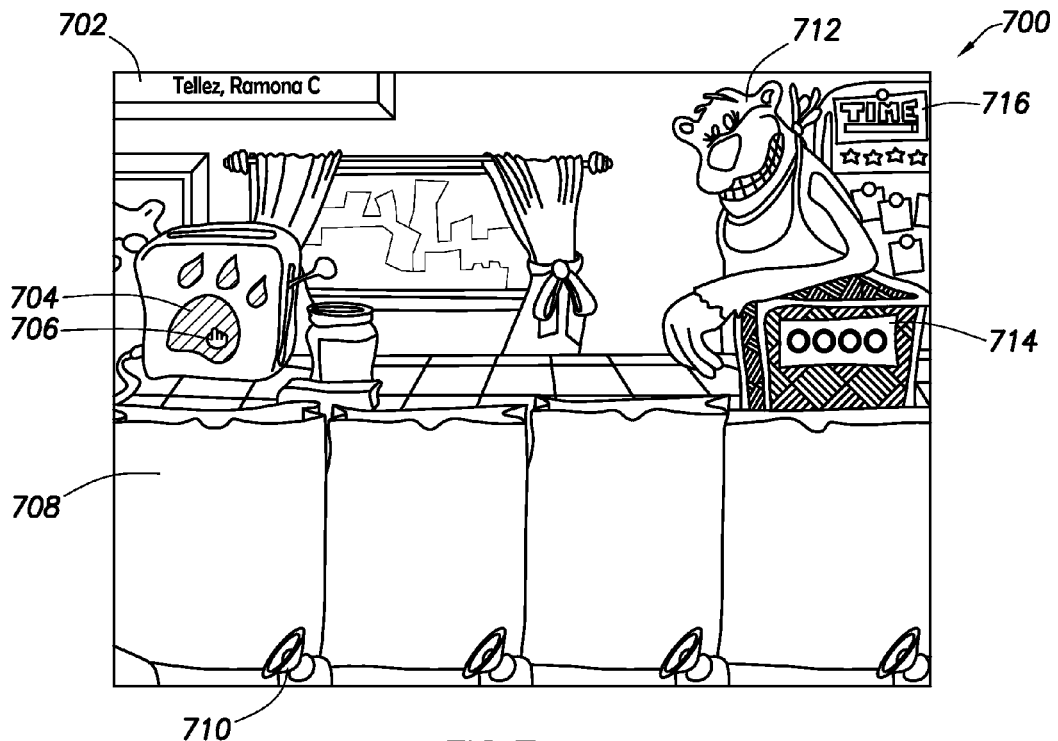
FIG. 7 is a screen shot at the initiation of the exercise Bear Bags in Reading 1 according to the present invention.

Referring now to FIG. 7, a screen 700 is shown. The screen 700 is the beginning screen for the exercise Bear Bags in Reading 1. The screen includes the name of the student 702, a selection paw 704, and a cursor 706. To begin a trial, the student moves the cursor 706 over the selection paw 704 and indicates the selection, e.g., by clicking the mouse. The screen 700 further includes a number of lunch bags 708, a number of speakers 710, mama bear 712, a score indicator 714, and a time indicator 716. The lunch bags 708 are sorting bins into which the student will sort target phonemes, as will be shown below. The speakers 710 allow a student to auditorily replay phonemes that are on the corresponding lunch bags 708. The score indicator 714 adds points to the students score as the student correctly responds to trials. The time indicator 716 provides a graphical illustration of the relative time left for the exercise. Exercise play begins when the student selects the selection paw 704.

Figure 8:
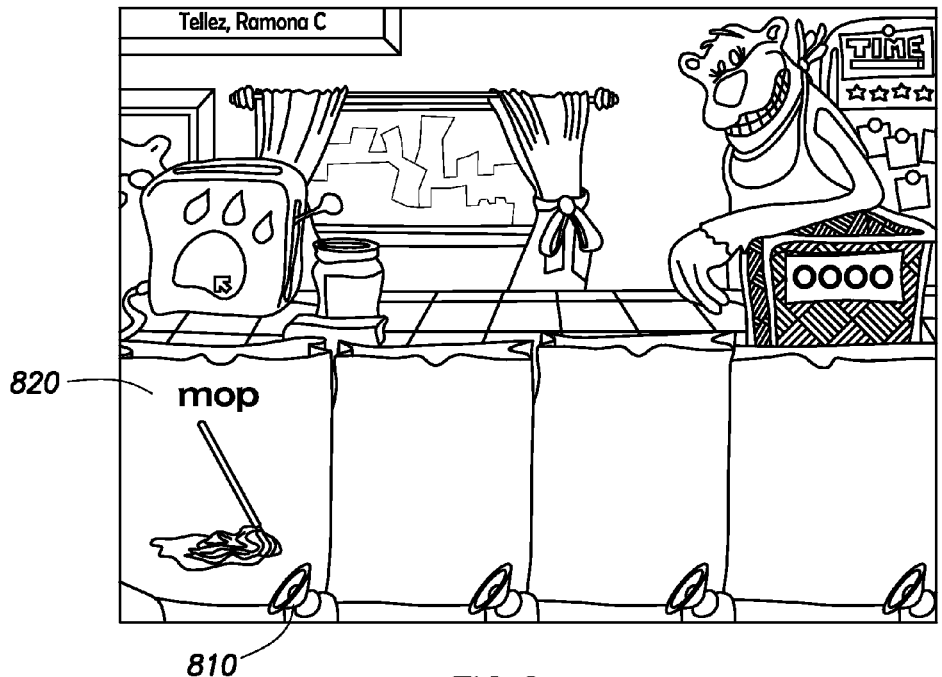
FIG. 8 is a screen shot during a warm up (or training) exercise in the exercise Bear Bags in Reading 1 according to the present invention.

Referring now to FIG. 8, a screen 800 is shown. All of the elements described above with respect to FIG. 7 are present in FIG. 8. The screen 800 appears after the student selects the selection paw as in FIG. 7. When s/he does, a first target 820 is presented. In this instance, the target is the word "mop", which is shown with the letter "m" highlighted, indicating that the consonant that the student will be required to sort is the beginning consonant "m". A picture of the word "mop" is also included to help the student correctly interpret the word. At the time the picture 820 is presented, the word "mop" is played through the speakers of the computer so that the student associates the graphical representation (i.e., the grapheme), with the acoustic presentation. And, as mentioned above, if the student wishes to be reminded of what the grapheme represents, s/he may select the speaker 810 below the grapheme, and the computer will replay the auditory prompt.

Figure 9:
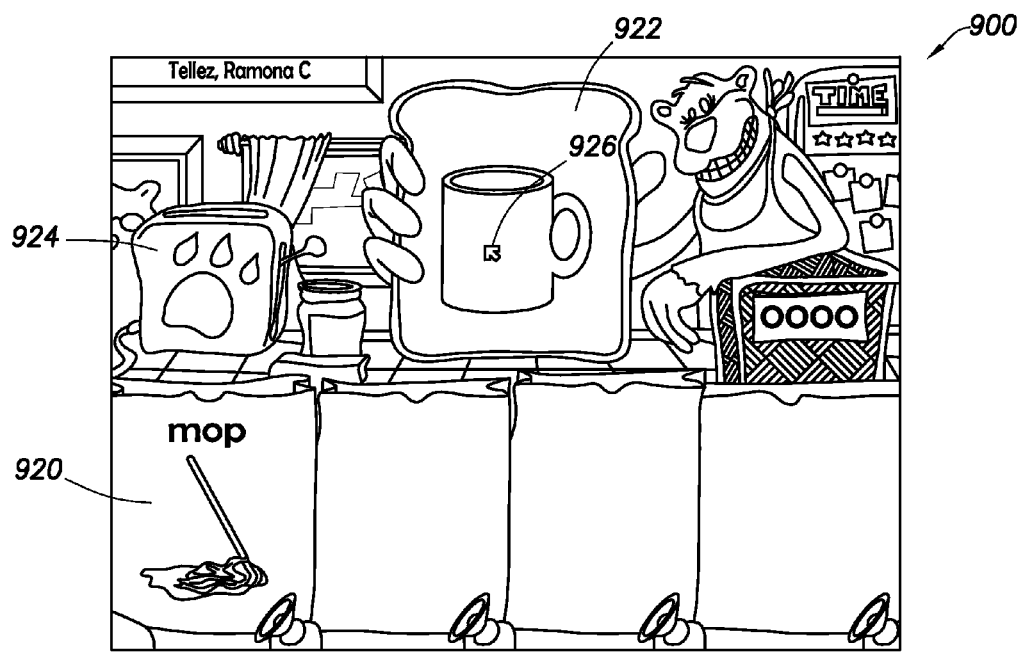
FIG. 9 is another screen shot during the warm up exercise in the exercise Bear Bags in Reading 1 according to the present invention.

The first time the student plays Bear Bags, a training stage is initiated which only shows the student a single target phoneme 820. Then, referring to FIG. 9, a slice of toast 922 is ejected from a toaster 924. The toast contains a grapheme 926—in this instance a "mug", and the word associated with the grapheme is presented auditorily to the student. What is intended is that the student associate that the beginning consonant of the target phoneme "mop", which is the letter "m", is the same as the beginning consonant of the trial phoneme "mug". The student is then required to select the lunch bag 920 that corresponds to the trial phoneme 926. If the student selects the lunch bag 920 that is associated with the trial phoneme 926, then the student has correctly responded to the trial. Another trial is then begun by selection of the selection paw, as before.

Figure 10:
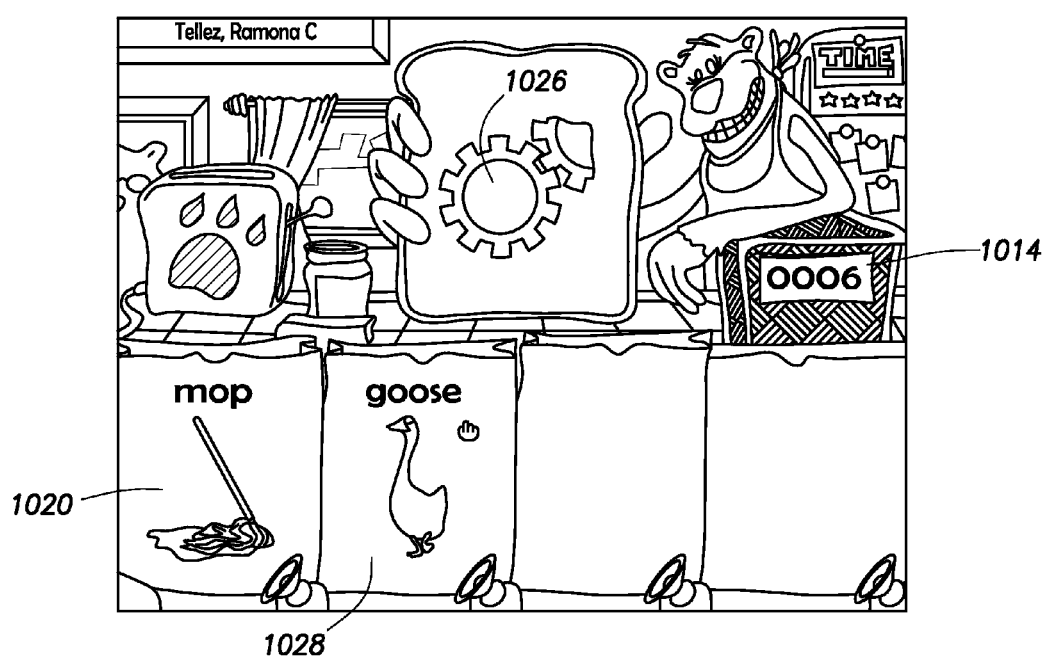
FIG. 10 is a screen shot of exercise play in Bear Bags, where the student sorts a stimulus phoneme (a picture of a "gear") into one of two target phoneme lunch bags.

Referring now to FIG. 10, a screen shot 1000 is shown. In this instance, the student is still in the training mode. But, two target phonemes are presented: "mop" 1020 (which begins with the letter "m"); and "goose" 1028 (which begins with the letter "g"). After presentation (graphical and aural) of each of the target phonemes 1020, 1028, a trial phoneme 1026 is presented. In this instance, the trial phoneme is the word "gear", which begins with the letter "g". The student is required to select the target phoneme 1020, 1028 which begins with the same first letter as the trial phoneme 1026. In this instance, both "gear" and "goose" begin with the letter "g". Thus, a correct response occurs when the student selects the target phoneme "goose" 1028. When the student correctly responds to a trial, a "ding" is played, thereby indicating to the student a correct response. In addition, the correct lunch bag 1028 is highlighted, and points are added to the score indicator 1014. If scheduled, reward animations will occur (further described below). If the student incorrectly responds (e.g., if in this instance, the student had selected the lunch bag 1020), a "thunk" is played to indicate an incorrect response, the incorrect lunch bag(s) are grayed out, and the correct lunch bag 1028 is highlighted and repeated aurally. Further, the stimulus (or trial) phoneme 1026 is highlighted and aurally repeated. This reemphasizes to the student not only that they incorrectly responded, but what the correct response should have been.

Once the initial training has been completed, the student should understand that what they are to do is to pair stimulus words with target words, based on similarities between the words. Initially, the similarity is the beginning consonant. But, as training progresses, the similarity includes medial vowels, and ending consonants. And, as training progresses, the differences between the target phonemes become less, thereby making the trials more difficult.

Figure 11:
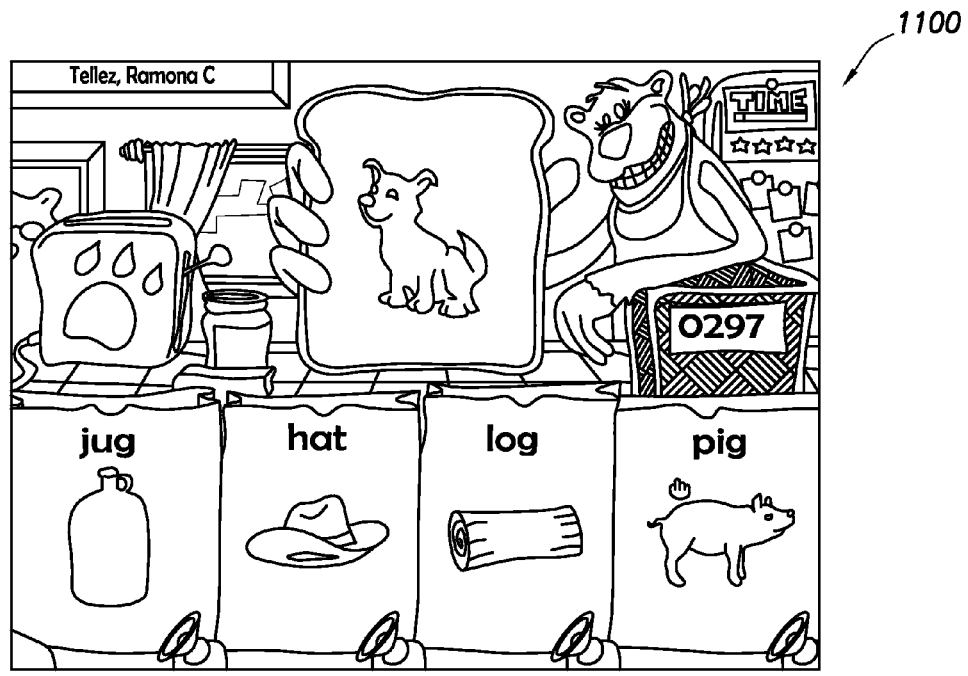
FIG. 11 is a screen shot of exercise play in Bear Bags, where the student sorts a stimulus phoneme (a picture of a "pup") into one of four target phoneme lunch bags.

Referring now to FIG. 11, a screen 1100 is shown. The screen 1100 is at stage 1 in the program, and shows four target phonemes: jug; hat; log; and pig. The student is required to match the stimulus phoneme "pup" with one of the four target phonemes. As above, the student indicates a correct selection by selecting the target phoneme "pig" because it begins with the same starting consonant as "pup", i.e., "p". In this instance, and for the rest of exercise play in Bear Bags, the number of target phonemes is four.

Figure 12:
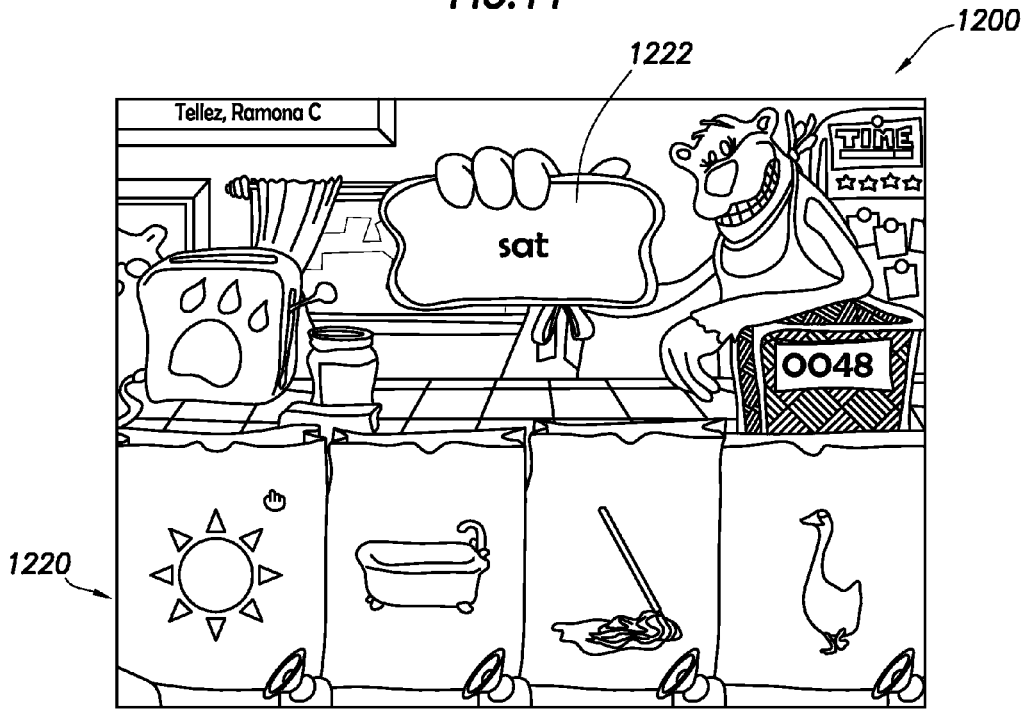
FIG. 12 is a screen shot of exercise play in Bear Bags, where the student sorts a stimulus phoneme (the word "sat") into one of four target phoneme lunch bags, pictorially represented.

Referring now to FIG. 12, a screen 1200 is shown. In this trial, what should be appreciated is that the graphemes 1220 for the target phonemes do not include the words (e.g., sun, tub, mop, goose), but merely pictorial representations of the words. Further, the stimulus phoneme 1222 does not include a graphical illustration of the word (e.g., sat), but simply the word. What the reader is encouraged to appreciate, at this point, is that during exercise play, the exercise will use either the word, or the graphical illustration of the word, or a combination thereof, for either or both of the target phonemes and stimulus phonemes.

Figure 13:
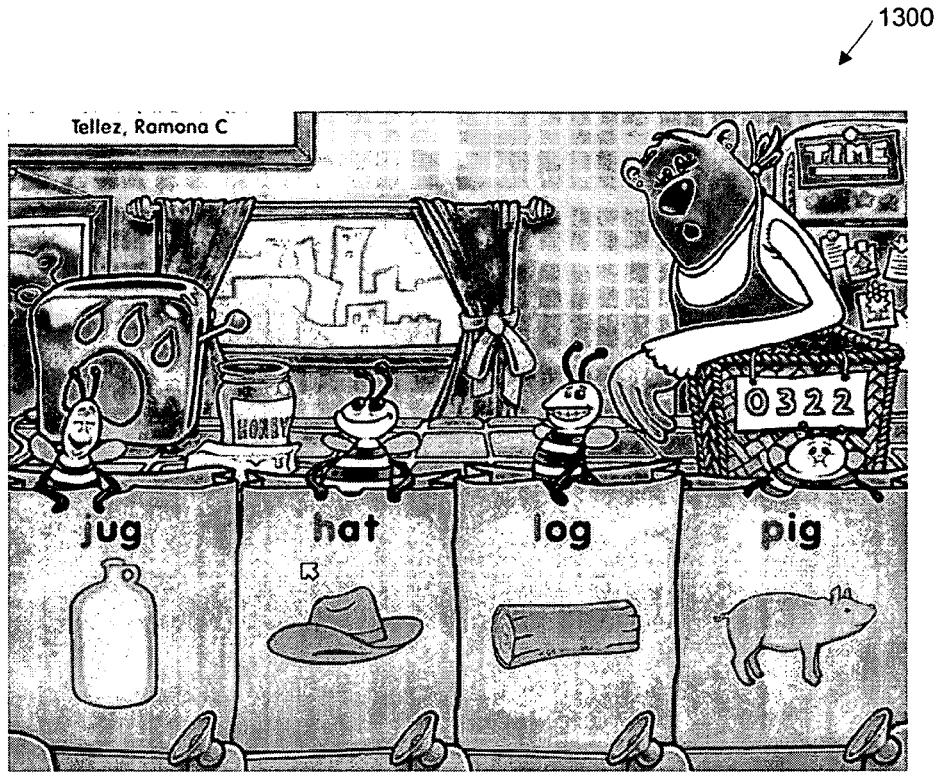
FIG. 13 is a screen shot of a reward animation within the Bear Bags exercise.

Referring now to FIG. 13, a screen 1300 is shown. In this screen 1300, a number of honey bees are peeking out of the lunch bags, and dancing to music. Screens such as this one are considered reward animations and are provided at various times in the program to entertain and amuse the student.

Figure 14:
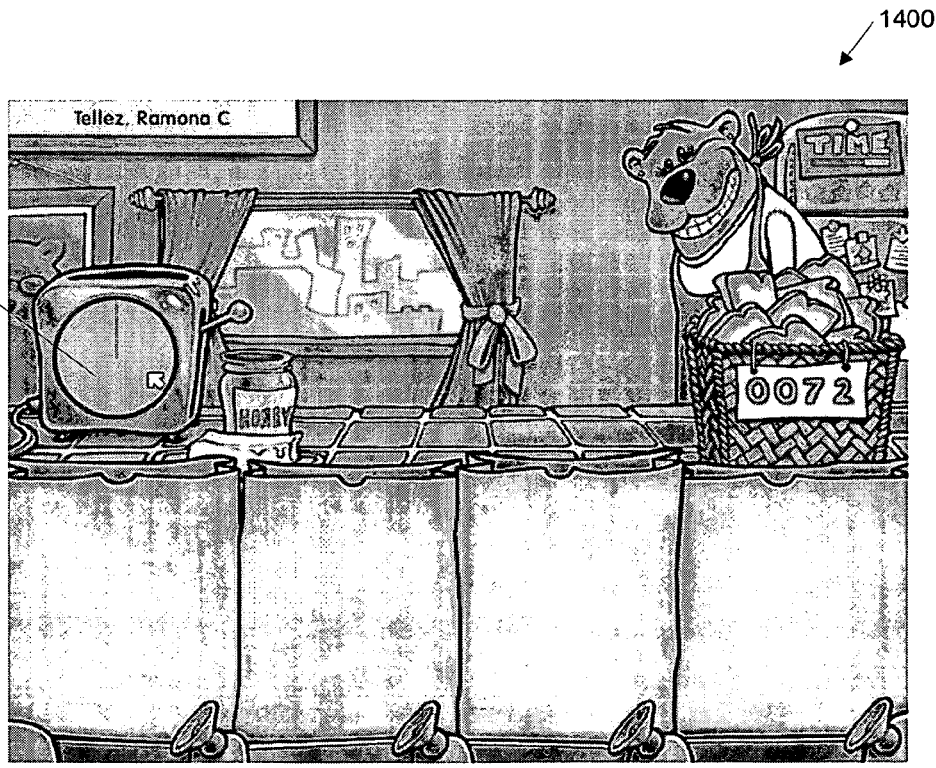
FIG. 14 is a screen shot of a fluency timed trial within the Bear Bags exercise.

Referring now to FIG. 14, a screen 1400 is shown. Screen 1400 is similar to the other screens described above. However, rather than a paw select, there is a timer 1430. In this trial, termed a "fluency" trial, the student is encouraged to sort the stimulus phonemes into their appropriate target lunch bags as fast as they can, as the timer 1430 advances. In one embodiment, the timer 1430 counts down from 60 seconds to 0 seconds. An advantage of the fluency trial is that it encourages the student to make decisions faster than in the regular trials of Stage 1 and Stage 2.

With the above understanding of the screens and aural presentation of the exercise Bear Bags, the following will discuss the progression thru the exercise using various stimulus sets. In one embodiment, the stimulus sets are divided into 16 sets, 8 considered "easy" and 8 considered "hard". More specifically, the 16 stimulus sets are:

| | Set # (Easy sound contrasts) Initial Consonants | | | |
|---|---|---|---|---|
| 1 | t | m | s | g |
| 2 | d | c | r | f |
| 3 | p | l | h | j |
| 4 | b | k | n | w |
| | Final Consonants | | | |
| 5 | g | m | b | t |
| 6 | d | n | p | g |
| | Vowels | | | |
| 7 | a | e | i | o |
| 8 | u | e | i | o |
| | Set # (Hard sound contrasts) Initial Consonants | | | |
| 9 | b | p | d | t |
| 10 | h | g | k | j |
| 11 | f | c | s | w |
| 12 | m | n | l | r |
| | Final Consonants | | | |
| 13 | d | b | p | t |
| 14 | m | n | g | b |
| | Vowels | | | |
| 15 | a | e | i | o |
| 16 | a | i | o | u |

Figure 15:
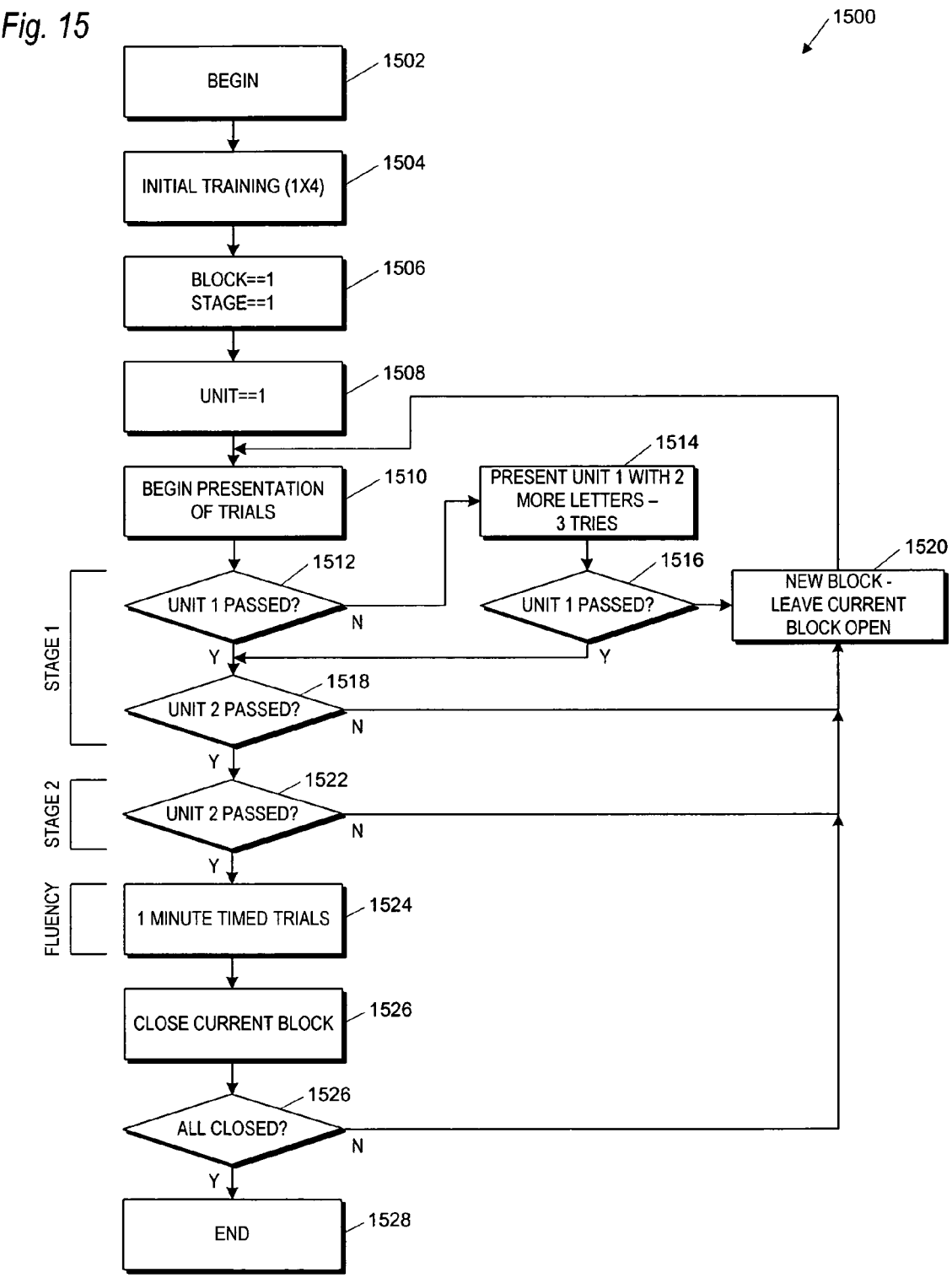
FIG. 15 is a flow chart illustrating program flow according to the method of the Bear Bags exercise.

Each stimulus set is considered a block, which is a different set of four letters. For example, referring briefly back to FIG. 11, there are four words that are target phonemes: jug, hat, log, pig. These come from easy stimulus block 3, where the letters p, l, h, and j are used in the trial. And, for each trial, either 2, or 4 target phonemes are presented. Further, each time the selection paw is presented, a number of trials are presented, sequentially, using the letters for a selected block. In one embodiment, where two target phonemes are presented, four trials are provided. And, where four target phonemes are presented, five trials are provided. Progression from block to block will now be described with reference to FIG. 15, to which attention is now directed.

Flow begins at block 1502, and proceeds to block 1504.

At block 1504, an initial training is provided, displaying just 1 target phoneme (as shown in FIG. 8), and four trials are provided. This is referred to as a 1×4 set. Flow then proceeds to block 1506.

At block 1506, the stimulus set (or block) of phonemes to be tested on is set to 1, which is the first block in the easy sound contrasts. Also, the stage is set to 1, which will become clearer below. Flow then proceeds to block 1508.

At block 1508, the Unit for testing is set to 1. The purpose of the Unit will become clearer below.

At block 1510, a first trial is presented. Recall from the above, that the first trial begins when the student selects the selection paw on the toaster. At this point, two target phonemes are presented, followed by a stimulus phoneme for matching. In one embodiment, during stage 1, unit 1, four trials are presented. The student then selects the selection paw, and another four trials are presented. Flow then proceeds to decision block 1512.

At decision block 1512 a determination is made as to whether the student has passed Unit 1. In one embodiment, to pass Unit 1, the student should correctly respond to 100% of the 8 trials presented. If they correctly respond to the eight trials (in block 1), flow proceeds to decision block 1518. However, if they do not achieve 100% success, flow proceeds to block 1514.

At block 1514, a different set of two letters, from block 1, are used to present 8 more trials. Flow then proceeds to decision block 1516.

At decision block 1516 a determination is made, the same as in decision block 1512, as to whether the student has correctly responded to 100% of the trials in Unit 1. If so, flow proceeds to decision block 1518. If not, the student is given a total of 3 chances to pass Unit 1, using Block 1. If they do, flow proceeds to decision block 1518. If not, flow proceeds to block 1520.

At block 1520, a new block (stimulus set) is opened for testing. But, block 1 is left open and will be repeated later. Flow then proceeds back to block 1510.

At decision block 1518, a determination is made as to whether the student has correctly responded to 90% of the trials in Unit 2. In one embodiment, Unit 2 utilizes four target phonemes, such as those shown in FIG. 11, and presents 20 trials, five at a time. Thus, to get 90% correct, the student should correctly respond to 18 out of the 20 trials. If the student does correctly respond to 90% of the trials, another set of 20 trials is presented within the current block. The student is given three chances to pass Unit 2 for the current block. If s/he does, flow proceeds to decision block 1522. If s/he does not, flow proceeds to block 1520 where another block is selected, but the current block is left open.

At this point, the target phonemes have shown both the picture of a word, and the word itself. In addition, the stimulus phoneme has been shown with a picture only, and an aural presentation of the phoneme. This combination of picture/text for the targets, and text only for the stimulus, is considered Stage 1.

At decision block 1522, a determination is made as to whether the student has correctly responded to 90% of the trials in Unit 2, Stage 2. In one embodiment, Unit 2 utilizes four target phonemes, and presents 20 trials, five at a time. Thus, to get 90% of the trials, the student should correctly respond to 18 out of the 20 trials. From the last paragraph, Stage 2 implies that the form of presentation of the trials shows the picture only for the target phonemes, and not the text, and the text only for the stimulus phoneme. Of course, other variations or combinations are possible. And, as above, the student is given is given three chances to pass Unit 2 for the current block. If they do correctly respond to 90% of the trials, in the present stage, in the present unit, for the current block, flow proceeds to block 1524. If they do not correctly respond to 90% of the trials, after three chances, flow proceeds to block 1520 where another block is selected, but the current block is left open.

At block 1524, the student enters a 1 minute timed trial, as shown in FIG. 14. Although points are awarded, the students progress is not affected by the number of correct/incorrect responses in the fluency trial. Flow then proceeds to block 1526.

At block 1526, the current block is closed. That is, the student has correctly responded to 100% of Unit 1, Stage 1 trials, and at least 90% of Unit 2, Stage 1, and Unit 3, Stage 2 trials. Thus, the block used for these units/stages is closed and will not be repeated within the exercise. Flow then proceeds to decision block 1526.

At decision block 1526, a determination is made as to whether all blocks have been closed. If not, flow proceeds to block 1520 where a trial begins on the next block. However, if all blocks have been closed, flow proceeds to block 1528 where the program Bear Bags is completed.

What has been described above is one embodiment illustrating a method of the present invention to improve a student's phonemic awareness, understand alphabetic principles of phonics, and decode one syllable words, by progressively testing the student to sort/match, words according to their beginning and ending consonants, as well as their medial vowels. One skilled in the art should appreciate that other combinations of starting/ending consonants could be used, the number of target phonemes presented in each trial could vary, and the number of trials presented for purposes of progression could vary, all without departing from the scope of the present invention. With this in mind, attention is now directed, not at the next exercise in Reading 1, but at a parallel exercise in Reading 2, called Bear Bags: More Lunch. In organizing the present description, it was believed that rather than describing the exercises in the order that they were played, it might be easier to comprehend if similar exercises were discussed in the same context.

Program Set—Reading 2

Exercise—1: Bear Bags: More Lunch

A goal in the exercise Bear Bags: More Lunch is improve phonemic awareness, understanding of alphabetic principles (phonics), and decoding of one-syllable words.

In this exercise, the student is asked to help Papa Bear sort words (on pieces of toast) into phoneme-based categories (in lunch bags). The exercise develops phonemic awareness along with grapheme/phoneme associations. The exercise starts with initial consonants, then progresses to final consonants, short vowels, and long vowels. Initially, sounds that are easy to discriminate will be contrasted, later the contrasts will involve confusable sounds.

In the sorting exercise the student will sort words into 1, 2, or 4 bins (lunch bags). The words will be sorted on the basis of the phoneme in the position currently targeted. The target phoneme could be the vowel or the initial or final consonant or consonant cluster. The very first time the student works on this exercise, only 1 sorting bin is available for a "familiarization round" of 4 trials only. Otherwise, the student will be presented with either two bins representing two categories, and items presented in blocks of eight, or four bins representing all four categories from a group, with items presented in blocks of 20.

In regular interaction, a stimulus item is presented—first aurally and then visually with the written word. The student should recognize the phoneme in the target position, and click on the relevant bin (lunch bag) to sort the word. The student should master a block of trials (representing a given set of phonemes in a given position) before advancing to the Fluency Round.

In the fluency round, the task will give the student an opportunity to develop speed at recognizing and identifying phonemes and mapping graphemes to phonemes. A countdown timer and other visual cues will indicate to the student that this is a fluency round.

There are two levels of difficulty in the sound contrasts across bins (i.e., the foil set). The easy level contrasts nonconfusable sounds, whereas the hard level contrasts confusable sounds.

When beginning a new unit, the student is required to click the selection (e.g., the OR) button. The categories used in the current unit will be presented in the sorting bins on the screen. The stimulus is first aurally presented, and the visual stimulus that drops down is a written word. The written stimulus words also have the target phoneme highlighted. The student can hear the word again at any time during the trial by clicking on the OR button.

The sorting bins have only the corresponding picture for that category (e.g., pictures of a pig, tub, rat, or cub). This is to prevent a simple visual matching of letter to letter. Instead, the student is encouraged to read the stimulus word, think about the names of the items on the bins, and compare them phonemically. When this set of sounds is mastered, the student can move onto a new set of sounds. The student can also click on the speaker associated with the category to hear the example. The student can click the word again to hear it, but fewer points will be awarded and the trial will not count toward advancement. Whenever a new category bin or set of bins is displayed, the category's description is aurally presented, with an accompanying highlight on the mailbox before the first trial begins.

There are three target positions and a total of 53 sound pattern categories in this exercise. The categories are listed below with the item that will be used to label the sorting bin for that category.

| Initial Consonant | | Final Consonant | | Vowel | |
|---|---|---|---|---|---|
| s-blends | | doubles | | silent-e | |
| sc | scoop | ff | cliff | a_e | cake |
| sk | skunk | ll | bell | i_e | five |
| sm | smile | ss | dress | o_e | phone |
| sn | snowman | zz | fuzz | u_e | tube |
| sp | spoon | special | | digraphs | |
| st | star | x | fox | ai | nail |
| sw | sweater | ck | clock | ay | hay |
| r-blends | | ng | string | ea | leaf |
| br | broom | blends | | ee | bee |
| cr | crab | mp | lamp | oa | goat |
| dr | dress | nd | hand | | |
| fr | fruit | lf | wolf | | |
| gr | grasshopper | nk | skunk | | |

-continued

| Initial Consonant | Final Consonant | Vowel |
|---|---|---|
| pr princess | ft | gift |
| tr tractor | lt | belt |
| l-blends | nt | tent |
| bl blue | st | nest |
| cl cloud | digraphs | |
| fl flower | ch | peach |
| gl glue | sh | fish |
| pl plate | th (-v) | moth |
| sl slate | grammatical endings | |
| digraphs | | |
| ch cheese | -ed/Ed/ | dented |
| sh shoe | -ing | eating |
| th (-v) thumb | -s | cats |

Terms:

Categories A sound category is a given phoneme or phoneme pair, represented by a particular spelling pattern, in a given position (e.g., single phonemes like initial-/sh/, final-/z/ spelled [zz], long-/E/ spelled [ea], & long-/E/ spelled [ee]; phoneme pairs like initial-/br/ & final-/st/). Position is specified for consonants only, as consonants can be either initial or final. All vowel patterns appear in only one position (usually medial, but final for [ay]).

Block Four categories that are presented together at a given level (bin sets, and the accompanying stimuli). Each sound category occurs in at least two blocks (one with easy contrasts and one with hard contrasts).

Unit The smallest group of trials to be evaluated for advancement.

Level Difficulty based on confusability of stimulus and foil phonemes.

A trial is evaluated as correct if the student clicks on the correct bin to sort the word. If the student makes the correct selection they receive points and that trial is counted toward advancement. Otherwise the trial is failed and the student receives no points. Unit level evaluation will occur for the 4, 8, or 20 trials presented for each block. The student should get 90% correct to pass that block.

For the 2×4 units, students should get 100% correct to pass the block. Students get three attempts to pass each unit. If they pass the 4×5 grid, they will get a Fluency Round on that block. Fluency rounds are "bonus" rounds, and they are not evaluated for progression. If students fail a 2×4 grid, they will be presented with another 2×4 grid constructed from the remaining 2 categories. If they fail that 2×4 grid, they transition to the next open block. If students fail a 4×5 grid for any block, they transition to the next open block. If students fail a block, they should repeat the same block, beginning with the 2×4 unit. They will return to master incomplete blocks at the end of the exercise.

Stimulus Sets of Phonemes for Blocks/Bin Sets:

| EASY | | | | | | HARD | | | | | |
|---|---|---|---|---|---|---|---|---|---|---|---|
| Initial Consonants | | | | | | Initial Consonants | | | | | |
| 1 | 2 | 3 | 4 | 5 | 6 | 16 | 17 | 18 | 19 | 20 | 21 |
| bl | cl | gl | pl | fl | sl | bl | cl | fl | tr | sm | sh |
| fr | pr | tr | gr | cr | dr | pl | gl | sl | dr | sn | th |
| sp | sw | sm | sn | sk | st | br | cr | fr | st | Sp | ch |
| br | sc | th | ch | sh | th* | pr | gr | sw | sk | sc | sw* |
| Final Consonants | | | | | | Final Consonants | | | | | |
| 7 | 8 | 9 | 10 | 11 | 12 | 22 | 23 | 24 | 25 | 26 | 27 |
| nt | st | ft | lt | mp | nd | ff | x | ng | st | -s | ss |
| lf | nk | ng | ck | x | ff | ll | ck | nk | lt | th | zz |
| ss | ll | zz | sh | th | -ing | lf | ch | nd | -ed | -ing | mp |
| ch | -ed | th* | ff* | ng* | -s | ft | sh | nt | ft* | nk* | nt* |
| Vowels | | | Vowels | | |
| 13 | 14 | 15 | 28 | 29 | 30 |
| a_e | i_e | i_e* | u_e | oa | a_e |
| u_e | o_e | u_e* | o_e | ai | o_e* |
| ee | ai | ay | ee | ea | i_e |
| oa | ea | oa* | ay | u_e* | ee* |

Figure 16:
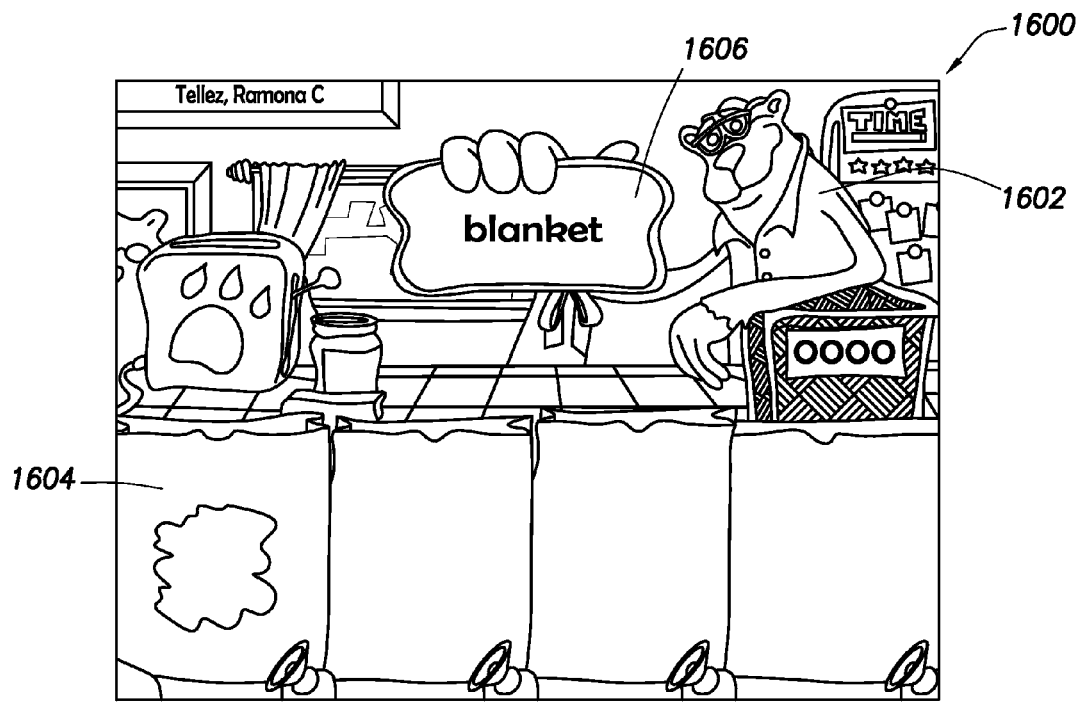
FIG. 16 is a screen shot of an initial training session in the exercise Bear Bags: More Lunch.

Referring now to FIG. 16, a screen shot 1600 is shown of an initial training screen in the exercise Bear Bags: More Lunch. Similarly to Bear Bags, the screen includes a toaster with a paw select, a time indicator, a score indicator, speakers for replaying the target phonemes on the lunch bags, and this time, Papa Bear 1602 for making lunches. In the initial training, a target phoneme 1604 is placed on the 1St lunch box, and an aural presentation is played. In this instance, it states "begins with the letters that sound like blue, or blouse". The student is then shown a stimulus phoneme 1606, which in this instance is the word "blanket. It is the blended initial consonant "bl" that is to be matched with the lunch box pictorially represented by the color blue.

Figure 17:
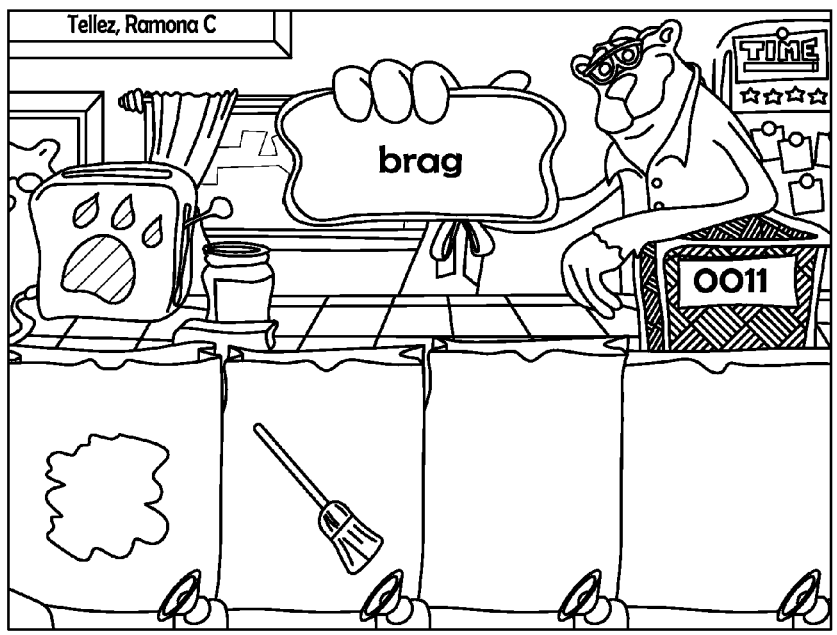
FIG. 17 is a screen shot of a trial with in the exercise Bear Bags: More Lunch.

Referring now to FIG. 17, a screen shot 1700 is shown of a trial in Unit 1, Stage 1 of the program. In this instance, the student is to sort the word "brag", which contains the initial consonant blend "br" into one of the lunch sacks associated with "blue" or "broom".

Figure 18:
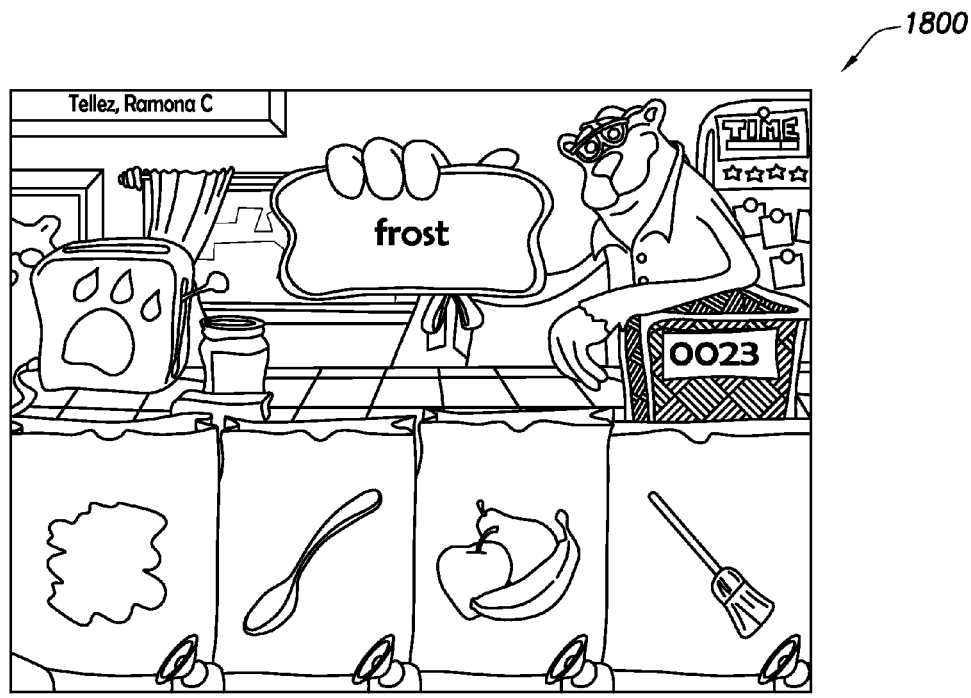
FIG. 18 is a screen shot of a more advanced trial within the exercise Bear Bags: More Lunch.

Referring now to FIG. 18, a screen shot 1800 is shown of a trial in Unit 1, Stage 1 of the program, where four target phonemes are presented. In this instance, the target phonemes are "blue"; "spoon", "fruit", and "broom". The correct sort for the stimulus phoneme "frost" is the target phoneme "fruit" because they both begin with the initial consonant blend of "fr".

Figure 19:
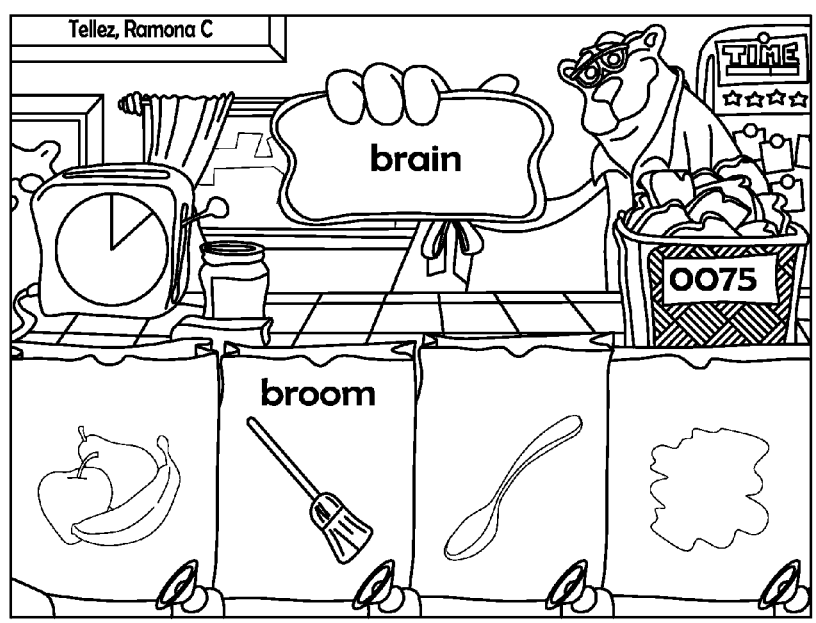
FIG. 19 is a screen shot indicating an incorrect response to a trial within the exercise Bear Bags: More Lunch.

Referring now to FIG. 19, a screen shot 1900 is shown which illustrates what occurs when an incorrect response is provided by the student. In this instance, the target phonemes were "fruit", "broom", "spoon", and "blue". The stimulus phoneme that required sorting was "brain". The correct response should have been "broom". However, if any of the other three target phonemes is selected as the proper sort, a "dunk" is played, the three incorrect target phonemes are grayed out, and the correct sort is highlighted, along with a display of the word associated with its pictorial representation (or grapheme).

Figure 20:
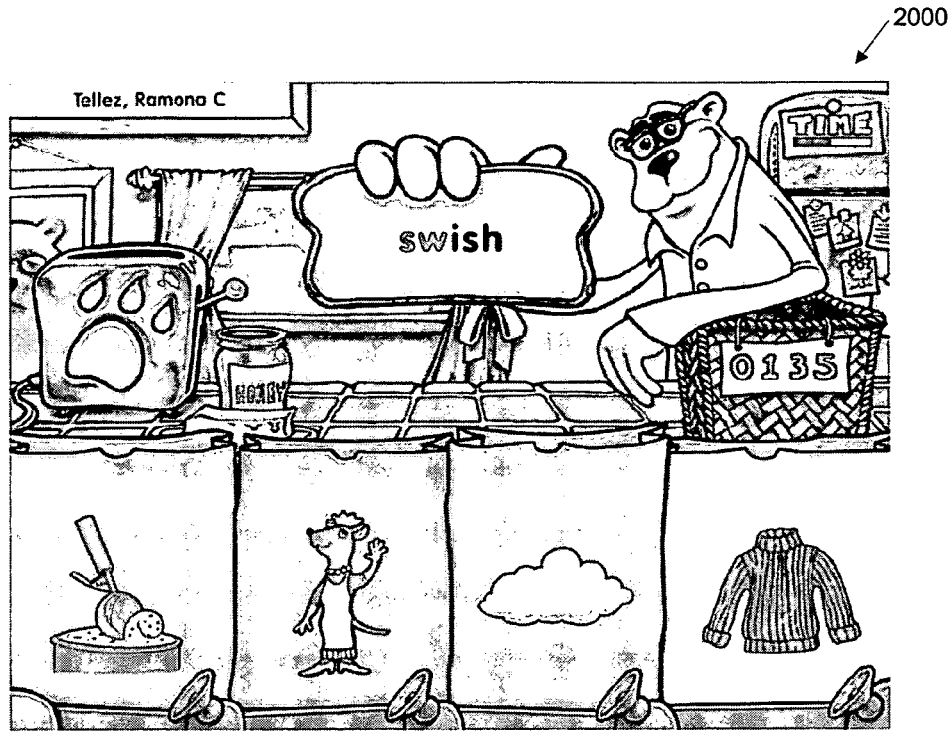
FIG. 20 is a screen shot of another trial within the exercise Bear Bags: More Lunch.

Referring now to FIG. 20, a trial similar to that presented in FIGS. 18 and 19 is shown on screen 2000. In this instance, the initial consonant blend "sw" is being tested, with the student required to sort the stimulus phoneme "swish" into the proper target phonemes lunch bag. The appropriate sort is "sweater". As above, a correct response causes the score indicator to increase, and a "ding" to be played.

Exercise play progression is similar to that described above in FIG. 15 with reference to Bear Bags. However, one skilled in the art should appreciate that the blends in the stimulus sets in Bear Bags: More Lunch are more difficult in Reading 2 than in the single consonants/vowels presented in Bear Bags in Reading 1. In addition, Bear Bags: More Lunch contains 30 blocks of combinations rather than the 16 presented in Bear Bags in Reading 1. The student is required to pass through all blocks to complete this exercise.

Program Set—Reading 1

Exercise—2: Flying Fish

The goal of this exercise is to improve decoding skills, identification of sight words, and auditory memory. This exercise builds the word identification skills that are necessary for reading fluency. Using auditory clues, the student is required to remember a spoken word while waiting for the matching pronounced (and written) word to be heard (and seen). This exercise also improves working memory by requiring the student to remember the sound of the words in order to find the matching written word. Students are also trained on phonological awareness and visual tracking to reinforce left-to-right reading patterns.

To begin exercise play, as in the other exercises described above, the student clicks the OR button to hear a target word then pays attention to a sequence of written and/or aurally presented words. The student should identify the word that matches the target word by clicking on the matching word when it appears.

Stimuli and Presentation Choices are presented in two stages:

|  | Stimulus | Presentation Choices |
| --- | --- | --- |
| Stage 1 | Spoken and Written | Spoken and Written |
| Stage 2 and Fluency | Spoken only | Written only |

In Stage 1, the "fishing pelican" pronounces a stimulus word. Then a series of spoken and written target words fly across the screen on fish. The student clicks on the target word when it matches the stimulus word. The student continues doing so until all the words in the set are matched. In one embodiment there are 10 words per set.

In Stage 2, the student works with the same set of words as in Stage 1, but this time the stimuli and choices are presented differently. The word is only aurally presented (no written component as in Stage 1). The choices are presented as written text (no aural component as in Stage 1). The student continues to work through Stage 2 until the end of the word set. At the end of Stage 2, the student moves on to Stage 1 with a new set of words, and then onto Stage 2 after Stage 1 is complete. This cycle continues with 4 sets of stimuli. At the end of this cycle, the student moves on to a Fluency Round.

In the Fluency Round, all 40 words from the previous 4 sets (or 30 from the previous 3 sets if final set) are presented in the manner of Stage 2 (spoken Stimulus, written choices). All of the words from each set are lumped together into one big group of 40 words, then randomly sampled. This is a timed round of approximately 2 minutes. The rate of presentation of the sequence of words is variable: the sequence starts off slow, then speeds up depending on which stage the student is in (Stage 1 slowest, Fluency Round fastest). In one embodiment, the rates of Target and Stim Presentation for Stage 1 and 2 are: target presentation: 800 ms; stimulus text presentation: 1300 ms.

Progression:

A Unit is the smallest group of trials to be evaluated for advancement. A Set is a group of 10 words presented together. A Round is a group of 4 or 5 sets of words. A trial is evaluated as correct if the student responds by clicking on the correct word to match the stimulus word. To successfully pass a unit (a set of 10 words), the student should get 90% of the trials correct. Evaluation occurs at the end of a unit. A listing of the words in each set, and the sets in each round, are located in Appendix A.

Stage 1: Present set of 10 words. Stage 2: Present same set of 10 words as in Stage 1. Now go to Stage 1 again with new set of words. Stage 1: Present new set of 10 words. Stage 2: Present same set of 10 words as in Stage 1. The student should meet the criteria for Stage 1 before moving on to Stage 2 for any given set of 10 words. Likewise, they should meet the criteria for Stage 2 in 4 sets, before moving on to a Fluency Round. When a student passes stage 2 on any four units (or the last three), they will get a Fluency Round using words from those units. The Fluency Round is not evaluated for progression—but for points only. If the Fluency Round occurs at the end of a session, the student is allowed to complete the Fluency Round before the session times out. If the student exits manually from the Fluency Round, the round will be exited immediately. If at the end of the exercise the student returns to repeat a Stage 2 for any set of words, they should first progress through Stage 1 for that set, even if they met criteria the first time around. If a student repeats a unit three times without meeting criteria, the unit is skipped and is presented again at the end of the exercise. They then move on to the next open unit.

Figure 21:
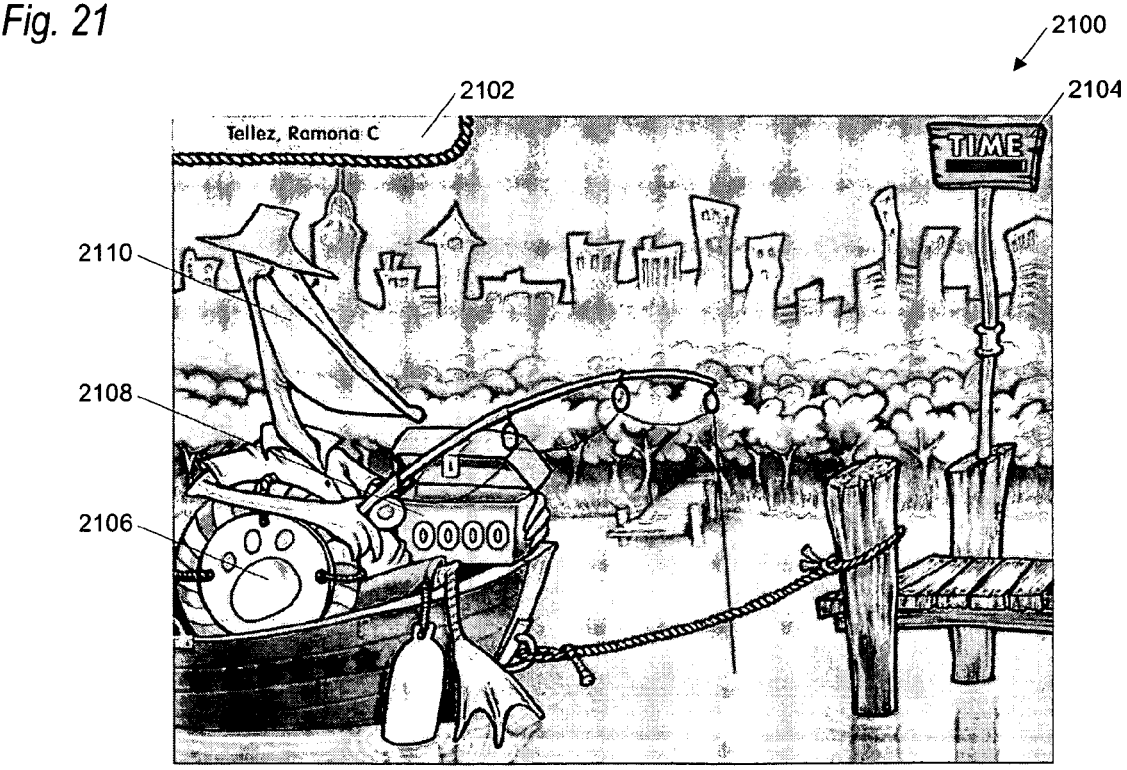
FIG. 21 is a screen shot at the beginning of the exercise Flying Fish.

Referring now to FIG. 21, a screen shot 2100 is shown of the environment for the exercise Flying Fish. As in Bear Bags, Flying Fish has a student indicator 2012, a time indicator 2104, a Paw select 2106 (for initiating a trial), a score indicator 2108, and a main character, in this case a fishing pelican 2110. Exercise play begins with the student selecting ("clicking), the Paw 2106.

Figure 22:
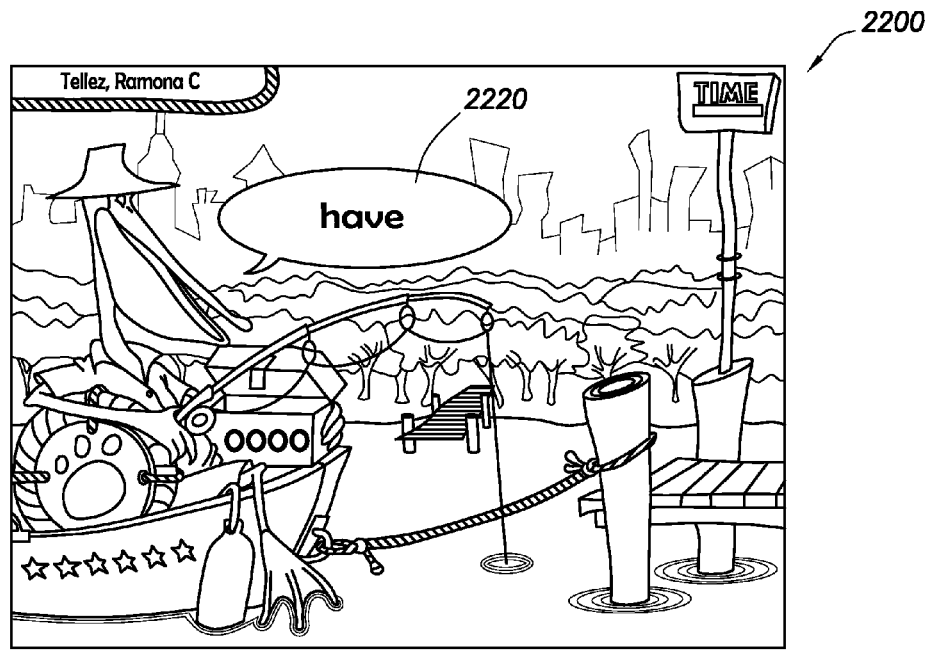
FIG. 22 is a screen shot in Flying Fish of a stimulus word being presented.

Referring now to FIG. 22, a screen shot 2200 is shown of a stimulus word 2220 being presented to the student. For each trial, the student is required to click the Paw 2106 to begin. After s/he does so, a stimulus word 2220 is presented. As shown in FIG. 2200, the stimulus word is presented graphically, and although not shown, the stimulus word is also played aurally. After graphical/aural presentation, the stimulus word 2220 disappears from the screen. As mentioned above, during Stage 1 of each round, the fishing pelican pronounces the stimulus word, and the word is presented graphically. In Stage 2 of each round, the stimulus word is spoken by the fishing pelican, but it is not presented graphically.

Figure 23:
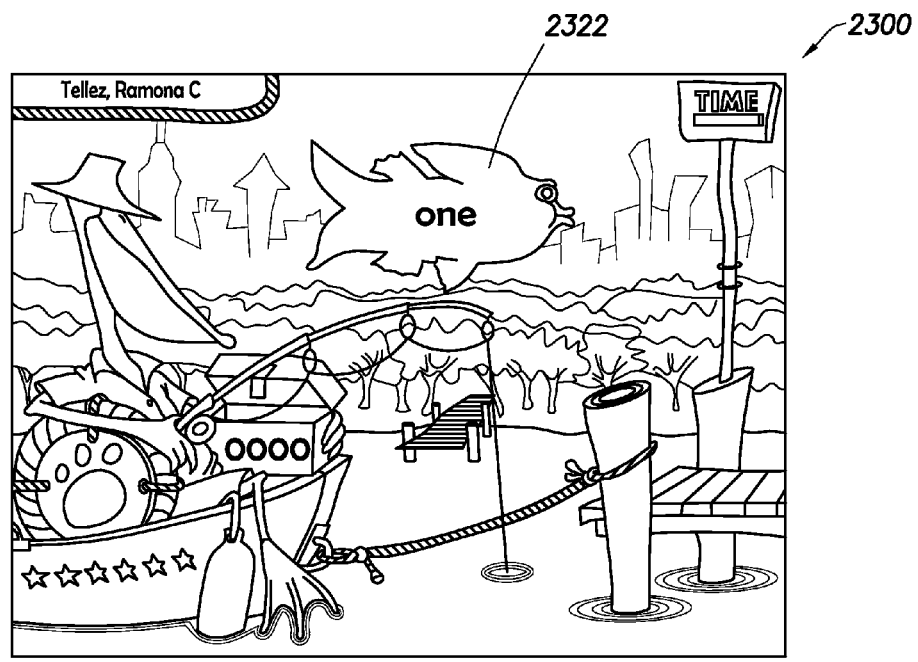
FIG. 23 is a screen shot in Flying Fish of a target word being presented.

Referring now to FIG. 23, a screen shot 2300 is shown of a trial in process after the stimulus word 2220 was presented. What is particularly illustrated is that a series of target words 2322 will swim across the screen, one at a time. The student is required to remember the stimulus word 2220, and then select the stimulus word from the series of target words 2322 that swim across the screen. In this trial, the stimulus word is "have". And, the target word 2322 that appears on the screen, at this moment, is "one". This is not a correct match. Therefore, the student should not select the word 2322. If s/he does, then similarly to the other exercises, a "thunk" is played, the word 2322 disappears, no points are awarded, and a new trial is begun.

Figure 24:
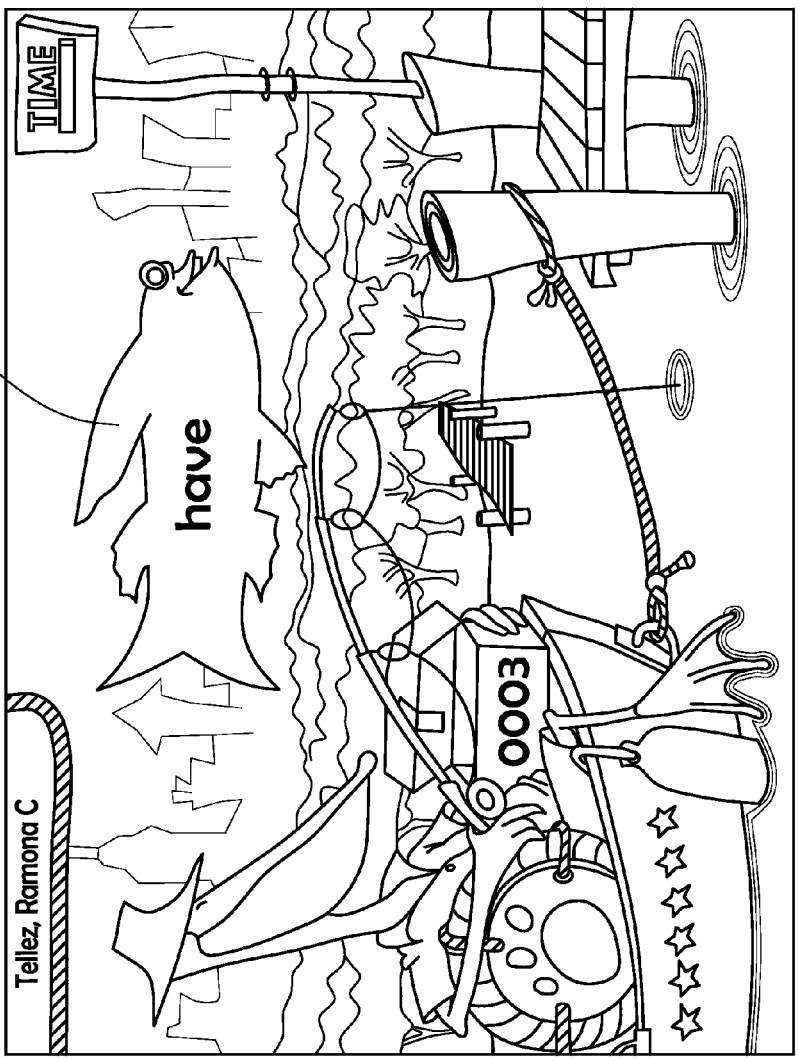
FIG. 24 is a screen shot in Flying Fish of a target word that matches the stimulus word, being presented.

Referring now to FIG. 24, a screen shot 2400 is shown. In this instance, the target word "have" 2424 is swimming across the screen. This word is the same as the stimulus word presented in screen 2200. Therefore, the student should select the target word "have" 2424 before it swims off the screen. If s/he does, then a "ding" is played, the student is awarded points, and a new trial is begun. If s/he does not select the correct target word 2424 before it swims off the screen, a "thunk" is played, no points are awarded, and another trial is begun.

Figure 25:
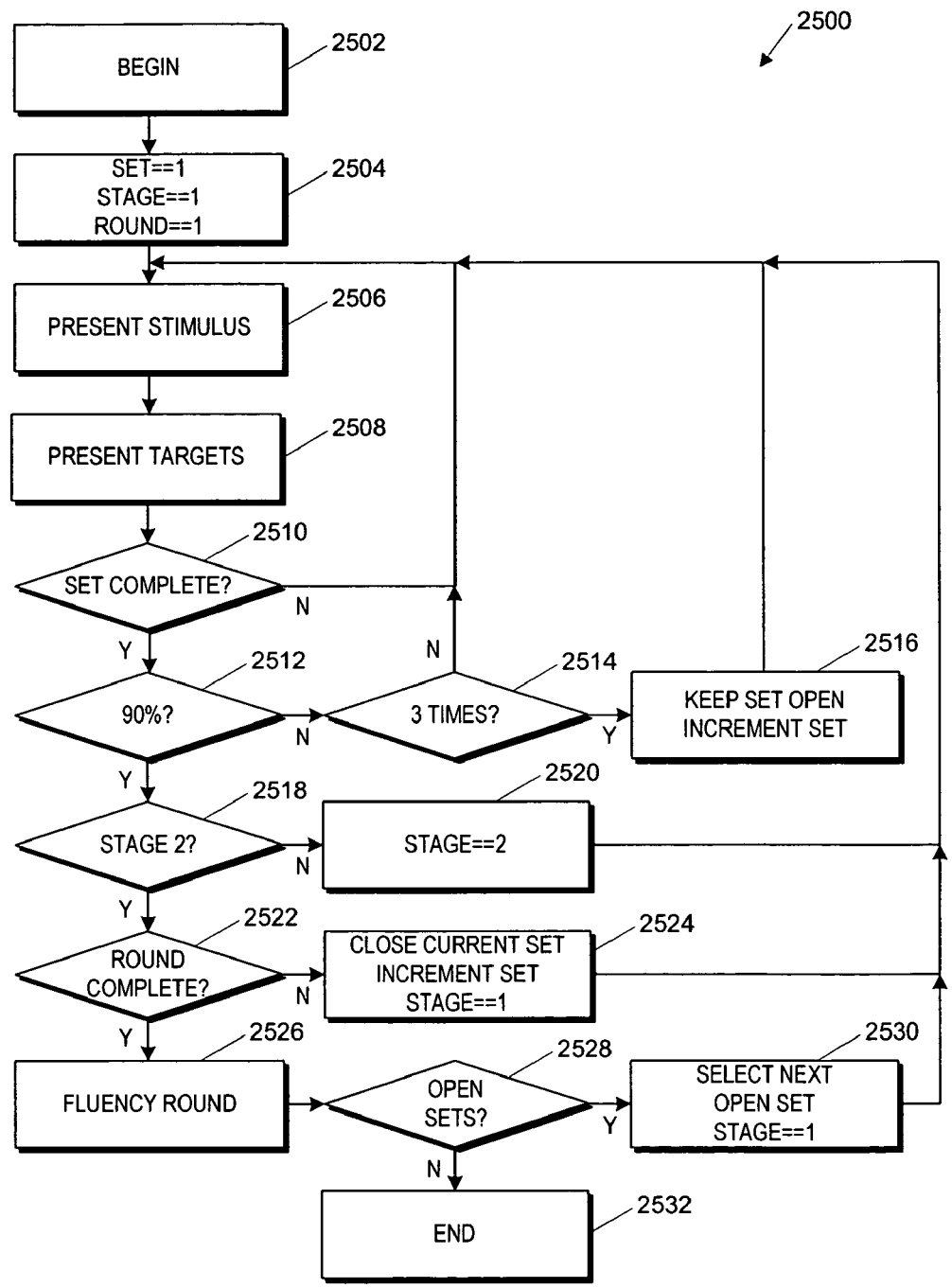
FIG. 25 is a flow chart that illustrates the method of the exercise Flying Fish.

Referring now to FIG. 25, a flow chart 2500 is shown which illustrates the method of the present invention as embodied in the exercise Flying Fish. The method begins at block 2502 and proceeds to block 2504.

At block 2504, the set, stage and round are set equal to 1. Recall from the above, that there are 31 sets of 10 words, each of which are presented twice, first in Stage 1, second in Stage 2. There are 6 rounds, the first 3 having 5 sets in each, the second 3 having 4 sets in each. After the starting set, stage and round is initialized, flow proceeds to block 2506.

At block 2506, a stimulus word is selected for the present set. In one embodiment, the stimulus word is randomly selected from the present set, with the selection made from the set of words that have not yet been tested on. Once the stimulus word is selected, it is presented to the student. If at stage 1, the word is shown, and spoken aurally. If at stage 2, the word is spoken only. Flow then proceeds to block 2508.

At block 2508, target words are presented. In one embodiment, the target words swim by, one at a time, although it is possible that multiple targets could be presented on the screen together. The target words are selected from the present set. During the presentation, the student should indicate a selection. If the student correctly matches the target word with the stimulus word, the word is marked "completed" for the set, and another trial is begun within that set. If the student does not correctly match the target word with the stimulus word, either by failing to make a selection, or by selecting the wrong target, that stimulus word is marked complete, and another trial is begun within that set. Flow then proceeds to decision block 2510.

At decision block 2510, a determination is made as to whether all of the stimulus words in the present set have been presented to the student. If not, flow proceeds back to block 2506. However, if all of the words in a set have been presented to the student, flow proceeds to decision block 2510.

At decision block 2510, a determination is made as to whether the student has passed the set successfully. That is, has the student met a predetermined threshold for the present set. In one embodiment, the predetermined threshold is 90%, or 9 out of 10 correct matches. However, one skilled in the art will appreciate that this could have easily been set at another fixed percentage (such as 70-100%), or alternatively, a given number of correct responses. If the student did not "pass" this set, flow proceeds to decision block 2514. But, if the student did "pass" this set, flow proceeds to decision block 2518.

At decision block 2514, a determination is made as to whether the student has attempted to pass the present set 3 times. Again, one skilled in the art will appreciate that alternative embodiments could present the present set any number of times, from just once, to as many times as necessary to "pass" the set. However, it was felt that if a student attempts a given set, and fails it 3 times in a row, that rather than having them continue in that set, it is better to let them move on, and retry that set another day. Thus, if the student has not attempted the present set 3 times, all of the completed words in the set are marked uncompleted, and flow proceeds back to block 2506 whether the present set is repeated. But, if the student has attempted the present set 3 times (and not passed), then flow proceeds to block 2516.

At block 2516, the words in the present set are marked uncompleted, the present set is left open, and the set is incremented. Flow then proceeds back to block 2506 where a new set will be presented.

At decision block 2518, a determination is made as to whether the student has just correctly passed a set at Stage 2? If not, then flow proceeds to block 2520. If s/he has, then flow proceeds to decision block 2522.

At block 2520, the stage is set to Stage 2. What this means, in one embodiment, is that the student will hear the stimulus word spoken only, without a graphical presentation of the stimulus word. All of the words in the present set are marked uncompleted, and flow proceeds back to block 2506 where the set is again presented.

At decision block 2522, a determination is made as to whether the student has completed a round. As above, sets have been grouped together into rounds. A completed round gives the student an opportunity to enter a timed trial, called a fluency stage, which groups all of the words in the sets within a round together. If a round is not complete, flow proceeds to block 2524. But, if the student has completed a round, flow proceeds to block 2526.

At block 2524, the current set is closed, and the set is incremented to begin a new set. Further, the stage is set back to 1 so the stimulus words for the new set will be presented both aurally and graphically. Flow then proceeds back to block 2506 for presentation of the new set.

At block 2526 a fluency round is begun. In the fluency round, the student is given a timed trial to match as many stimulus words as possible, with their targets. In one embodiment, the timed trial is 2 minutes in length, although other times are possible. The number of correct or incorrect matches do not effect the student's progress in the exercise. Further, all of the words within the sets associated with the present round are available for selection as stimulus/target words. Upon completion of the fluency round, flow proceeds to decision block 2528.

At decision block 2528, a determination is made as to whether any sets remain open. If not, then flow proceeds to block 2532 where the exercise completes. However, if there are open sets, flow proceeds to block 2530.

At block 2530, the next open set is selected. The next open set could be a set that has not yet been tested on. Or, the next open set could be a set that was attempted 3 times, in block 2514, and failed. In either case, the student is tested on all open sets until they are passed correctly, and closed, at block 2524.

What should be appreciated from the above is that a method has been shown which presents stimulus words to a student, graphically and aurally, as well as aurally only, and then the stimulus word disappears. A series of target words are then presented, for a period of time, to allow the student an opportunity to remember what the stimulus word was, and then match it with the target word before it disappears. The particular arrangement of words within sets, or sets within rounds, or ordering of stages, should not be considered as limiting to the invention, but rather as simply one embodiment of the possible success/progression through a group of words.

Program Set—Reading 2

Exercise—2: Fish Frenzy

The goal of Fish Frenzy is to improve decoding skills, identification of sight words, and auditory memory. This exercise builds the word identification skills that are necessary for reading fluency. Using auditory clues, the student is required to remember a spoken word while waiting for the matching pronounced (and written) word to be heard (and seen). This exercise also improves working memory by requiring the student to remember the sound of the words in order to find the matching written word. Students are also trained on phonological awareness and visual tracking to reinforce left-toright reading patterns. The method of Fish Frenzy is similar to that of Flying Fish described above. A listing of the stimulus words in each set, and the sets in each round are included in Appendix A.

Figure 26:
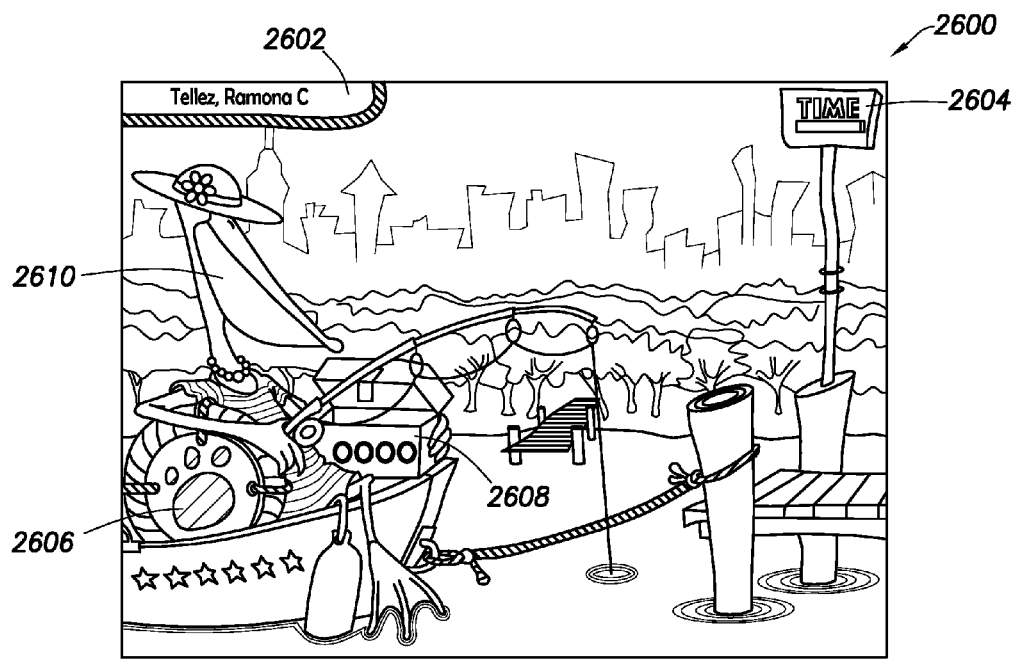
FIG. 26 is a screen shot at the beginning of the exercise Fish Frenzy.

Referring to FIG. 26, a screen shot 2600 is shown of the initial screen in the exercise Fish Frenzy. As in FIG. 21, Fish Frenzy includes a student indicator 2602, a time indicator 2604, a Paw selector 2606, a score indicator 2608, and a fishing pelican 2610. Elements in FIG. 26 function essentially the same as those described above in the exercise Flying Fish.

Figure 27:
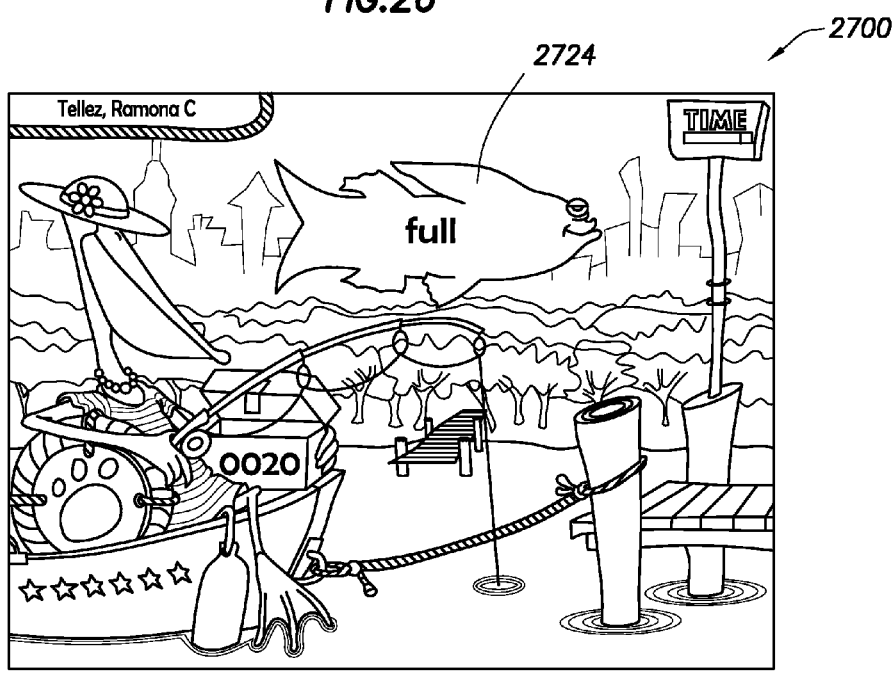
FIG. 27 is a screen shot in Fish Frenzy of a target word being presented.

Referring now to FIG. 27, a screen shot 2700 is shown of a trial within the exercise Fish Frenzy. At this point, the student has begun the trial by selecting the Paw 2606, and a stimulus word "full" has been presented. If the student is in stage 1, the stimulus word was presented both aurally and graphically. If the student is in stage 2, the stimulus word was presented aurally only. Then, a set of target words begin swimming across the screen. The target word "full" 2724 matches the stimulus word "full" and should therefore be selected by the student, if a correct response is desired. Game play continues in Fish Frenzy, for the sets and rounds listed in Appendix A, according to the progression described above for Flying Fish with respect to FIG. 25. the primary difference between the exercises Flying Fish, and Fish Frenzy is in the content level of the words presented, with Flying Fish using content that is at a curriculum level for 1 st grade, and Fish Frenzy using content that is at a curriculum level for 2nd grade.

Program Set—Reading 1
Exercise—3: Magic Rabbit

The goal of this exercise is to improve spelling and sensitivity to letter-sound correspondences. This exercise combines spelling and word-building practice. Using a click and drag interface, the student should either select the missing letter to complete a partially spelled word or rearrange scrambled letter tiles to spell a word. Items are presented as minimal spelling pairs where switching one letter turns one word into another (e.g., hat→bat). In the Beginning Levels, a series of rounds with restricted stimulus sets will be presented to progressively teach all of the target sound-letter correspondences, according to a phonics/spelling instructional sequence. To help build automaticity and generalization, the stimulus sets in the Advanced Levels will sample from all targeted letters and positions. These will be presented as chains of minimal pairs (e.g., bat, cat, cap, cup . . . ), building experience with word families and the combinatorial nature of our alphabetic writing system. All stimulus words will be Consonant-Vowel-Consonants (CVCs) with highly regular spellings (3-letters, and, in the beginning level only, 3-letters plus Silent-e). When a letter is needed to complete a new word, it will be chosen from a principled array in which the visual and phonetic similarity of foils is controlled. There will be two levels of foil difficulty, based on the discriminability of target and foils.

In the beginning level trials of this exercise, pairs of words are presented. First, a probe word is presented visually (spelled with letter tiles) and aurally (e.g, b a t "bat"). Next, one of the letter tiles in the probe word becomes blank (e.g., b a t→_a t). Finally, four letter tiles appear, representing the response choices, and the target word is presented aurally (e.g., "hat"). The student should select the correct letter tile and drag it on top of the blanked out letter to complete the spelling of the target word. In Advanced Level trials, an initial stimulus word is presented aurally, and its tiles appear in scrambled order (e.g., t c a→"cat"). The student should rearrange the tiles to correctly spell the word. For the subsequent trials in that round the word from the prior trial remains on screen, and serves as the probe word for the next trial. As in the beginning levels, one of the letter tiles in the probe word becomes blank. A response set of 4 letter tiles also appears, and a new stimulus word is presented aurally. The student should select the correct tile to complete the trial. To prevent students from being exposed to incorrectly spelled words, the incorrect placement of any letter will not be permitted.

In the initial trial in a round, after the student clicks the OR button a word is presented aurally. Scrambled letter tiles for a word appear, as do target spaces for those letters. Only the 3 tiles required to spell the word are presented (i.e, no "dummy" tiles are shown). A card with a picture that represents the word may also appear on screen. The student can click on the OR button to hear the stimulus word repeated. There will be no penalty for using the OR button to repeat the stimulus word. The student should drag the letters to the correct spaces to spell the word. If the response is incorrect, a second and third attempt is allowed. A student that gets all the letters correct on the first try will receive the most points; if a second or third try is needed, the student will receive the least amount of points. A failed third attempt is 0 points. The correct answer is shown after a third attempt.

In subsequent trials in a round, the student proceeds in the same manner as in the beginning level trials, with each completed stimulus word serving as the probe word for the next trial. One of the letter tiles in the probe word becomes blank. A response set of 4 letter tiles also appears, and a new stimulus word is presented aurally. The student should select the correct letter and drag it to the correct position to spell the word. If the response is incorrect, a second and third attempt is allowed.

For example: Trial 1) The word "cat" is aurally presented and a picture of a cat is also on screen. Three letter tiles for "a", "c", and "t" appear, as do 3 targets or blank spaces for those tiles to fill. In this case, the student clicks and drags the tiles to their appropriate targets to spell the word "Cat".

A trial is evaluated as correct and counted toward advancement only if the student spells the word correctly on the first attempt. Second and third attempts can receive points, but are not counted toward advancement (they are considered "incorrect" for the purposed of advancement, even though they can still accumulate points). Exception: Scrambled words (Advanced Levels) are never evaluated for advancement, only for points as described above.

Evaluation of unit: For the beginning levels (1 & 3) evaluation will occur at the level of a block (20 of the 40 items randomly sampled from a group of four categories). For the advanced levels (2 & 4), evaluation will occur at the level of a round (10 items in a chain of minimal pairs, which are always presented together). Evaluation will occur when a student completes a unit.

Advancement:

| Level | Stimuli | Foils |
|---|---|---|
| 1 | Stimulus words for Level 1 follow a progressive sequence designed to teach a spelling/sound mappings in small, manageable sets. Rounds consist of a single probe/stimulus | Fixed list of easy to discriminate letters |

| Level | Stimuli | Foils |
|---|---|---|
| | word pair. Rounds will be blocked such that 20 items (20 of the 40 items randomly sampled from a group of four categories), e.g., initial-s, initial-t, initial-m, initial-g) are presented together. (Five categories will be used for the vowel blocks so that four response alternatives are always available. Items from the extra category will be unscored.) The response set consists of the same four target letters (e.g., s, t, m, g) across the entire block. | |
| 2 | Stimulus words no longer grouped to represent a reduced set of letters. Spelling patterns within rounds, and order of rounds are unconstrained. (sample 20 word chains from list, any order) | Fixed list of easy to discriminate letters |
| 3 | Same as Level 1 | Fixed list of hard to discriminate letters |
| 4 | Same as Level 2 (sample remaining 20 word chains from list, any order) | Fixed list of hard to discriminate letters |

Figure 28:
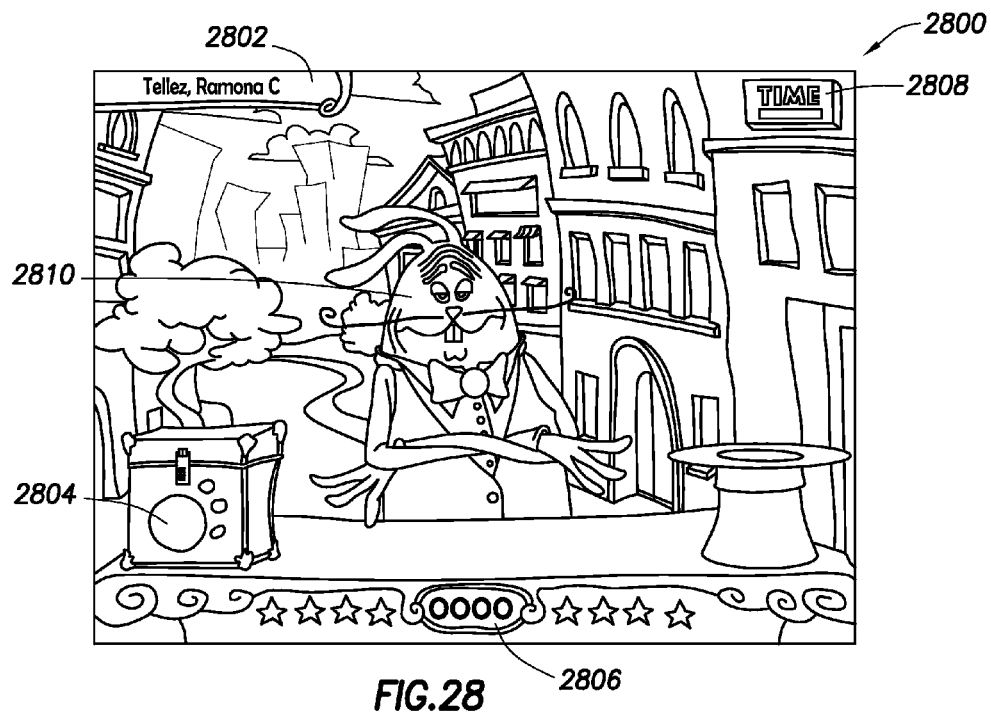
FIG. 28 is a screen shot at the beginning of the exercise Magic Rabbit.

Referring to FIG. 28, a screen shot 2800 is shown of the initial screen within the exercise Magic Rabbit. As in the other exercises, this screen 2800 contains a student indicator 2802, a Paw select 2804, a score indicator 2806, and a time indicator 2808. In addition, the screen 2800 contains a central character, the Magic Rabbit 2810. Operation of these elements is similar to those described above in the other exercises. A trial begins when the Paw 2804 is selected.

Figure 29:
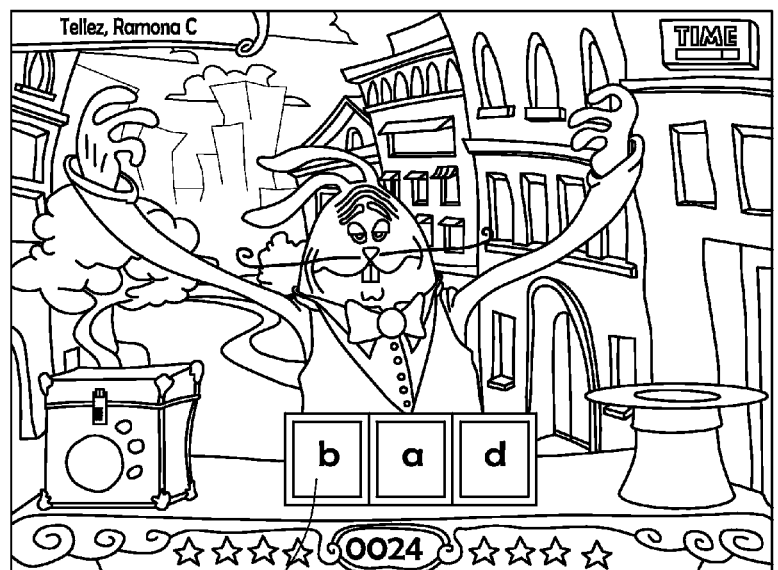
FIG. 29 is a screen shot in Magic Rabbit of an initial training trial.

Referring to FIG. 29, a screen shot 2900 is shown which illustrates the beginning of a trial. In this instance, three blocks 2920 are presented, and the corresponding word "bad" is aurally presented. Once this is presented, the letter "b" disappears.

Figure 30:
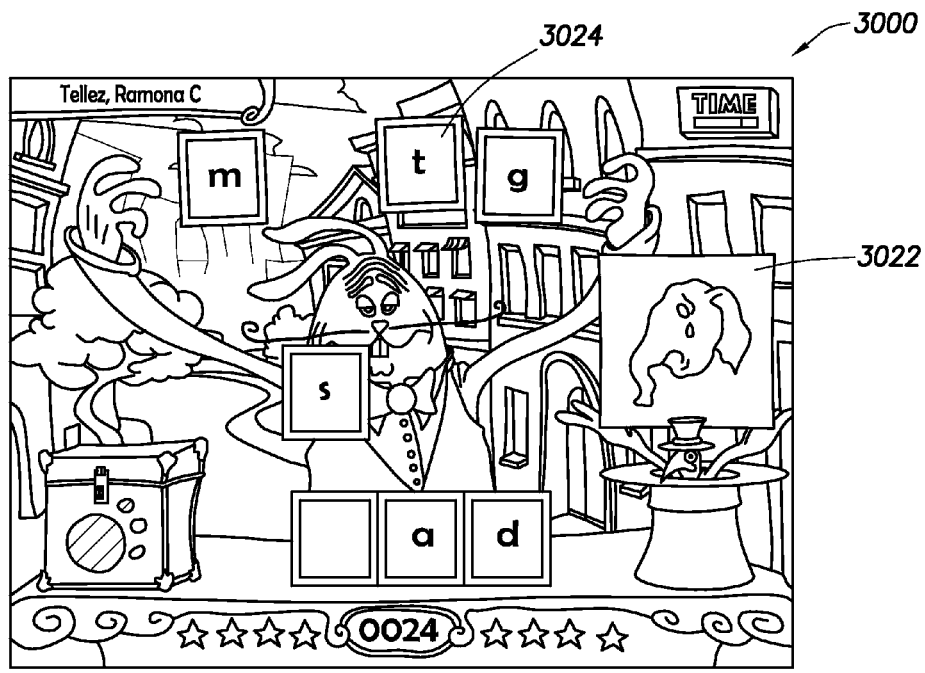
FIG. 30 is a screen shot in Magic Rabbit of a target letter being dragged onto a blank tile to spell the word "sad".

Referring to FIG. 30, a screen shot 3000 is shown which illustrates the progression of the trial of FIG. 29. Once the letter "b" disappears, the word "sad" is aurally presented. And, a graphical image 3022 is provided to illustrate the word "sad". Further, four letters 3024 are provided as options for the student to fill in below to spell the word "sad". In this instance, the student is given the choices of "m", "s", "t", and "g". The student should rely on their memory of the aural presentation of the word "sad" and their understanding of phonemes, to correctly select from the letters 3024 to spell the word "sad". In one embodiment, if the student does not remember the word they are trying to spell, they can select the Paw 2804 to repeat the word. But, if they do so, the number of points awarded will be less.

Figure 31:
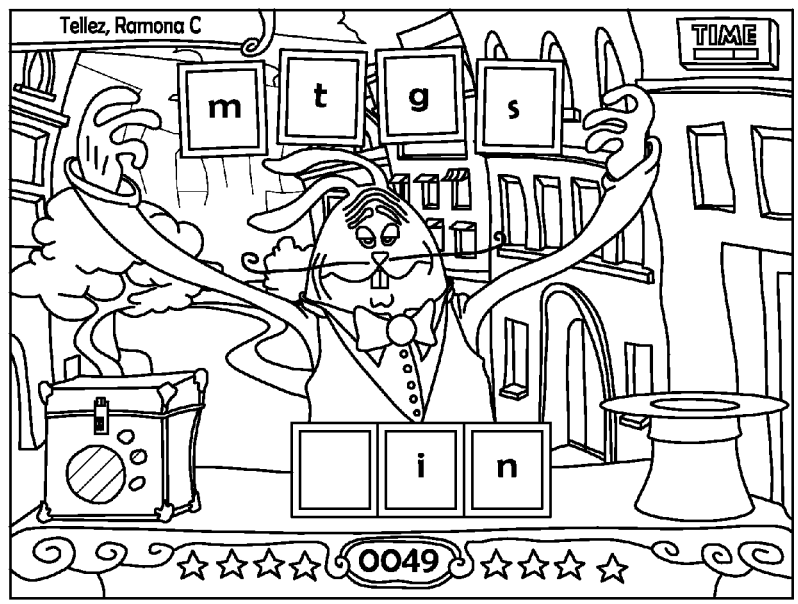
FIG. 31 is a screen shot in Magic Rabbit illustrating grayed out letters that were incorrectly selected by the student.

Referring to FIG. 31, a screen shot 3100 is shown which illustrates another trial, where the student is required to spell the word "tin". In this instance, there is no graphical hint to help the student remember the word they are trying to spell. And, in this instance, the student has tried to spell the word using the letters "m" and "s", and has been unsuccessful. When a student incorrectly selects a letter, a "thunk" is played to indicate the incorrect letter, and the letter is grayed out so that it may not be reselected. Thus, two possibilities remain for the student: the letter "t" and the letter "g". If the student selects the letter "t" points are awarded, but the student does not advance in the game (i.e., because of the two incorrect responses). If the student selects the letter "g" no points are awarded, the "t" is shown to be the correct response, and a new trial is begun.

Figure 32:
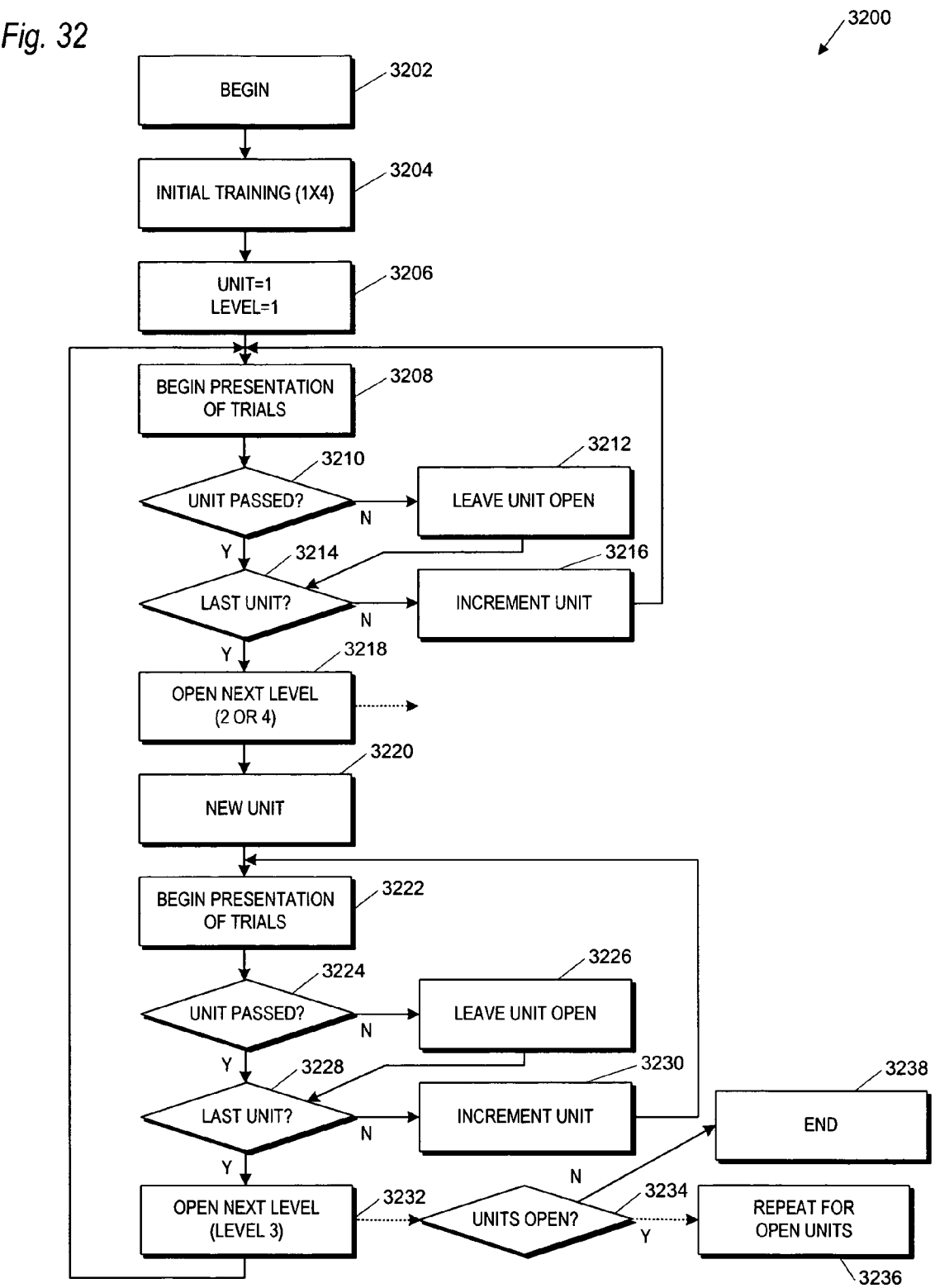
FIG. 32 is a flow chart illustrating the method of the exercise Magic Rabbit.

Referring to FIG. 32, a flow chart 3200 is shown which illustrates the method of the exercise Magic Rabbit. Flow begins at block 3202 and proceeds to block 3204.

At block 3204, an initial training is provided. More specifically 4 trials are given to the student, particularly illustrating what they are to do, which is to drag a target letter (or tile) to a blank title next to other letters, to spell the word that was aurally presented. The student remains in block 3204 until they understand what they are to do. Flow then proceeds to block 3206.

At block 3206, the Unit is set to 1, and the Level is set to 1. In one embodiment, there are 40 Chains of 10 words (see Appendix A), where each word has three easy targets, and three hard targets. At level 1, each trial within a chain is presented to the student in the order shown, but the chains are randomly selected from a group of categories (e.g., initial-s, initial-t, initial-m, initial-g). There are 20 trials in each unit (20 items randomly selected from 40 items within 4 categories). Presentation of each trial is as described above with respect to FIGS. 30-31. After 20 trials are presented, and the response recorded, flow proceeds to decision block 3210.

At decision block 3210 a determination is made as to whether the student has passed the unit. In one embodiment, the student should correctly spell 18 out of 20 trials, or correctly respond to 90% of the trials in order to pass a unit. Further, a student is given three opportunities to pass a unit. If they do not pass a unit the first time, it is repeated. If they do not pass it a second time, it is repeated. If it is not passed a third time, flow proceeds to block 3212. However, if they do pass a unit, flow proceeds to decision block 3214.

At block 3212, the present unit is left open, which means that the student will have to repeat the unit at a later time. In one embodiment, the unit is left to the end of the exercise where the student should return to all units still open, (i.e., all the units not passed during normal progression), and repeat the units until they are passed. Flow then proceeds to decision block 3214.

At decision block 3214, a determination is made as to whether all units at the present level have been completed (other than the ones left open in block 3212). If not, flow proceeds to block 3216. Otherwise, flow proceeds to block 3218.

At block 3216, the unit number is incremented. At level 1, there are 8 units with twenty trials in each unit. After the unit number is incremented, flow proceeds back to block 3208 for presentation of trials in the new unit.

At block 3218, the student has passed all units of a set level (1 or 3). The next level (2 or 4) is therefore opened. Flow then proceeds to block 3220.

At block 3220, a new unit is selected for the new level (2 or 4). In levels 2 or 4, there are 20 units (from the 40 chains) with just 11 trials in each unit—the first trial of each unit not counted). At level 2, stimulus words are no longer grouped to represent a reduced set of letters. And, the spelling patters within rounds, and the order of rounds are unconstrained. Units are selected randomly with trials in a unit presented in order. Unit 2 utilizes the easy to discriminate letters. The only difference between unit 2 and unit 4 is that unit 4 utilizes the list of hard to discriminate letters. Once the new unit is selected, flow proceeds to block 3222.

At block 3222, the trials are presented to the student. Flow then proceeds to decision block 3224.

At decision block 3224, a determination is made as to whether the student has passed the unit. In one embodiment, the student should correctly drag 9 out of 10 (or 90%) of the target letters to the blank tile, to spell the aurally presented word. And, as above, the student is given three chances to pass the unit. If they do not, flow proceeds to block 3226. However, if they pass the present unit, flow proceeds to decision block 3228.

At block 3226, the present unit is left open. Flow then proceeds to decision block 3228.

At decision block 3228, a determination is made as to whether all 20 units have been completed. If not, flow proceeds to block 3230. Otherwise, flow proceeds to block 3232.

At block 3230, the unit number is incremented. Or rather, the present unit is closed, and the next unit is randomly selected from the list of remaining units. Flow then proceeds back to block 3222 for presentation of the next unit.

At block 3232, the next level is open. If the student is currently at level 2, the next level is level 3. In one embodiment, level 3 is the same as level 1, but, the foils used are from the list of hard to discriminate letters. Flow then proceeds back to block 3208 for presentation of a new unit at level 3. However, if the level that is presently open is level 4, then the student has proceeded through all levels. Flow therefore proceeds to decision block 3234.

At decision block 3234, a determination is made as to whether any units remain open. If not, flow proceeds to block 3238 where the exercise ends. Otherwise, flow proceeds to block 3236 where the method is repeated for all of the open units, until passed.

Program Set—READING 2
Exercise—3: Magic Bird

The goal of the exercise Magic Bird is to improve spelling and sensitivity to letter-sound correspondences, with a focus on the multi-letter units typically taught in curriculum for 2nd grade students. This exercise combines spelling and word-building practice applied to spelling patterns and word families. The task is designed to put an emphasis on word families and multiple-letter spelling patterns such as blends and digraphs. The student should select the missing onset or rime to complete a partially spelled word or should make as many real words as possible by pairing onsets and rimes from a grid. The rabbit magician does card tricks that present the student with the answer choices. In the beginning levels, a series of rounds with restricted stimulus sets will be presented to progressively teach all of the targeted spelling patterns, according to a phonics/spelling instructional sequence. In the advanced levels students master those spelling patterns as they build sets of words that belong to common (and less common) word families. Targeted spelling patterns include consonant blends and digraphs (e.g., stop, fish), vowel digraphs (e.g., speed), and simple grammatical endings (e.g., fishing). The instructional sequence and selection of targeted spelling patterns is informed by L. C. Moats' "Spelling Scope and Sequence Chart."

In the Beginning Levels (Teaching Pairs) of this exercise, the student should select the missing onset or mine to complete a partially spelled word. First, a probe word is presented visually and aurally (e.g. "name"). Next, part of the probe word drops off and is replaced by a blank (e.g., name→_ame). Finally, four tiles appear with different letter combinations (e.g., "bl", "fr", "sp", br") and the target word is presented aurally (e.g., "blame"). The student should select the correct tile (by clicking on it) to complete the spelling of the target word.

In Advanced Levels (Family Matches), students should make as many real words as possible by matching a partially spelled stimulus word with several onsets or rimes from a 4- or 9-tile grid. (e.g., the stimulus rime_ate might be presented along with an onset response grid of dr_, p_, gl_, sh_, st_, sl_, br_, cr_, v_). Each time the student clicks on a tile that makes a real word, the assembled word is presented visually and aurally. The student continues working with this grid until all possible word combinations have been presented, or until an incorrect selection is made.

Trial (Beginning levels): After the student clicks the OR button, a probe word is presented visually and aurally. Next, the beginning or end of the word drops off and is replaced by a space. Next, the stimulus word is presented aurally and four tiles showing different letter combinations (onsets or rimes) appear, one of which fills the blank in the partial word to spell the stimulus word. The student is asked to click the correct letter combination to correctly spell the word. If the response is incorrect, a second and third attempt is allowed. Note: For the block of trials in which the spelling pattern is a morphological ending, this sequence changes as follows: the probe word is presented visually with a blank already at the end. The probe word is not presented aurally. The rest of the procedure is the same, but one option will always be a blank tile, and the probe and stimulus words will sometimes be identical (there will be a dummy blank, but it will not be "filled-in").

Trial: (Advanced levels) After the student clicks the OR button, a partially spelled word stimulus appears along with a grid of possible responses. The stimulus will be either an English onset (consonantal word beginning) or a rime (a word ending consisting of a vowel, usually followed by a consonant). The responses will be the complementary word part, either onsets or rimes (e.g., if the stimulus were bl_, the response set could be_ade, _if, _ude, _ock). All response options will be legal letter strings that do occur in that position in some English word (rimes can either appear as rimes or as entire words, e.g., "eve"). No foil word will be a homophone of a common English word (e.g, "treet," "mune," "thay"). The response grid will consist of a varied number of correct responses (ones that combine with the stimulus to make true English words, like "block") and incorrect responses (ones that make non-words when combined with the stimulus, like "blif"). A grid should always include at least one correct response, but not more than 60% of the grid (i.e., 1-2 correct for a 4-tile grid, and 1-5 correct for a 9-tile grid). The student continues working with this grid until all possible word combinations have been selected, or an incorrect selection is made. In either of these instances, the grid will automatically close.

| Level | Presentation Mode | Spelling Pattern | Foil Set | Blocks | Items | Grids | Grid Size | Minimum Trials |
|---|---|---|---|---|---|---|---|---|
| 1 | Teaching Pairs | initial | easy | 6 | 120 | — | — | 120 |
| 2 | Teaching Pairs | final | easy | 5 | 100 | — | — | 100 |
| 3 | Teaching Pairs | vowel | easy | 3 | 60 | — | — | 60 |
| 4 | Teaching Pairs | morph. ending | easy | 1 | 20 | — | — | 20 |
| 5 | Teaching Pairs | initial | hard | 6 | 120 | — | — | 120 |
| 6 | Teaching Pairs | final | hard | 5 | 100 | — | — | 100 |
| 7 | Teaching Pairs | vowel | hard | 3 | 60 | — | — | 60 |
| 8 | Teaching Pairs | morph. ending | hard | 1 | 20 | — | — | 20 |
| 9 | Family Matches | mixed | — | — | — | 81 | small grid | ~122 |
| 10 | Family Matches | mixed | — | — | — | 81 | large grid | ~243 |

Stimulus Categories with Blocking:

| Easy | | | | | | Hard | | | | | |
|---|---|---|---|---|---|---|---|---|---|---|---|
| Init | | | | | | Init | | | | | |
| 1 | 2 | 3 | 4 | 5 | 6 | 16 | 17 | 18 | 19 | 20 | 21 |
| bl | cl | gl | pl | fl | sl | bl | cl | fl | tr | sm | sh |
| fr | pr | tr | gr | cr | dr | pl | gl | sl | dr | sn | th |
| st | sw | sm | sn | sk | sp | br | cr | fr | st | sp | ch |
| sh | sc | th | ch | br | th* | pr | gr | sw | sk | sc | sw* |
| Fin | | | | | | Fin | | | | | |
| 7 | 8 | 9 | 10 | 11 | | 22 | 23 | 24 | 25 | 26 | |
| nt | st | ft | lt | nd | | ff | x | ng | st | lt | |
| lf | nk | ng | ck | x | | ll | ck | nk | ss | mp | |
| ss | ll | zz | sh | th | | lf | ch | nd | zz | ll* | |
| ch | ff | mp | nd* | ll* | | ft | sh | nt | th | nt* | |
| Med | | | | | | Med | | | | | |
| 12 | 13 | 14 | | | | 27 | 28 | 29 | | | |
| a_e | ai | ay | | | | a_e | ee | ea | | | |
| oa | o_e | i_e | | | | o_e | ay | oa | | | |
| u_e | ee | ea | | | | i_e | u_e | ai | | | |
| e | i | u | | | | i | u | e | | | |

In the beginning levels, there are two kinds of trials: regular and feedback. In a regular trial, a new stimulus item is presented and the user makes an initial response. If a regular trial is failed, the user will have as many as two feedback trials (additional attempts at the same item). In the advanced levels, each stimulus item is paired with a variable number of correct responses. Each user response constitutes a trial. When a new grid is presented, the user can have up to 5 regular trials. If a trial is failed, the grid will be represented up to two times, and all trials are learning trials. Learning trials never count for progression, and are awarded fewer points.

In the advanced levels (Family Matches) several words from the same "word family" will be presented simultaneously, using a single stimulus stem, and a grid of response options. Small grids will have 4 response options including a random number of between 1 and 2 correct responses. Large grid will have 9 response options, including a random number of between 1 and 5 correct responses. Each of the 81 grids (or word families) will be presented, in random order, at both the small grid and large grid levels.

Figure 33:
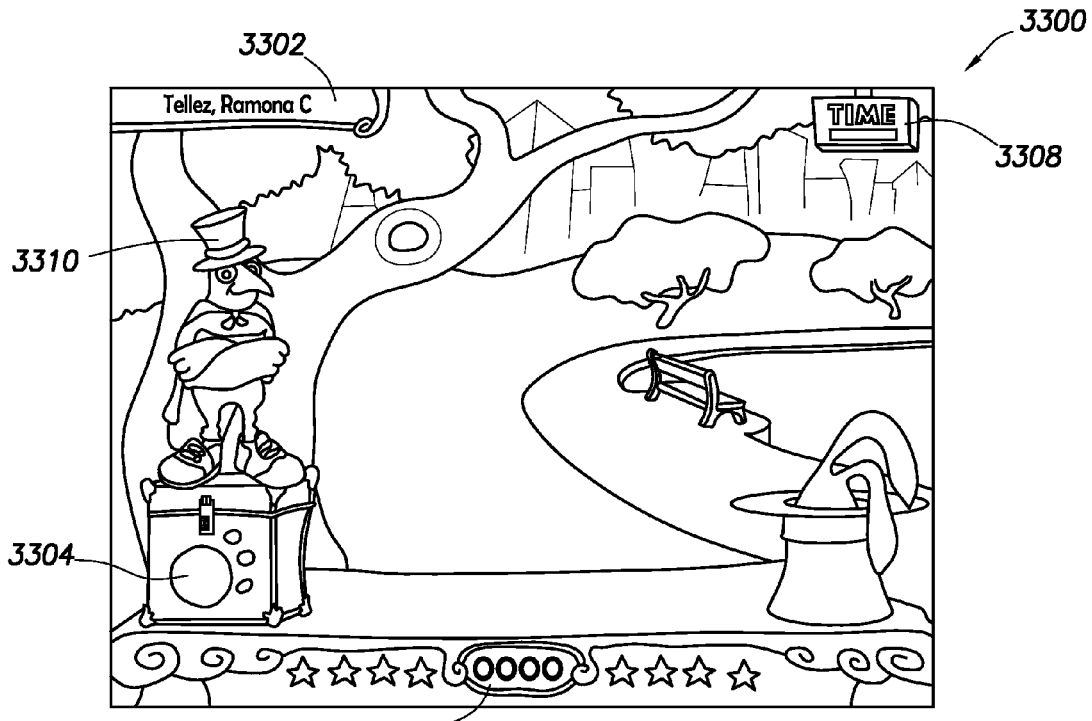
FIG. 33 is a screen shot at the beginning of the exercise Magic Bird.

Referring now to FIG. 33, a screen shot 3300 is shown of an initial screen in the exercise Magic Bird. The screen 3300 includes elements similar to the other exercises described above including a student indicator 3302, a Paw select 3304, a score indicator 3306, and a time indicator 3308. In addition, the screen 3300 includes a Magic Bird 3310. The Magic Bird 3300 deals out cards (not shown) which will be used to implement the method of the present invention.

Figure 34:
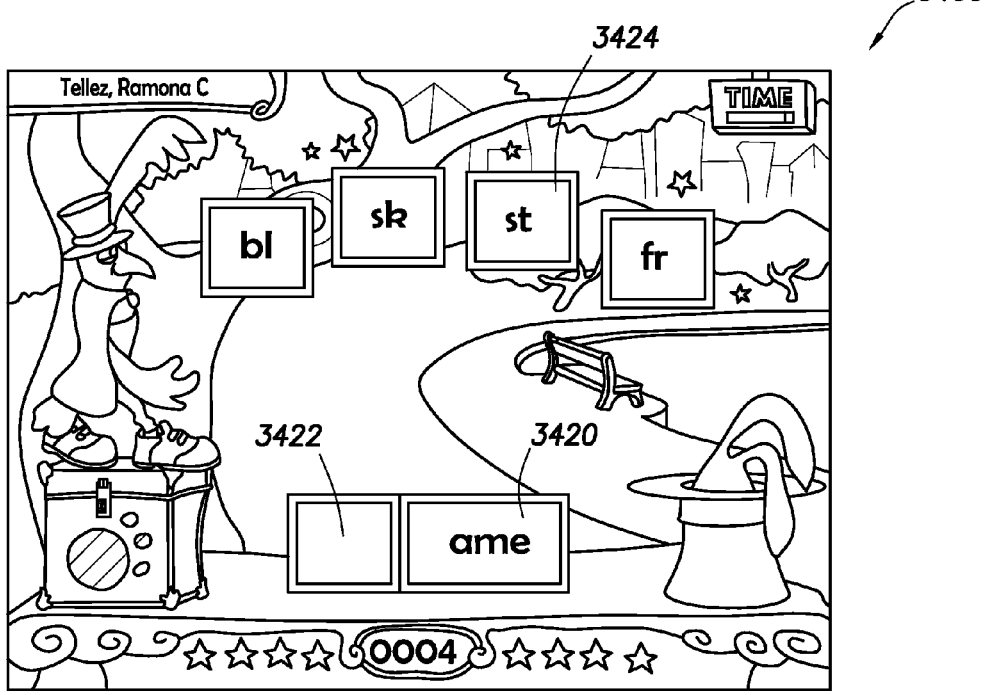
FIG. 34 is a screen shot in Magic Bird of a target letter "st" being selected to spell the word "stock".

Referring now to FIG. 34, a screen shot 3400 is shown of a trial within the exercise. In this instance, a first word has already been presented, graphically and aurally, which rhymes with the word "stock". Then, the target word "stock" is presented aurally, and the end part of the word "stock" is presented in card 3420 as "ock". A blank card 3422 is provided as a space to hold a selected card from one of the four cards 3424. In this instance, the card "st" should be selected to spell the word "stock". If the student selects "st", a ding is played, the card "st" is placed on top of the blank card 3422, and the word is combined together into a single card to illustrate a correct match. Additionally, the student receives points for the correct selection.

Figure 35:
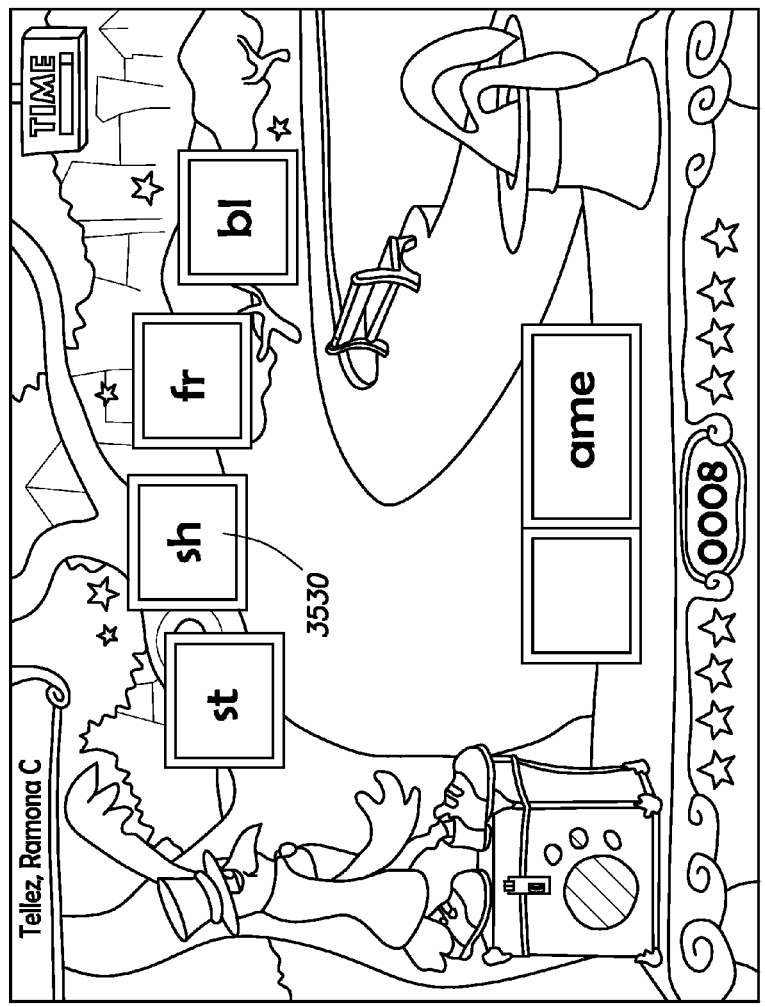
FIG. 35 is a screen shot in Magic Bird illustrating a grayed out card "sh" which was selected incorrectly, when the target word was "frame".

Referring now to FIG. 35, a screen shot 3500 is shown illustrating an incorrect selection during a trial. More specifically, the target word that has been aurally presented is the word "frame". In the trial, the student incorrectly selected the card "sh" 3530. When a student selects an incorrect card, a "thunk" is played, the card is grayed out, and the student is given another opportunity to make a correct selection. Further, if the student has forgotten the word s/he is intended to spell, s/he may re-select the Paw and have the target word aurally presented again. If the student makes an incorrect selection, and/or if the student chooses to replay the target word, points may be awarded, but further selections will not count towards progression in the game.

Figure 36:
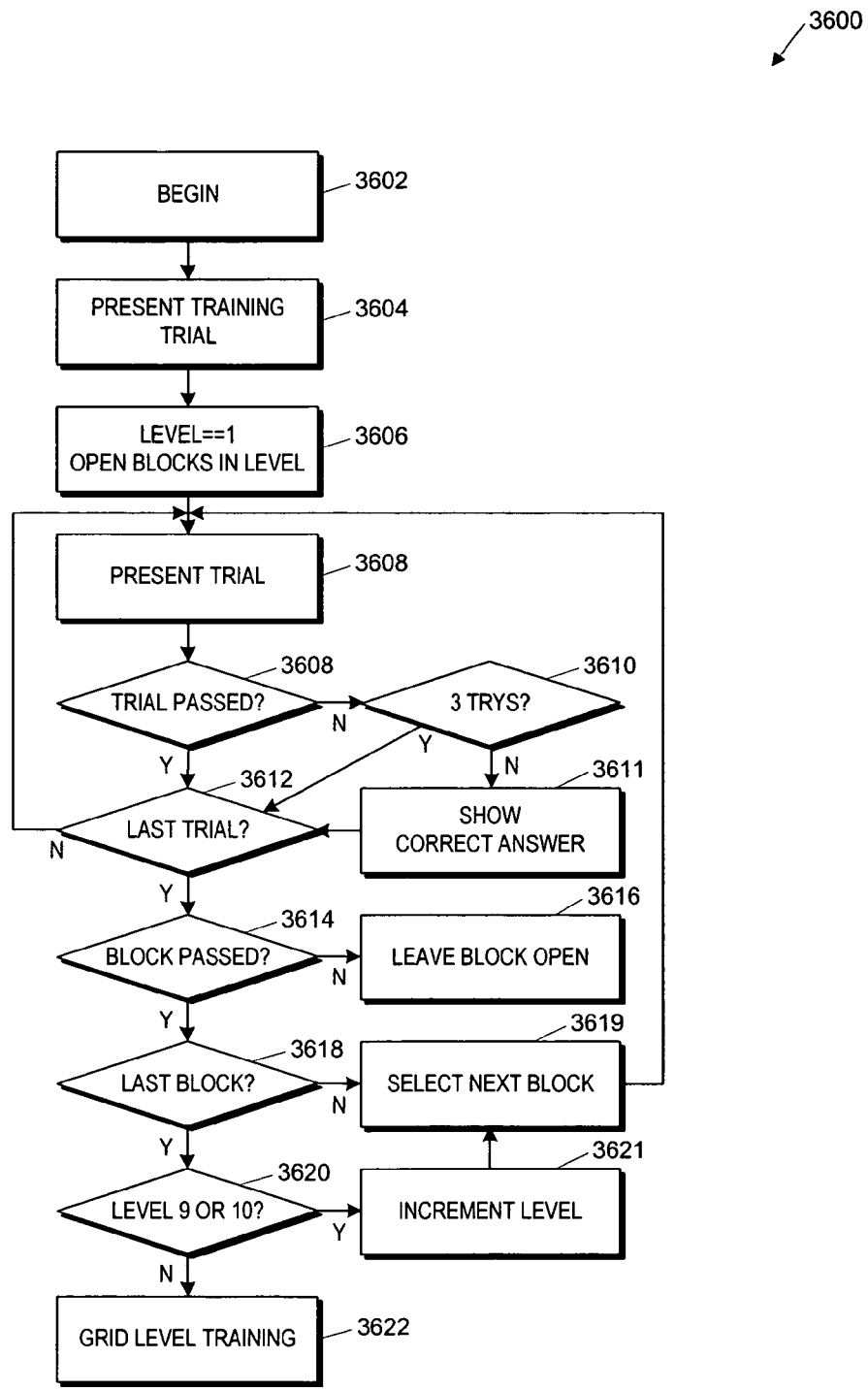
FIG. 36 is a flow chart illustrating the method of the exercise Magic Bird.

Referring now to FIG. 36, a flow chart 3600 is shown illustrating the method of the present invention. The method will utilize the below table to show the flow through the exercise Magic Bird, for the stimulus set provided in Appendix A.

| Level | Mode | Spelling cat. | Foils | Blocks | Items | Grids | Size | Min. Trials |
|---|---|---|---|---|---|---|---|---|
| 1 | T. Pairs | Initial | easy | 6 | 120 | — | — | 120 |
| 2 | T. Pairs | Final | easy | 5 | 100 | — | — | 100 |
| 3 | T. Pairs | vowel | easy | 3 | 60 | — | — | 60 |
| 4 | T. Pairs | morph. ending | easy | 1 | 20 | — | — | 20 |
| 5 | T. Pairs | initial | hard | 6 | 120 | — | — | 120 |
| 6 | T. Pairs | final | hard | 5 | 100 | — | — | 100 |
| 7 | T. Pairs | vowel | hard | 3 | 60 | — | — | 60 |
| 8 | T. Pairs | morph. ending | hard | 1 | 20 | — | — | 20 |
| 9 | F. Matches | mixed | — | — | — | 81 | small | ~122 |
| 10 | F. Matches | mixed | — | — | — | 81 | large | ~243 |

The method begins at block 3602 and proceeds to block 3604.

At block 3604, an initial training is provided, similar to that provided in the exercise Magic Rabbit. That is, a word is presented graphically and aurally, then split apart, then a rhyming word is presented aurally, and the student is required to spell the presented word by selecting the appropriate missing letter(s). In Magic Bird, however, the student is not required to drag the letter to the open space. Rather, the student is simply required to click on the letter. Flow then proceeds to block 3606.

At block 3606, the level is set equal to 1, and all the blocks for that level are opened. Flow then proceeds to block 3608.

At block 3608, one of the open blocks at the current level is selected, and a trial is presented for that block. Flow then proceeds to decision block 3608.

At decision block 3608, a determination is made as to whether the student correctly spelled the target word. If s/he did, flow proceeds to decision block 3612. If s/he did not, then flow proceeds to decision block 3610.

At decision block 3610, the student is given three opportunities to select the correct spelling of the target word. As above, if an incorrect letter(s) is selected, they are grayed out, and the remaining letters are available to choose from. If the student correctly spells the word in 3 tries or less, flow proceeds to decision block 3612. Otherwise, flow proceeds to block 3611.

At block 3611, the correct answer is shown. Flow then proceeds to decision block 3612.

At decision block 3612, a determination is made as to whether all of the trials in the present block have been presented. First, the present trial is marked complete. Then, if other trials remain, flow proceeds back to block 3608 for presentation of another trial. But, if all trials in the present block have been presented, flow proceeds to decision block 3614.

At decision block 3614 a determination is made as to whether the student has successfully passed the block. In one embodiment, the student is required to pass 90% of the trials in a block, but other measures of success may be used. The student is given three opportunities to pass the present block. If the student has not passed the block, flow proceeds to block 3616. Otherwise, flow proceeds to decision block 3618.

At block 3616, as in the other exercises, the present block is left open, and will be repeated at the end of the exercise. That is, before completed the exercise, the student should pass all of the blocks at all levels. But, if they are unable to do so, after three attempts, the block is left open, and will be returned to on another day, after completing the other blocks.

At decision block 3618, a determination is made as to whether the present block is the last block at the current level. If it is not, flow proceeds to block 3619. However, if it is the last block in the current level, flow proceeds to decision block 3620.

At block 3619, the present block is closed, and the next block in the current level is selected for training. Flow then proceeds back to block 3608 for presentation of a trial in the new block.

At decision block 3620, a determination is made as to whether the next level is level 9 or 10. If it is not, flow proceeds to block 3621. But, if the next level is level 9 or 10, flow proceeds to block 3622.

At block 3621, the level is incremented. Flow then proceeds to block 3619 for selection of a block in the next level.

At block 3622, a different training is presented for levels 9 and 10. In levels 9 and 10, several words from the same "word family" are presented simultaneously, using a single stimulus stem, and a grid of response options is provided. Small grids have 4 response options including a random number of between 1 and 2 correct responses. A large grid will have 9 response options, including a random number of between 1 and 5 correct responses. Each of the 81 grids (or word families) are presented, in random order, at both the small grid and large grid levels. Each grid will be evaluated for 100% correction to pass. Failed grids are presented up to 2 more times at the end of the level.

As in the above exercises, after the student has completed the process shown in FIG. 36, all open blocks are repeated until successfully passed. At that point, the exercise ends.

Program Set—Reading 1

Exercise—4: Bedtime Beasties

In the exercise Bedtime Beasties, the goal is to improve sentence comprehension, vocabulary skills, and reading for meaning. This exercise uses the "cloze task," in which a written and aurally presented sentence has a word missing. From four response options, the student should select the correct picture, word, upper or lower case letter, or punctuation mark to complete the sentence.

More specifically, the student is asked to show that he or she understands the meaning of a sentence by completing a doze (fill-in-the-blank) task. Vocabulary covered constitutes a core set of nouns including foods, animals, clothing, classroom items, and modes of transportation. End of sentence punctuation and the capitalization of initial words, names, and the pronoun "I" are also covered in this exercise. Participation builds vocabulary skills, knowledge of punctuation and capitalization rules, working memory, and awareness of sentence structure. Brief passages and individual sentences are used to provide contexts, with both fiction and non-fiction included. As the student gains mastery, sentence length increases and reading supports (e.g., voice-over, pictures) are reduced. Many of the decoding/spelling words and sight words taught in other exercises are presented here, in the context of sentences that demonstrate their meanings and syntactic roles.

In operation, a sentence is presented (text+aural or just text) with a blank indicating where a word is missing. The four response options are presented then in an area below the sentence The student selects the correct word or picture+word to complete the sentence. Granny elephant reads Baby elephant a story. The sentences are presented on a window shade, and the responses are available at the bottom of the screen. The sentences vary in length, depending on level (range: 4-19 words; mean: 11 words). Some sentences stand alone, and others are presented in sequences making up a brief fiction or non-fiction passages. Passages are 4, 5, or 6 sentences long. To help the student know whether they are reading part of a story or a stand alone sentence, there will be a passage length indicator at the bottom of the window shade. The passage length indicator will show a row of "page" icons mirroring the number of sentences (1, 4, 5, or 6), and highlighting the position of the current sentence within the passage.

The scope of the words includes mostly nouns, with a few attributes, prepositions, and verbs. It also includes punctuation and capitalization. Levels of difficulty are created by manipulating Text type (story and single-sentence), Length of sentence (short [mean: 8.1] and long [mean: 14.5]), Response type (picture+text, text-only, capitalization, punctuation), Stimulus type (aural+text and text-only). After the student clicks the OR button, a sentence with a missing word or punctuation will appear on screen, along with four response options. If there is aural presentation, the blank created by the missing word is marked by a "blank" sound effect and a visual highlighting of the blank marker. The student selects the correct word or word+picture from the four response options to complete the sentence.

Progression:

Terms:

Level: Determined by stimulus type, response type, text type, and sentence length.

Unit: A unit is always the smallest group of trials to be evaluated for advancement. In this case the unit consists of all the trials in a category of a given level.

| STIMULUS TYPE: | |
|---|---|
| 1. Aural + Text | Stimuli presented aurally and as text |
| 2. Text | Stimuli presented in text-only format; very easy to read |

| RESPONSE TYPE: | |
|---|---|
| 1. Pictures/Text | Responses are pictures with text |
| 2. Text | Responses are easy sight words, clearly wrong foils |
| 3. Punc/Cap | Responses are letters, words, punctuation marks |

| CONTENT TYPE: | |
|---|---|
| 3. Stories | Multiple items that create a passage - presented in a block Passages (stories) are presented in random order. |
| 4. One-liners | Facts, puzzles, etc. - presented in random order |

| STIMULUS LENGTH: | |
|---|---|
| 1. Short | Sentences are 10 words or less (<=9 for text sentences) |
| 2. Long | Sentences are 13 words or more (>=11 for text sentences) |

| Difficulty levels: Overview | | | | | |
|---|---|---|---|---|---|
| Stimulus Type | Foil Type | Content Type | Length | Difficulty Level | Total Items |
| Aural + Text | Pictures + Text | Stories | Short | 1 | 20 |
| | | | Long | 2 | 20 |
| | | One-Liners | Short | 3 | 20 |
| | | | Long | 4 | 20 |
| | Text | One-Liners | Short | 5 | 20 |
| | | | Long | 6 | 20 |
| | Punc/Cap | One-Liners | Short | 7 | 20 |
| | | | Long | 8 | 20 |
| Text | Pictures + Text | Stories | Short | 9 | 20 |
| | | | Long | 10 | 20 |
| | Text | One-Liners | Short | 11 | 20 |
| | | | Long | 12 | 20 |
| | | | | | 240 |

Figure 37:
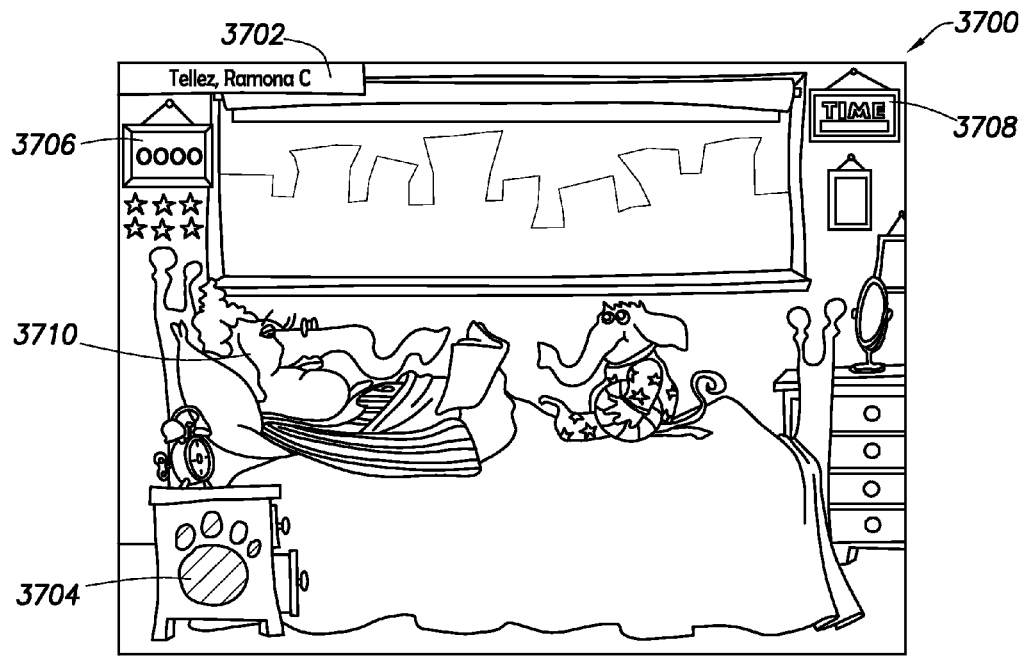
FIG. 37 is a screen shot at the beginning of the exercise Bedtime Beasties.

Referring to FIG. 37, a screen shot 3700 is shown of an initial screen in the exercise Bedtime Beasties. As in the other exercises, this exercise includes a student indicator 3702, a Paw select 3704, a score indicator 3706, and a time indicator 3708. In addition, Granny 3710 is provided to read stories to the baby elephant.

Figure 38:
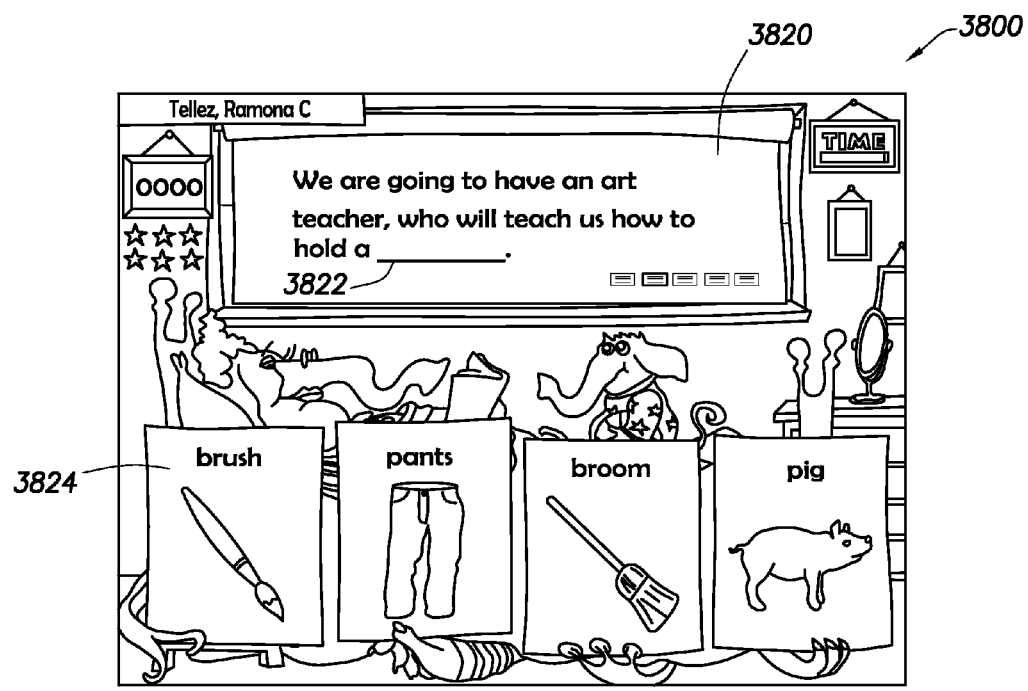
FIG. 38 is a screen shot in Bedtime Beasties during a trial, indicating correct selection of a target word.

Referring now to FIG. 38, a screen shot 3800 is shown of a trial within the exercise. After a student selects the Paw, a shade 3820 unfolds and Granny reads a sentence from a story. Somewhere in the sentence is a blank 3822 that the student is required to fill in. Beasties from under the bed present a number of options 3824 to complete the sentence. In this instance, the correct word to complete the sentence is brush.

Figure 39:
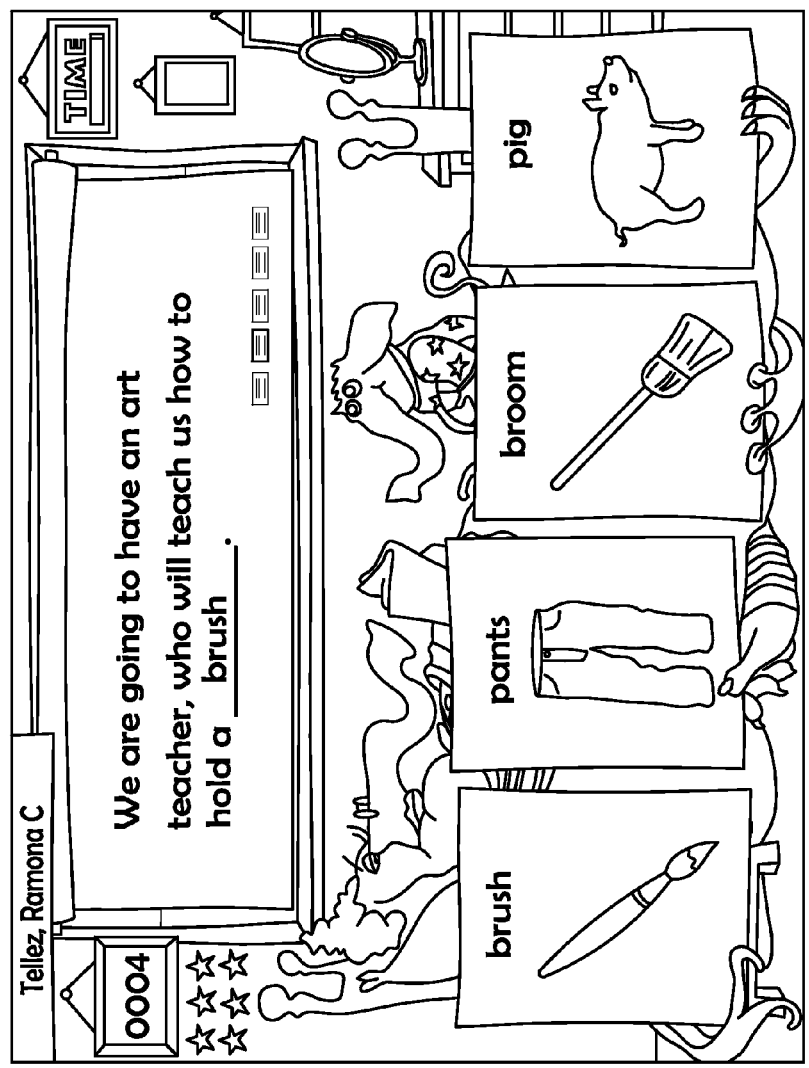
FIG. 39 is a screen shot in Bedtime Beasties after the student has correctly selected the target word "brush".

Referring now to FIG. 39, a screen shot 3900 is shown illustrating the correct selection made in FIG. 38. More specifically, the correct answer selected by the student is placed into the sentence, and the correct tile is highlighted to show the correct answer. As in the other games, a "ding" is played, and the score is incremented. If an incorrect answer is selected, a "thunk" is played, and the correct answer is shown.

As shown above, there are twelve levels within Bedtime Beasties, varying in difficulty between the length of the sentences and/or stories. In addition, in levels 1-8, the stimulus provided to the student is both aural and graphical (text), whereas in levels 9-12, the stimulus provided is text only.

Figure 40:
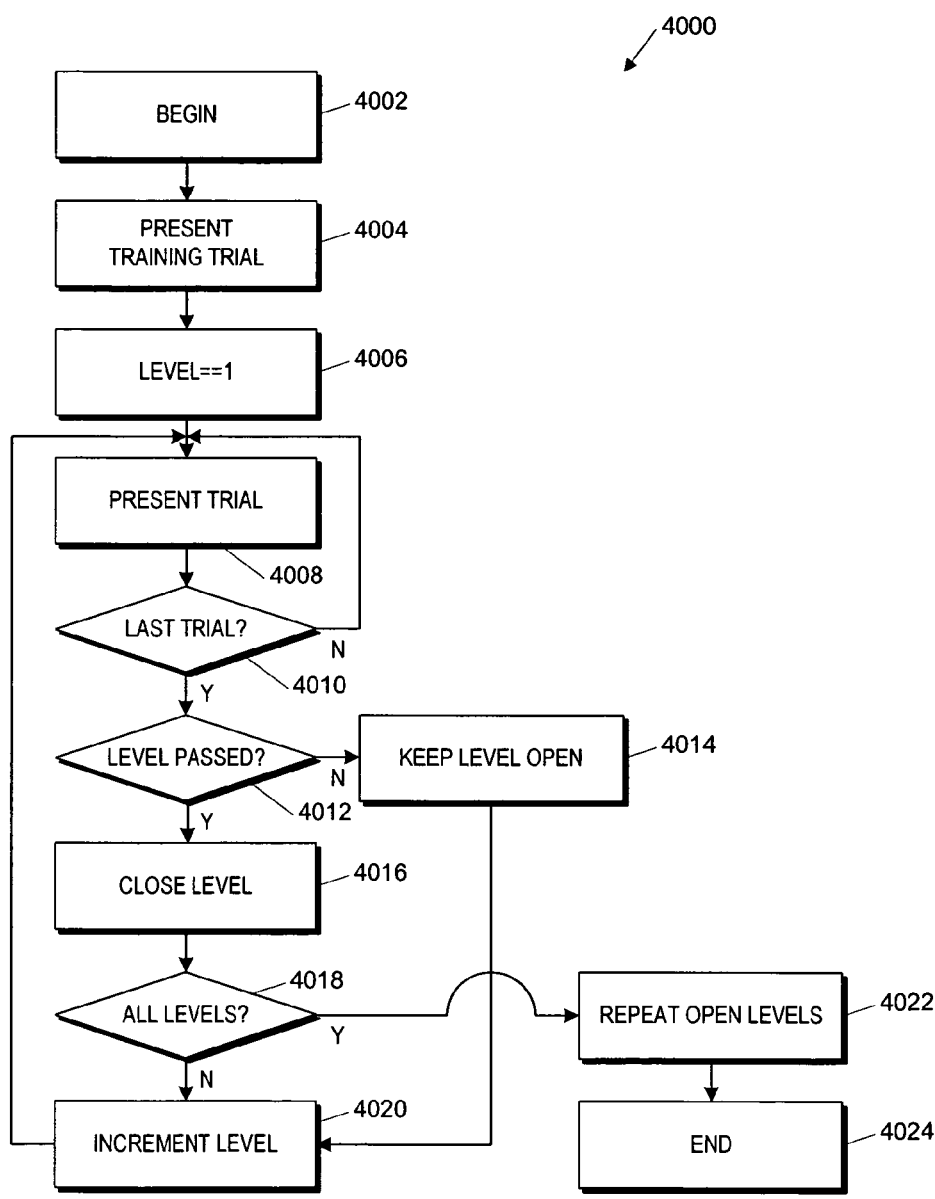
FIG. 40 is a flow chart illustrating the method of the exercise Bedtime Beasties.

Referring now to FIG. 40, a flow chart 4000 is provided illustrating the method of the exercise Bedtime Beasties. Flow begins at block 4002 and proceeds to block 4004.

At block 4004 a training trial is presented. Flow then proceeds to block 4006.

At block 4006, the level for training is set equal to 1. Flow then proceeds to block 4008.

At block 4008, a trial is presented to the student. As above, this indicates that a sentence (or story) is read to the student, with or without pictures depending on the level, and the student is required to fill in the blank. The students correct or incorrect response is recorded. Flow then proceeds to decision block 4010.

At decision block 4010, a determination is made as to whether all trials within a level have been presented. If not, flow proceeds back to block 4008 for presentation of another trial. If the last trial in a level has been presented, flow proceeds to decision block 4012.

At decision block 4012, a determination is made as to whether the student has passed a level. In one embodiment, the student is required to correctly respond to 90% of the trials. Since each level has 20 trials, the student should correctly respond to 18 out of 20 trials. They are given three opportunities to pass each level. If they do not pass the first time, the level is repeated. If not passed on the 2nd try, the level is repeated. If not passed on the 3rd try, flow proceeds to block 4014. If however, the student passes the level, flow proceeds to block 4016.

At block 4014, the level is kept open to allow the student to retry the level at the end of the exercise. Flow then proceeds to block 4020.

At block 4016, the present level is closed. Flow then proceeds to decision block 4018.

At decision block 4018 a determination is made as to whether the student has passed all levels in the exercise. If not, flow proceeds to block 4020. If s/he has, then flow proceeds to block 4022.

At block 4020, the level is incremented. Flow proceeds back to block 4008 for presentation of a trial within the new level.

At block 4022, all levels have been completed, but if there are any levels that were not passed, and thus still open, they are repeated. After those are passed, flow proceeds to block 4024 where the exercise ends.

phology are covered. Both individual sentences and short passages (original fiction and nonfiction) are used for the context sentences. One longer passage is also included, that gives an informal lesson on grammatical concepts such as nouns & verbs, vowels & consonants, compound words, and syllables. After the student clicks the OR button, a sentence with a missing word, letter, or punctuation will appear on screen. (In levels 1 and 2, the sentences will also be presented aurally.) Four choices to complete the sentence also appear on screen. (In levels 1 and 2, the responses do not appear until the aural presentation is complete. In all other levels, the responses appear simultaneously with the stimulus sentence.) The student selects the correct choice to complete the sentence. The student selects from the four choices to complete the sentence. Some sentences stand alone, and others are presented in sequences making up a fiction or non-fiction passages. Most passages are just 5 or 6 sentences long, but one passage is 40 sentences long. To help the student know whether they are reading part of a story or a stand alone sentence, there will be a passage length indicator at the bottom of the window shade. The passage length indicator will show a row of "page" icons mirroring the number of sentences (1, 5, 6, 8, or 12), and highlighting the position of the current sentence within the passage. With respect to re-entry and the passage length indicator, the 40 sentence passage is broken into 4 "chapters" of 8 or 12 sentences (the 4 chapters will always be presented in sequence).

Content overview grid:

| Category | Sub Cat | Level | Stimulus Type | Linguistic Target | Block Across Levels | Total Items |
|---|---|---|---|---|---|---|
| Vocabulary | V1 | 1 | Aural + Text | Top 200 high frequency words | No | 20 |
|  | V2 | 2 | Aural + Text | Top 200-400 high frequency words | No | 20 |
| Usage: | U1 | 3 | Text | Capitalization: Initial word | Yes | 20 |
| Punctuation | U2 | 4 | Text | Capitalization: Proper noun | Yes | 20 |
| & Capitals | U3 | 5 | Text | Punctuation: Sentence end | Yes | 20 |
| Syntax: | S1 | 6 | Text | Tacit: Easy foils (diff root) | No | 20 |
| Parts of | S2 | 7 | Text | Tacit: Hard foils (same root) | No | 20 |
| Speech | S3 | 8 | Text | Explicit labeling | No | 20 |
| Morphology: | M1 | 9 | Text | Plural noun/verb: regular | No | 20 |
| Inflectional | M2 | 10 | Text | Verb tense: regular | No | 20 |
|  | M3 | 11 | Text | Comparatives: regular (-er, -est) | No | 20 |
|  | M4 | 12 | Text | Plural noun/verb: irregular | No | 10 |
|  | M5 | 13 | Text | Verb tense: irregular | No | 10 |
|  | M6 | 14 | Text | Comparatives: irregular | No | 10 |
| Vocabulary | V1 | 15 | Text | Top 200 high frequency words | No | 20 |
|  | V2 | 16 | Text | Top 200-400 high frequency words | No | 20 |
|  |  |  |  |  |  | 290 |

Program Set—Reading 2

Exercise—4: Leaping Lizards

The goal of this exercise is to improve vocabulary skills, sentence comprehension, and knowledge of word and sentence structure. This exercise uses a type of cloze task, presenting written sentences that have a word, upper or lower case letter, or punctuation mark missing. The student should select the correct word, letter, or punctuation mark to complete the sentence from four choices.

The student is asked to show that he or she understands the meaning of a sentence by identifying which of four choices completes that sentence. Participation builds vocabulary and awareness of word and sentence structure. Basic rules in capitalization and punctuation, syntax, and inflectional mor- The sequence of progression will follow the content grid shown above, starting with level 1 and ending with level 16. Students who have made plateau-based transitions will return to uncompleted levels after being exposed to all of the content. Within a unit, items will be presented in random order unless they are part of a story. Items within a story should be presented together and in the specified sequence. The long (40 item) story that spans the two vocabulary sections is broken into 4 chapters (2 in each level, 8 or 12 items each). The two in each level chapters should be presented in the specified sequence.

Figure 41:
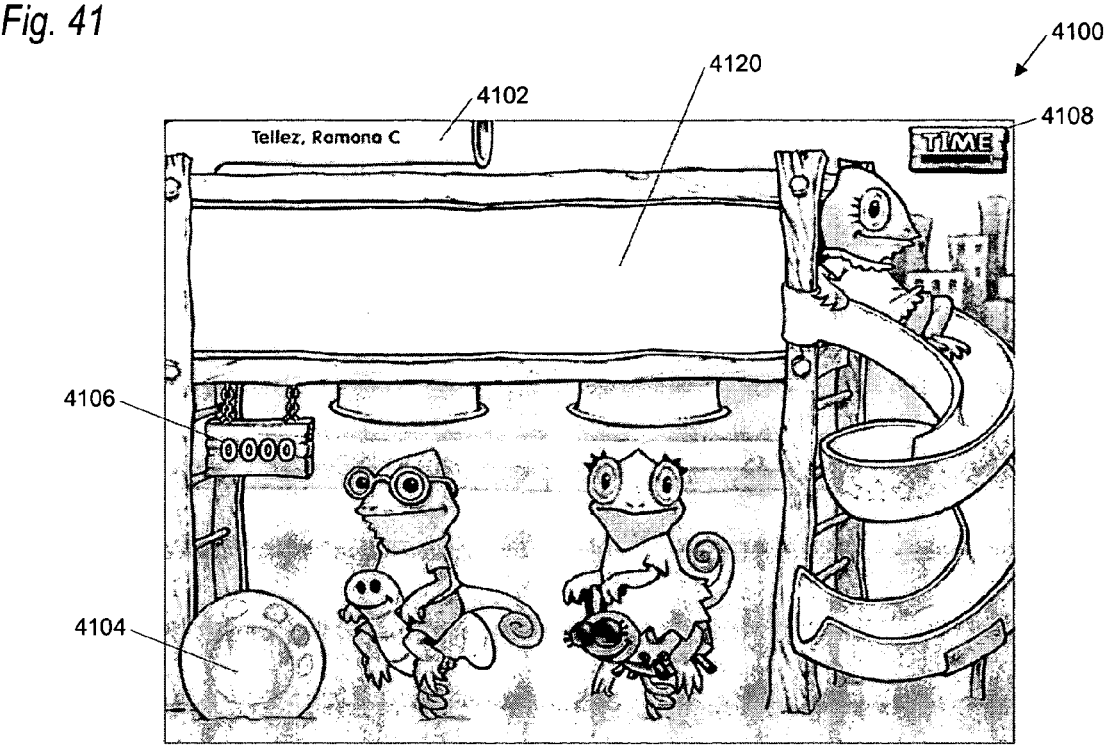
FIG. 41 is a screen shot at the beginning of the exercise Leaping Lizards.

Referring now to FIG. 41, a screen shot 4100 is shown of an initial screen in this exercise. Like the other exercises, this screen 4100 includes a student indicator 4102, a Paw select

4104, a score indicator 4106, and a time indicator 4108. In addition, the screen 4100 includes the side of a slide 4120 for presentation of sentences, which will be further illustrated below.

Figure 42:
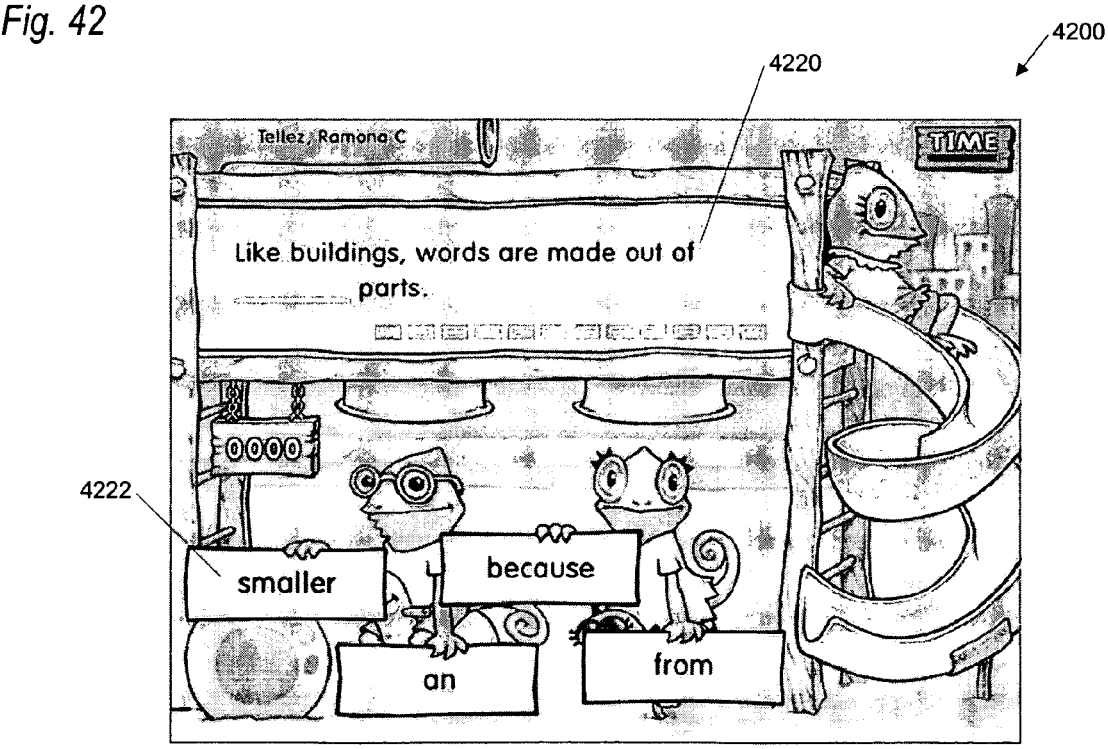
FIG. 42 is a screen shot in Leaping Lizards during a trial, indicating correct selection of a target word.

Referring now to FIG. 42, a screen shot 4200 is shown which is similar to that described with respect to Bedtime Beasties. A sentence 4220 is presented after a student selects the Paw. In levels 1 and 2, the sentence is presented aurally and textually. In levels 3-16, however, the sentences are presented textually only. Below the sentence 4220 are a number of choices 4222 that the student should select from to fill in the missing part of the sentence 4220. In this instance, the choice "smaller" is appropriate. If selected, it will be highlighted, and placed into the sentence 4220. If another choice is selected, the incorrect choice, and all other incorrect choices, will be grayed out, and the correct choice will be highlighted. As in the other games, a "ding" is played for a correct choice, and the score is incremented. If an incorrect choice is made, a "thunk" is played, and no points are awarded. The method of Leaping Lizards is essentially the same as that of Bedtime Beasties, with respect to progression through the various levels. However, it should be noted that the types of sentences utilized in Leaping Lizards include Capitalization, Syntax, and Morphological/Inflectional training, not present in Bedtime Beasties. A complete stimulus set for this exercise is found in Appendix A.

Program Set—Reading 1
Exercise—5: Buzz Fly

The goal of this exercise is to improve listening comprehension and working memory skills as measured by performance on multiple choice questions. In this exercise, the student listens to a passage and answers comprehension questions relating to each passage. The passages are presented on sheets of paper coming from the newsroom typewriter, and answer choices are presented by flies in the room. The passage is broken down into a number of "blocks" of text. The block is "read aloud" to the student and also presented as on-screen text. At the end of the block, the student should answer multiple choice question(s) to evaluate comprehension of that block. The questions are presented aurally and written, and the response choices are presented as pictures. After these questions, the student continues with subsequent blocks of text to complete the passage.

To begin a trial, the student clicks the OR button. The student is then presented with a block of text (written and aural). To help the student follow along with the aural presentation, the written text is synched to the audio with line-by-line highlighting (note: this is different than sentence-by-sentence). When a line of text is highlighted, the letters are black. All the other lines of text are non-highlighted, so the letters are in a lighter shade of gray. Once the last line of a block has been aurally presented, the text block disappears and the first question appears.

On a correct response, the response choice is aurally presented and the correct answer is highlighted in yellow. The points counter increases and the student hears a "ding" point by point. For example, if the student has 6 points and gets 3 more points for the trial they are on, rather than seeing the point total change from "6" to "9" and hearing one "ding", the student will see the point total change from "6" to "7" to "8" and to "9", with a "ding" for each point accumulated. The student then moves on to the next question of the block. If there are no more questions in the block to be answered, the OR becomes available. The student clicks the OR to move on to a new block.

On an incorrect response, the student will hear a "thunk". The correct answer is not revealed—that is, the student will probably have another chance to get it right. The incorrect choice will first display in the rollover state, then change to a grayed out state.

The questions are presented written and aurally. Questions are presented with regular bold text (as they are just one sentence). The responses are presented as pictures (no aural presentation unless correct selection is made). To help the student know where they are in a passage (and when a passage begins and ends), there will be a passage length indicator at the bottom of passage text display. The passage length indicator will show a row of "page" icons mirroring the number of blocks of text and highlighting the position of the current block within the passage.

A trial is evaluated as correct if the student clicks on the correct answer to a question the first time it is presented. A correct answer to a learning trial does not evaluate as correct for progression. To successfully pass a unit, the student should answer 8 out of 9 questions correctly (for a unit of 9) or 11 of 12 questions correctly for a unit of 12. Passages with 6 questions are grouped in pairs to make a unit of 12, passages with 9 questions are their own unit. Only the first response to every trial is evaluated. If a trial (question) is repeated in the form of a learning trial, the additional response is not evaluated for progression, though points are awarded on a correct response. If the student meets the criteria for passing the unit (answering the question correctly on the first try), the unit is closed. Otherwise, all failed units will be repeated at the end of the level. The student will have a total of 3 tries to pass each unit (not including learning trials), before moving on to the next level.

A table below illustrates advancement in this exercise through five difficulty levels. If one or more questions were responded to incorrectly, the student gets another opportunity to answer the question(s)s correctly before moving on to the next block. The block is displayed again. The student moves on to the question or questions about the block of text. The incorrect response previously chosen is inactive and displayed in a grayed out state. The student responds again. This continues until all the incorrectly answered questions have been presented again. If one or more of these were responded to incorrectly, the block is displayed again followed by the presentation of the incorrect question. This time both incorrectly chosen responses are inactive and displayed in a grayed out state. If the student makes an incorrect response at this point the correct answer highlights and there is a short delay before the next question is shown. The questions are not shown a fourth time. If a student has not met criteria for a unit (after 3 attempts, not including the learning trials), then the student plateau transitions to the next open unit in the progression. However, all failed units will be repeated at the end of the exercise until passed.

| Difficulty Level | Reading Rate (wpm) | Grade Level | Questions per Passage | Fiction Passages | Non-Fiction Passages | Passages | Questions |
|---|---|---|---|---|---|---|---|
| 1 | 90-115 | K | 6 | 6 | 2 | 8 | 48 |
| 2 | 90-115 | 1 | 6 | 2 | 6 | 8 | 48 |
| 3 | 115-140 | K | 9 | 2 | 2 | 4 | 36 |

| Difficulty Level | Reading Rate (wpm) | Grade Level | Questions per Passage | Fiction Passages | Non-Fiction Passages | Passages | Questions |
|---|---|---|---|---|---|---|---|
| 4 | 115-140 | 1 | 9 | 2 | 2 | 4 | 36 |
| 5 | 115-140 | 2 | 9 | 2 | 2 | 4 | 36 |
| Total: | | | | | | 28 | 204 |

The stimulus sets for this exercise are located in Appendix A.

Figure 43:
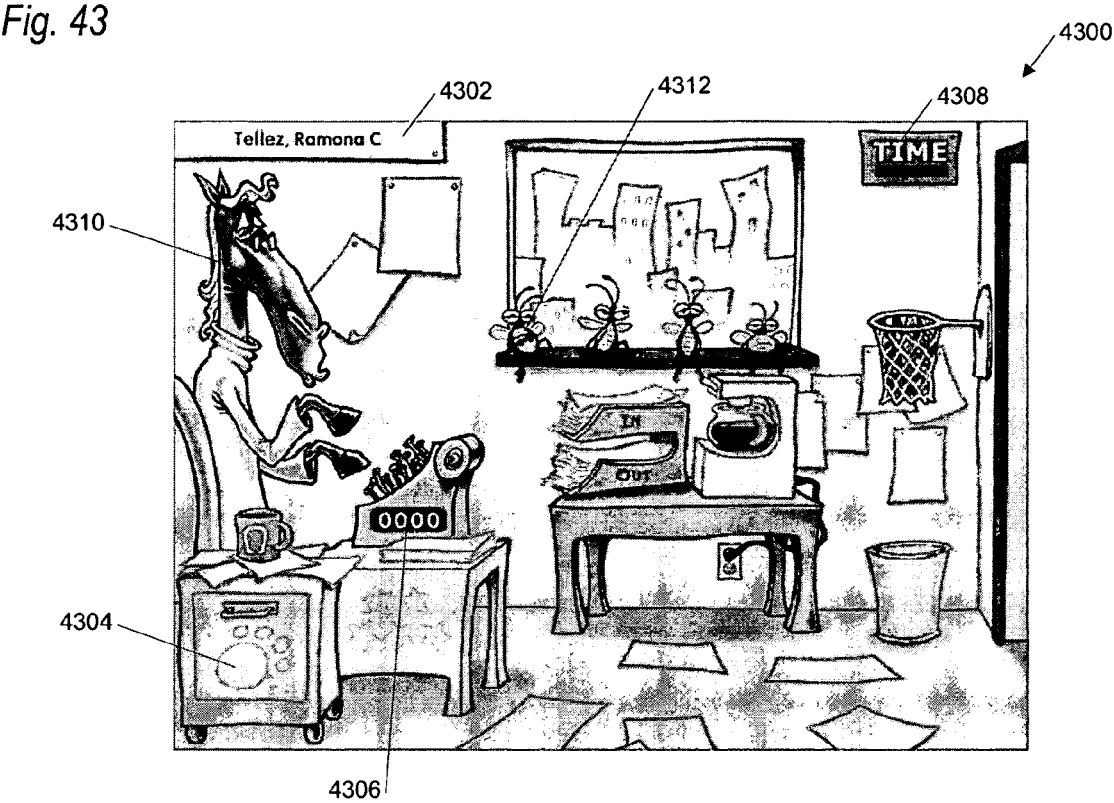
FIG. 43 is a screen shot at the beginning of the exercise Buzz Fly.

Referring now to FIG. 43, a screen shot 4300 is shown of an initial screen in the exercise Buzz Fly. As in the other exercises, the screen 4300 includes a student indicator 4302, a Paw select 4304, a count indicator 4306 and a time indicator 4308. In addition, a horse reporter 4310 is shown which will type the stories and present them to the student. Further, flies 4312 are provided to show the student the possible responses.

Figure 44:
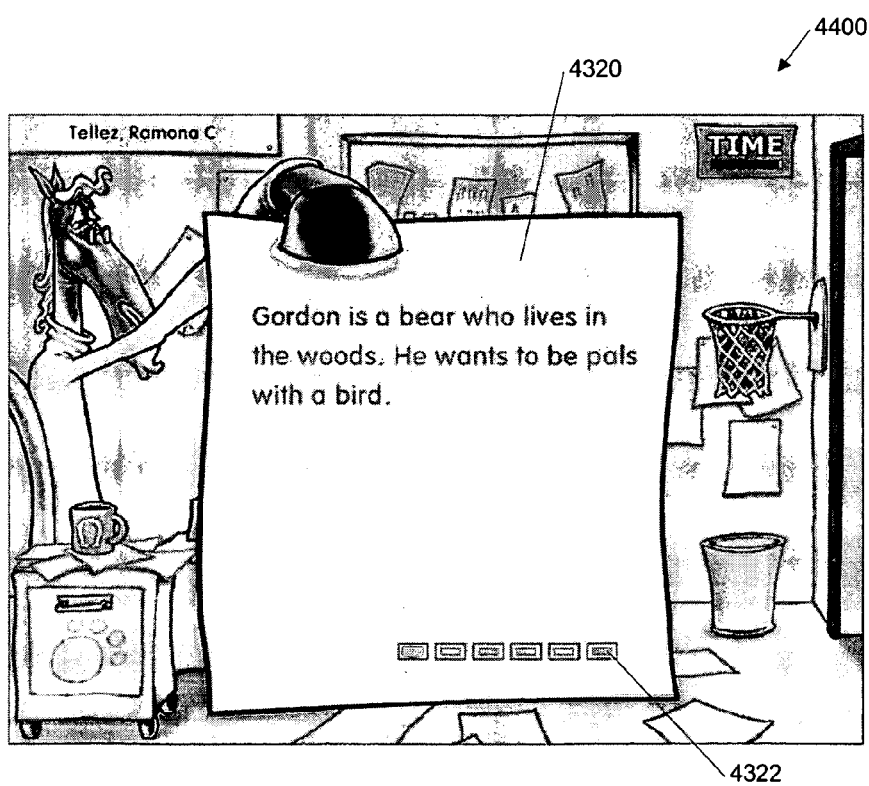
FIG. 44 is a screen shot in Buzz Fly during a trial, where a first passage is read to the student.

Referring now to FIG. 44, a screen shot 4400 is shown. This screen 4400 occurs after the student selects a trial by clicking on the Paw select 4304. The horse reporter 4310 presents part of a story 4320 to the student. At the bottom of the story 4320 is a progress indicator 4322 to show the student where in the story the presented part of the story is. The story 4320 is aurally presented to the student, a line at a time, with each line being highlighted as it is read.

Figure 45:
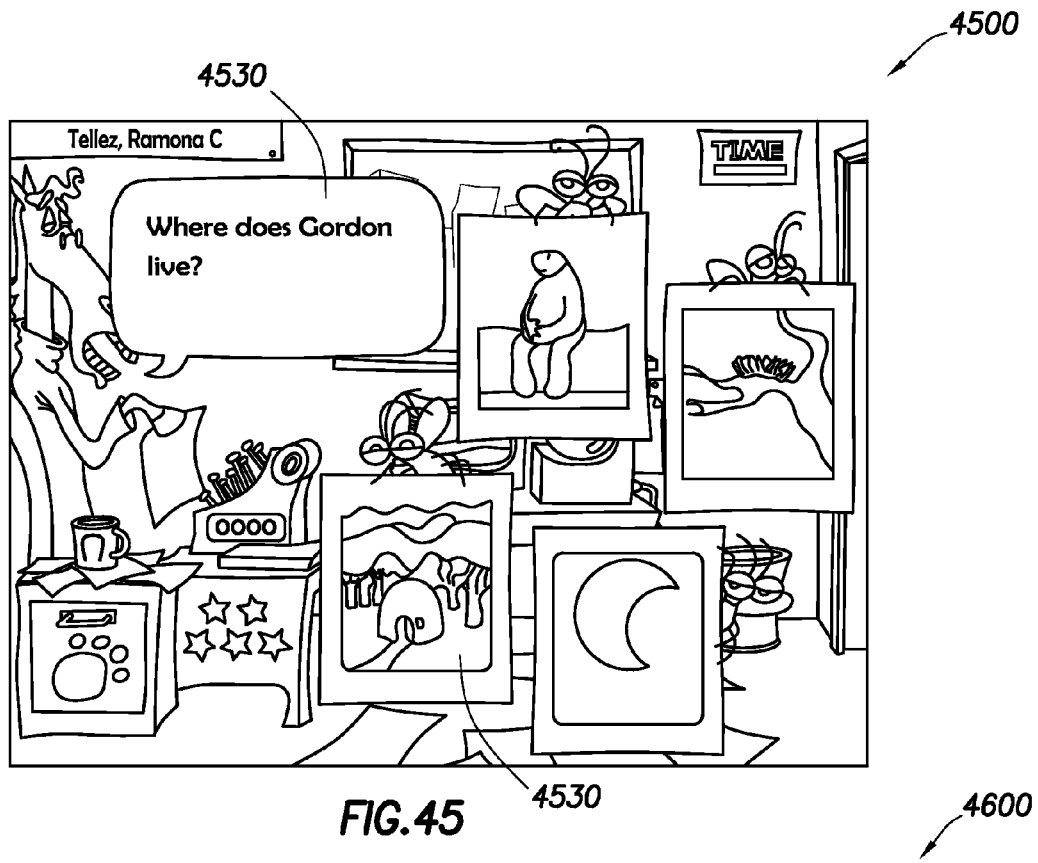
FIG. 45 is a screen shot in Buzz Fly during a trial, where a question is posed to the student, and the answer, along with three foils are presented.

Referring now to FIG. 45, a screen shot 4500 is shown. The screen 4500 occurs after the story shown in FIG. 44 is presented to the student. At this point, the horse reporter 4310 asks the student, aurally, and textually in balloon 4530, a question related to the story. The flies 4312 provide a number of answers 4530, graphically, to the student. In this screen 4500, the correct answer to the question 4530 is "in the woods". The picture 4530 in the lower left corner, that is highlighted (because the select cursor is over this answer), best illustrates the answer "in the woods". If the student selects this picture, the pictures 4530 disappear, and "dings" are played as the score increases.

Figure 46:
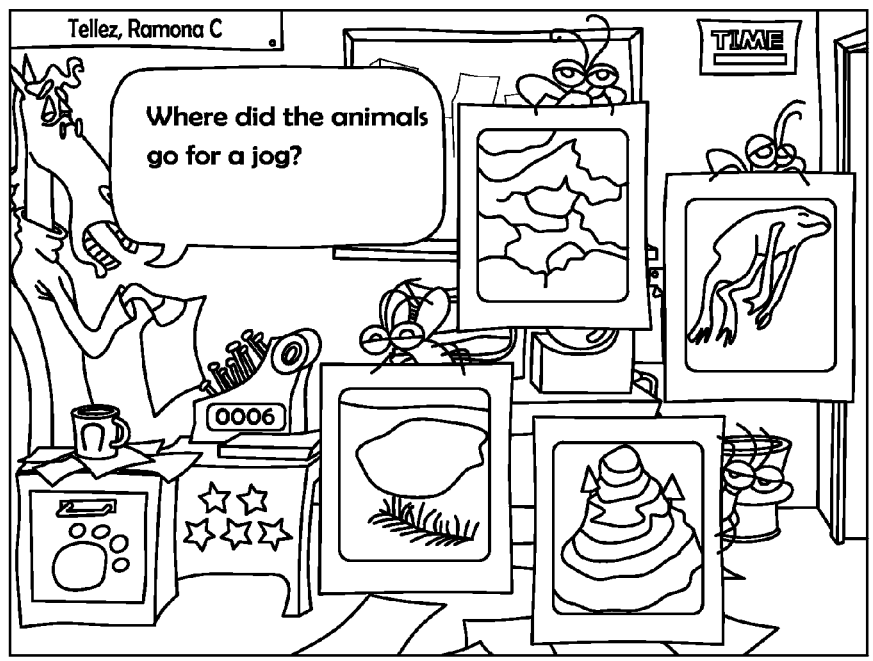
FIG. 46 is a screen shot in Buzz Fly during a trial, showing an incorrect answer grayed out, and other answer possibilities still showing.

Referring now to FIG. 46, a screen shot 4600 is shown after a student incorrectly answers a question. The correct answer is "in the fog" and is best illustrated by the picture in the upper left. However, the student selected the picture in the lower left. When s/he did, a "thunk" is played, and that answer is grayed out. The student then has another opportunity to select the correct answer.

Figure 47:
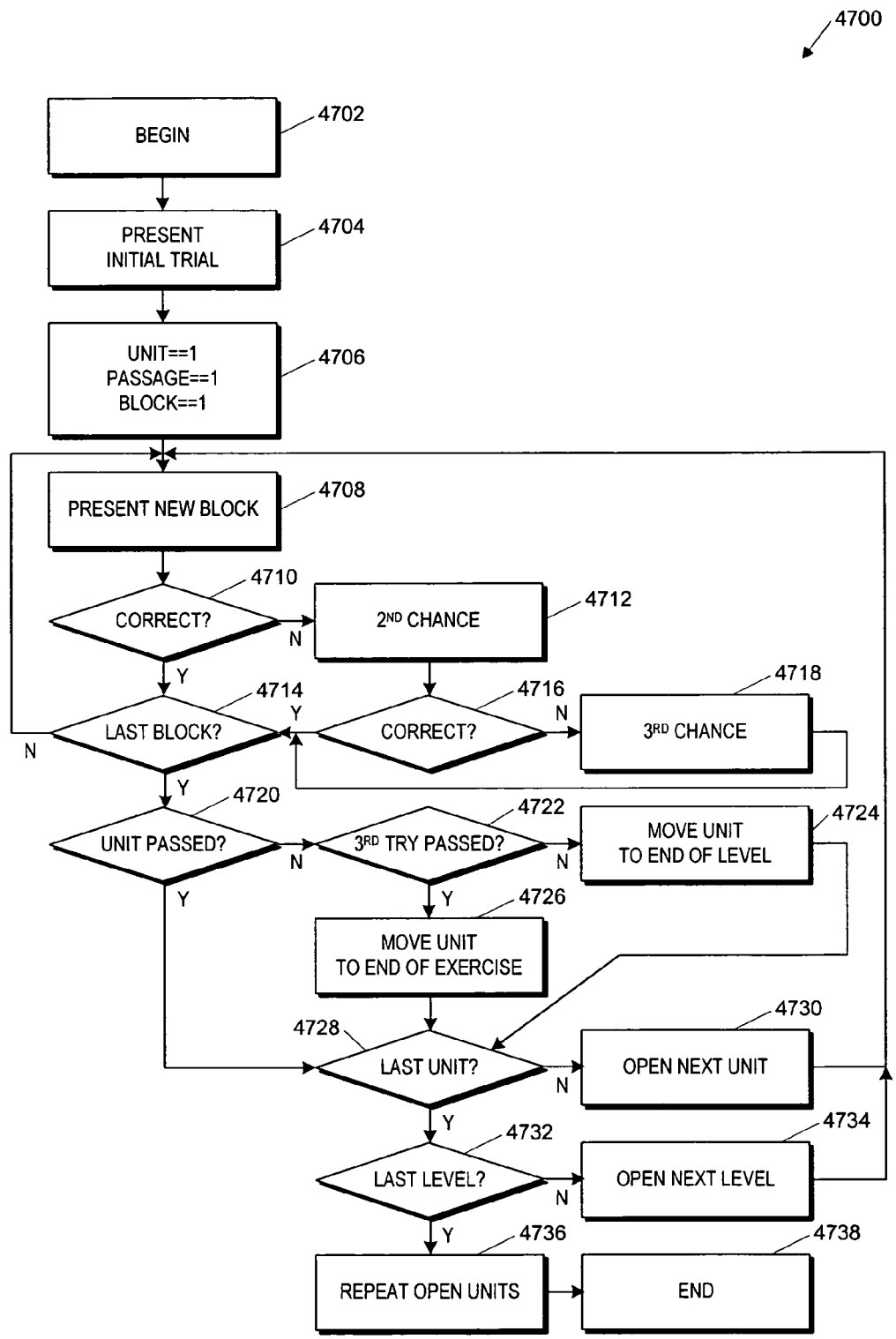
FIG. 47 is a flow chart illustrating the method of Buzz Fly.

Referring now to FIG. 47, a flow chart 4700 is shown illustrating the method according to the present invention. Flow begins at block 4702 and proceeds to block 4704.

At block 4704, an initial training trial is presented. The student is read instructions regarding the exercise, and a first story. Then s/he is presented answers to the story. Correct or incorrect answers in the trial are not counted towards progression. Flow then proceeds to block 4706.

At block 4706, the unit number is set to 1, the passage is set to 1, and the block is set to 1. In one embodiment, in levels 1 and 2, there are 2 passages per unit, and 4 units per level. There are thus 8 passages per level. Further, there are 6 blocks per passage, with 1 trial per block for a total of 48 trials per level. In levels 3-5 there is 1 passage per unit, and 4 units per level. Thus, there are 4 passages per level. Further, there are 6 blocks per passage, with 9 trials per passage, with either 1 or 2 trials per block. Thus, there is a total of 36 trials per level. Flow then proceeds to block 4708.

At block 4708, a block is presented. That is, a block is a portion of a passage, as shown above in FIG. 44. The block is presented aurally and textually. Then, the pictorial answers are provided, and the student responds. Flow then proceeds to decision block 4710.

At decision block 4710, a determination is made as to whether the student correctly responded to the block. If so, flow proceeds to decision block 4714. Otherwise, flow proceeds to block 4712.

At block 4712, the student is given a 2nd chance to correctly answer the question. Recall from FIG. 46, that the previous incorrect selection is grayed out. Flow then proceeds to decision block 4716.

At decision block 4716, a determination is made as to whether the student correctly responded to the question, on the 2nd try. If s/he did, flow proceeds to decision block 4714. If they did not, flow proceeds to block 4718.

At block 4718, the student is presented a 3rd chance of responded correctly (with two incorrect selections grayed out). Flow then proceeds to decision block 4714.

At decision block 4714, a determination is made as to whether the just completed block is the last block in the passage. If not, flow proceeds back to block 4708 for presentation of the next block in the passage. Otherwise, flow proceeds to decision block 4720.

At decision block 4720 a determination is made as to whether the student passed the unit. In one embodiment, to pass a unit, 11 out of 12 trials (in levels 1 and 2) and 8 out of 9 trials (in levels 3-5) are required to pass a unit. If the student passes a unit, flow proceeds to decision block 4728. If the student does not pass a unit, flow proceeds to decision block 4722.

At decision block 4722, the student is given 3 opportunities to pass a unit. That is, the unit is repeated twice more, following the flow of blocks 4708-4720. If they do pass the unit within three attempts, flow proceeds to block 4726. Otherwise, flow proceeds to block 4724.

At block 4724, the unit is moved to the end of the level. Flow then proceeds to decision block 4728.

At block 4726, the unit is moved to the end of the exercise, as in the other exercises described above. Flow then proceeds to decision block 4728.

At decision block 4728, a determination is made as to whether the present unit is the last unit in the level. If not, flow proceeds to block 4730. But, if the present unit is the last unit in the level, flow proceeds to decision block 4732.

At block 4730, the next unit in the present level is opened. Flow then proceeds back to block 4708 for presentation of the first block in the new unit.

At decision block 4732, a determination is made as to whether the present level is the last level (e.g., level 5) in the exercise. If it is, flow proceeds to block 4736. If it is not, flow proceeds to block 4734.

At block 4734, the next level in the exercise is opened. Flow then proceeds back to block 4708 for presentation of the 1st block in the 1st unit of the next level.

At block 4736, all of the levels have been completed. But, if the student was unable to pass any of the units, they are repeated until passed, in block 4736. Flow then proceeds to block 4738 where the exercise ends.

Program Set—Reading 2

Exercise—5: Dog Bone

The goal of this exercise is to improve a students listening comprehension, sentence and reading skills, and working memory skills as measured by performance on multiple choice questions. Students listen to passages while reading along, and demonstrate their comprehension by answering questions. They will also be asked to reread the same passages independently, and answer a new set of questions. "What," "where," "who," "when," and "how" type questions will be asked, along with "Why" questions, and questions about cause and effect. Some questions will focus on story elements such as plot, setting and characters. Questions about word or story ambiguities will also be asked. In addition to fiction and nonfiction passages, students will be presented with other types of informational material such as graphs and charts which they should interpret to answer questions. During the aural presentation of passages, the written text will also be presented, with line by line highlighting to help the student follow along. Questions will be presented intermittently throughout each passage, to maintain engagement and reduce memory demands. To build sustained attention and working memory, the length of the passage blocks between questions will increase as students progress through the exercise. To support comprehension and help students follow along in the text, the exercise begins with 1st grade level vocabulary and a slower aural presentation rate. Later in the exercise, the aural presentation rate is increased and vocabulary up to the 3rd grade level is used. Passages will be aurally presented at controlled reading rates, falling within optimum wpm ranges identified for each difficulty level. To develop comprehension skills for a variety of text types, both fiction and nonfiction passages are presented throughout the exercise.

This exercise has two modes. In Mode 1, the student listens to a passage and answers comprehension questions relating to each passage. The passage is broken down into a number of "blocks" of text. A block is "read aloud" to the student and also presented as on-screen text (highlighted to synch to the aural presentation). At the end of the block, the student should answer multiple choice question(s) to evaluate comprehension of that block. Unlike the Buzz Fly exercise, the response choices are presented as text and not as pictures. After answering one or two questions, the student continues with subsequent blocks of text to complete the passage. In Mode 2, the student reads the on-screen text (the passage blocks and the questions) with no aural presentation. Passage blocks in the Reading Mode are repeated from the Listening Mode. However, the Reading Mode contains different comprehension questions than the Listening Mode. To help the student know where they are in a passage (and when a passage begins and ends), there will be a passage length indicator at the bottom of passage text display. The passage length indicator will show a row of "page" icons mirroring the number of blocks of text and highlighting the position of the current block within the passage.

A trial is evaluated as correct if the student clicks on the correct answer to a question the first time it is presented. A correct answer to a question repeated as a "learning trial" does not evaluate as correct for progression.

To successfully pass a unit (a passage), the student should answer 10 or 11 of 12 questions correctly. More specifically, each passage contains 12 questions, 6 in "Mode 1" and 6 in "Mode 2." 5 of 6 correctly answered questions are required to pass Mode 1, 5 of 6 correctly answered questions are required to pass Mode 2. Only the first response to every trial is evaluated. If a trial (question) is repeated in a learning trial the additional response is not evaluated for progression, though points are awarded on a correct response. If the student successfully meets the criteria of a unit, the unit is closed. Otherwise, it will be repeated up to two more times at the end of the level.

To successfully pass a unit in Charts and Graphs, a student should answer 9 of 10 questions correctly. A unit consists of multiple charts, graphs, or tables of a specific type and a total of 10 questions.

The table below details the advancement from level to level.

| Difficulty Level | Reading Rate (wpm) | Vocab Grade Level | Questions per Passage | Fiction Passages | Non-Fiction Passages | Tables/Charts/Graphs | Passages | Questions |
|---|---|---|---|---|---|---|---|---|
| 1 | 115-140 | 1 | 12 | 4 | 2 | 0 | 6 | 72 |
| 2 | 115-140 | 2 | 12 | 2 | 4 | 0 | 6 | 72 |
| 3 | 140-165 | 1 | 12 | 2 | 2 | 0 | 4 | 48 |
| 4 | 140-165 | 2 | 12 | 1 | 1 | 0 | 2 | 24 |
| 5 | 140-165 | 3 | 12 | 1 | 1 | 0 | 2 | 24 |
| 6 | NA | 2 | 2-4 | 0 | 0 | 11 | 0 | 40 |
| Total: | | | | 10 | 10 | 11 | 20 | 280 |

All fiction passages within a level will be presented first, in random order. Nonfiction passages for the level will then be presented, also in random order. Tables and graphs are presented separately, at the end of the exercise. There are 4 units in the tables/charts/graphs portion. A unit consists of 2 or more tables/charts/graphs of the same type and 2 to 4 questions pertaining to each table/chart/graph. Each unit will have a total of 10 questions.

A student starts with an aural+text story (Mode 1) and if they pass it, would go on to the text-only version of the same story (Mode 2). If the student doesn't pass Mode 1, they transition to a different story in Mode 1. If the student fails while in Mode 2, s/he has to complete Mode 1 again when s/he returns to that story, before moving on to Mode 2.

Figure 48:
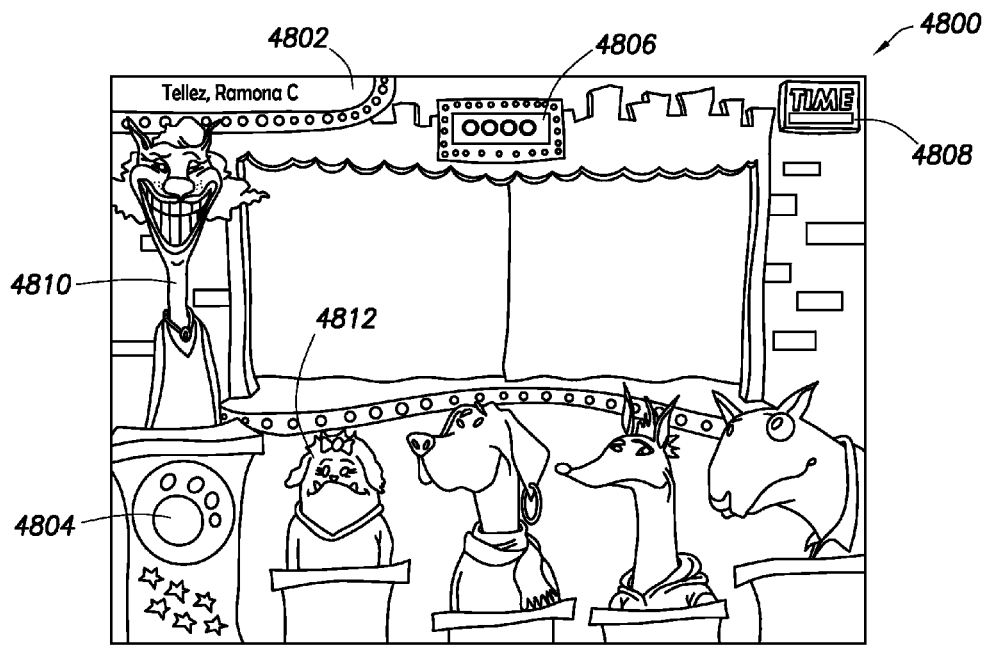
FIG. 48 is a screen shot at the beginning of the exercise Dog Bone.

Referring now to FIG. 48, a screen shot 4800 is shown of an initial screen within this exercise. Like in the other exercises, the screen 4800 includes a student indicator 4802, a Paw select 4804, a count indicator 4806, and a time indicator 4808. In addition the screen includes a Quiz dog 4810, and four contestants 4812.

Figure 49:
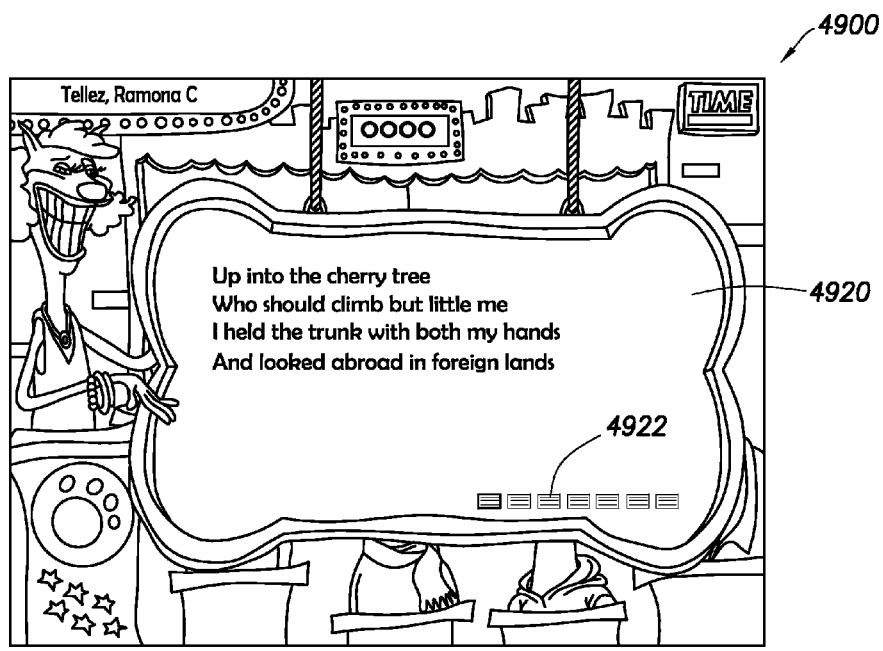
FIG. 49 is a screen shot in Dog Bone during a trial, where a first passage is presented to the student.

Referring now to FIG. 49, a screen shot 4900 is shown of a scene after the student begins a trial by selecting the Paw select 4804. A portion of a story 4920 is presented. In mode 1, as mentioned above, the story is presented textually, and aurally, with each line highlighted while it is being read. In mode 2, the story is presented textually only. At the bottom of the story 4920 is a progress indicator 4922 which indicates the place the present portion 4920 is within the entire story.

Figure 50:
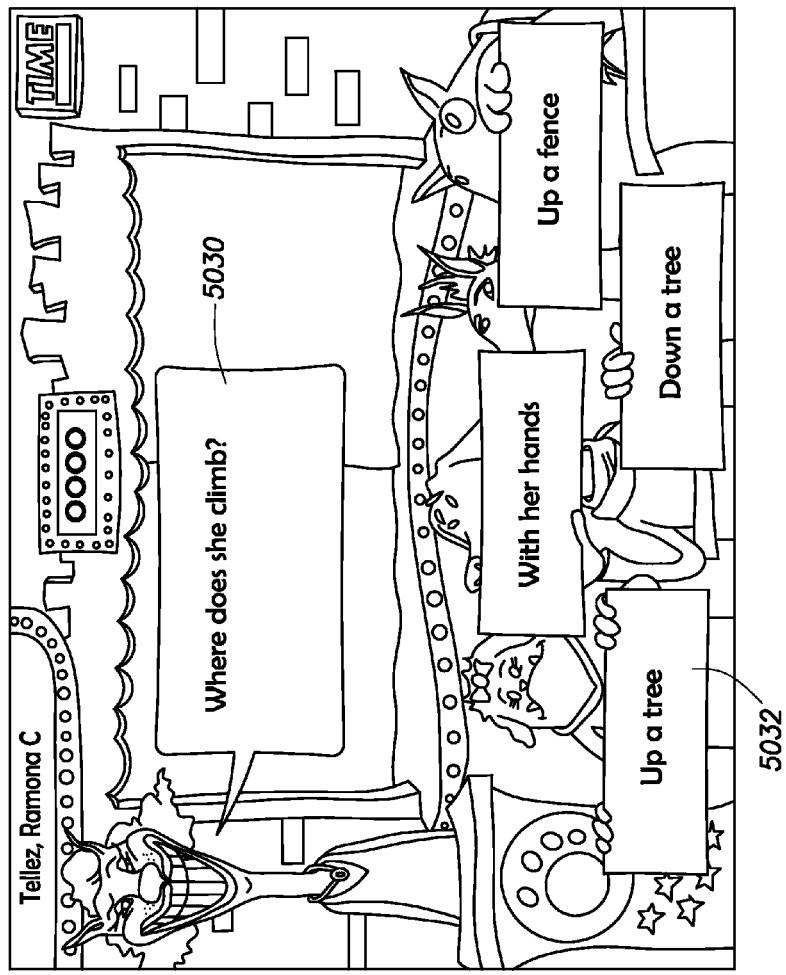
FIG. 50 is a screen shot in Dog Bone during a trial, where a question is posed to the student, and the answer, along with three foils are presented.

Referring now to FIG. 50, a screen 5000 is shown, which directly follows the screen 4900. A question 5030 is posed to the student (aurally and textually in mode 1, and textually in mode 2). The answer 5032, along with a number of incorrect answers, are provided below. The student is to select the correct answer from the number of choices. If s/he correctly answers, either another portion of the story is read, or possibly another question might be presented. If s/he incorrectly answers, the portion of the story is read again, and the question is asked again. This time, the previously selected incorrect answer is grayed out.

Figure 51:
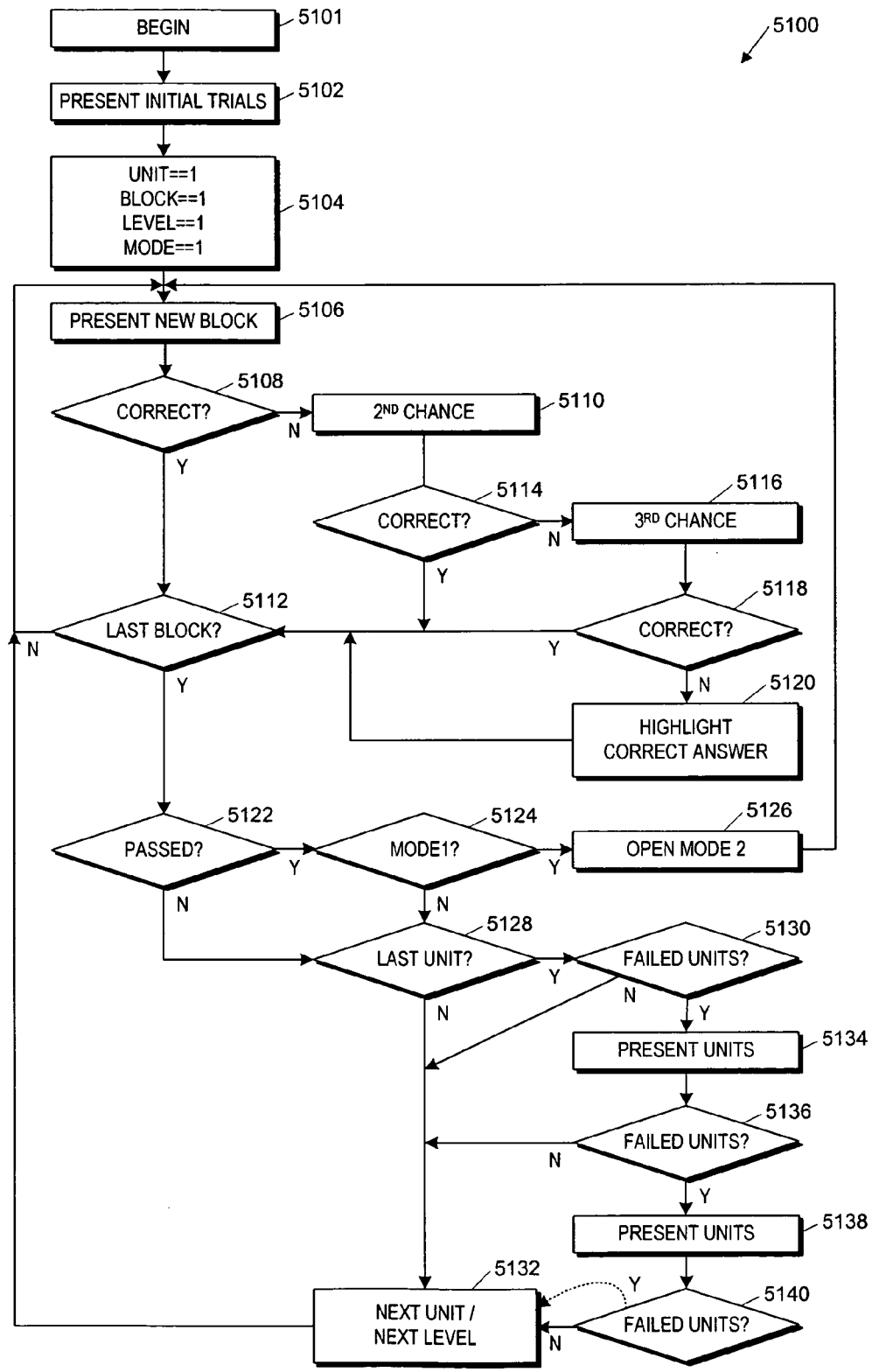
FIG. 51 is a flow chart illustrating the method of Dog Bone.

Referring now to FIG. 51, a flow chart 5100 is shown to illustrate the method of Dog Bone. Flow begins at block 5101 and continues to block 5102.

At block 5102, an initial trial is presented to the student. Instructions are presented aurally, and then a trial is presented aurally and visually, such as that shown in FIGS. 49 and 50. The purpose of the initial trial is to train the student what to do in the exercise. Flow then proceeds to block 5104.

At block 5104, the unit, block, level and mode are all set to 1. Flow then proceeds to block 5106.

At block 5106, a new block is presented. As in Buzz Fly, a block is a portion of a story. In level 1, unit 1, there are 6 blocks. The first block is presented in block 5106. Flow then proceeds to decision block 5108.

At decision block 5108, at determination is made as to whether the block was answered correctly. If so, flow proceeds to decision block 5112. Otherwise, flow proceeds to block 5110.

At block 5110, the block is repeated. That is, the story is presented again, and the question is asked again, this time, with the previously selected incorrect response grayed out. Flow then proceeds to decision block 5114.

At decision block 5114, a determination is made as to whether the block was answered correctly. If so, flow proceeds to decision block 5112. Otherwise, flow proceeds to block 5116.

At block 5116, the block is presented a 3rd time, this time, with the previous two incorrect answers grayed out. Flow then proceeds to decision block 5118.

At decision block 5118, a determination is made as to whether the block was answered correctly. If so, flow proceeds to decision block 5112. Otherwise, flow proceeds to block 5120.

At block 5120, the correct answer is highlighted. Flow then proceeds to decision block 5112.

At decision block 5112, a determination is made as to whether the present block is the last block in the unit. If not, flow proceeds back to block 5106 for presentation of the next block in the unit. However, if the present block is the last block in the unit, flow proceeds to decision block 5122.

At decision block 5122, a determination is made as to whether the present unit, in the present mode has been passed. For levels 1-5, the student is required to correctly respond to 5 out of 6 questions for each unit. For level 6, the student is required to correctly respond to 9 out of 10 questions. If the student passes, flow proceeds to decision block 5124. If the student does not pass, flow proceeds to decision block 5128.

At decision block 5124, a determination is made as to whether the passed unit was in mode 1. If it was, flow proceeds to block 5126. However, if the present unit was in mode 2, flow proceeds to decision block 5128.

At block 5126, mode 2 for the present unit is opened. Flow then proceeds back to block 5106 for presentation of the unit, again, but this time in mode 2.

At decision block 5128, a determination is made as to whether the present unit is the last unit in the level. If it is not, flow proceeds to block 5132. However, if the present unit is the last unit of the current level, flow proceeds to decision block 5130.

At decision block 5130 a determination is made as to whether any of the units in the present level were failed. If not, flow proceeds to block 5132. But, if any of the units were failed, flow proceeds to block 5134.

At block 5134, the failed units are repeated, one by one. Flow then proceeds to decision block 5136.

At decision block 5136 a determination is made as to whether any of the units in the present level were failed. If not, flow proceeds to block 5132. Otherwise, flow proceeds to block 5138.

At block 5138, the failed units are presented for a 3rd time. Flow then proceeds to decision block 5140.

At decision block 5140 a determination is made as to whether the student has failed any of the units, for a 3rd time. If not, flow proceeds to block 5132. However, if the student still has units that s/he has not passed, those units are left open, to be repeated at the end of the exercise, and flow proceeds to block 5132.

At block 5132, either the next unit in a level, or the next level is proceeded to. That is, if the path to block 5132 is from decision block 5128, then the next unit in the present level is chosen for presentation, and flow proceeds back to block 5106. However, if the path to block 5132 is from either decision block 5130 or 5136, then the present unit is the last unit in the level, so the next level is chosen for presentation, and flow proceeds back to block 5106. If, the path to block 5132 is from decision block 5140, as a result of the student having no failed units, then the present unit is the last unit in the level, so the next level is chosen for presentation, and flow proceeds back to block 5106. If however, the path to block 5132 is from decision block 5140, as a result of the student having failed units still open, those units are left open, and will be repeated at the end of this exercise. But, in the meantime, the next level is opened, and flow proceeds back to block 5106.

Program Set—Reading 1

Exercise—6: Quail Mail

Each of the exercises described above have had corresponding games in the program sets Reading 1 and Reading 2, albeit often differing methods. The present game "Quail Mail" in Reading 1, and the last game to be described "Ant Antics" in Reading 2, do not correspond to each other.

The goal of Quail Mail is to improve vocabulary, concept knowledge, and decoding skills. The student is asked to sort words into semantic and linguistic categories. This exercise encourages flexibility during reading and automatic access to the various dimensions of vocabulary.

In this exercise the student will sort pictures and/or words, one at a time, into different categories. The categories will include the following: Basic (Dogs, Trees, Flowers); Superordinate (Foods, Animals); Thematic (Animals on a farm, Things in a classroom); Descriptive (Functions: Clean with it; & Features: Bigger than a car); Linguistic (Syntax: Where, When, Who, What; & Morphology: Plural, Verb+ing, Verb+ed).

When first starting the exercise, the student will be presented with a single bin, representing a single category from the "Basic" category type, with items presented in blocks of four. Next a second category will be added, with two bins presented, and items presented in blocks of eight. Finally, four bins will be presented, representing all four categories from the group, with blocks of 32 items presented.

An Introductory Level presents simple stimuli to familiarize students with the sorting task. For this level the "Basic" category type is presented, including categories like "Dog" and "Tree." Although easy to sort visually and conceptually, the members of these categories have subordinate-level names (e.g., dalmation and poodle; redwood and elm). These vocabulary items are too advanced to teach first graders. For this reason, all the items to be sorted at this level will be presented as pictures only, with neither text nor aural labels. Beyond the Introductory level, all stimulus items will initially be presented in a picture-word stage (picture+text+aural; PTA), and after students pass all of the categories in a category group, they repeat those categories in word-only stage (text+aural; TA). Finally, fluency Rounds are provided to give the student an opportunity to test fluency. A visual cue (full mailbag of cards or letters and the use of a timer) will indicate to the student that this is a "Fluency Round", a speeded and time-limited version of the usual trial.

When beginning a new unit, the student will be required to click the OR button (there is no OR press in between trials, only at the beginning of a new unit). At this time, a new category bin or set of bins will be presented along with an aural description of each category. Next, a stimulus is presented visually and aurally. (The student can click the OR during a trial to repeat the aural presentation of the stimulus.) The student responds by clicking on the category bin to sort the word. New stimuli are presented automatically, until the unit is complete.

The basic interaction in the Fluency Round is essentially the same as with the rest of the exercise. A Fluency Round will occur whenever a student has reached the passing criterion for a category group in the text+aural stage (there is no Fluency Round in the picture+text+aural stage). The sorting bins will remain in the same positions but the content sampling will be newly randomized. The bin categories are not presented as they are at the beginning of a new unit with regular trials. In one embodiment, the Fluency Round is timed at one minute. If the student completes all the available trials before the time is up, a new random sampling of the stimulus for the current category group is presented. If the Fluency Round occurs at the end of a session, the student is allowed to complete the Fluency Round before the session times out. If the student exits manually from the Fluency Round, the round will be exited immediately.

The exercise includes the following content:

| 384 items (8 per category, 32 per category type) in the following categories: | | |
| --- | --- | --- |
| Basic | Super-ordinate | Thematic |
| Dog | Foods | Animals on a farm |
| Tree | Animals | Animals in a zoo |
| Flower | Body parts | Things you find on clothing |
| Chair | Clothes | Things on someone's head |
| Cup | Fruits | Animals in a pet store |
| Shoe | Vegetables | Animals that can fly |
| Sign | Bugs | Things in a classroom |
| Truck | Birds | Things at a circus |

| Descriptive: Functions | Descriptive: Features | Linguistic: syntax & morphology |
| --- | --- | --- |
| Clean with it | It is bigger than a car | Where is it? |
| Go places with it | It is smaller than your hand | When was it? |

-continued

| 384 items (8 per category, 32 per category type) in the following categories: | | |
| --- | --- | --- |
| Eat with it | Cold weather clothes | Who does it? |
| Make art with it | Hot weather clothes | What is it? |
| Take a bath with it | You see it in the sky | Many (Plural Noun + s) |
| Cook with it | You see it in the water | One (Singular Noun) |
| Carry things with it | Careful, it's sharp! | Happening now (Verb + ing) |
| Garden with it | Careful, it's hot! | Happened before (Verb + ed) |

| Minimum trials to complete all material: | | | | |
| --- | --- | --- | --- | --- |
| | 1 category | 2 categories | 4 categories | Total |
| Picture only | 4 | 16 | 64 | 84 |
| Picture + Word | 0 | 80 | 320 | 400 |
| Word only | 0 | 0 | 320 | 320 |
| Total | 4 | 96 | 704 | 806 |

Below is a list of definitions that will be used to describe the progression or flow of the method used in Quail Mail:

Category: The individual categories into which the student should sort the words (i.e. "Animals").

Category Group: Refers to a set of 4 categories that are always contrasted with each other. A 4×8 grid will always include all 4 categories from a single group. A 2×4 grid can include any two categories from a single group. Categories from different groups should never be presented together in the same grid.

Category Type: All the individual categories come from six category types: Basic (will sort unlabeled pictures—no text or aural), Super-ordinate, Thematic, Descriptive: Functions, Descriptive: Features, Linguistic: Syntax & Morphology.

Grid: Refers to the number of categories being contrasted and the number of items in a unit. There are three grid-sizes 1×4, 2×4, and 4×8. 1×4 occurs ONLY when the student enters the exercise for the very fist time as a familiarization to the exercise.

Stage: Refers to the type of stimulus being presented (with or without a picture). The items from each category type are presented twice. First they are presented in the Picture-Word stage (picture+text+aural stimuli: PTA), then in the Word-Only stage (text+aural: TA).

Unit: A unit is always the smallest group of trials to be evaluated for advancement.

A trial is evaluated as correct if the student responds by clicking the correct category for the word. For units of less than 10 trials (i.e., 1×4 and 2×4 grids), the student should get 100% correct. To successfully pass a 4×8 unit, the student should get 90% of the trials correct; 29 correct out of 32 items. Evaluation of the unit should happen at the completion of the unit. It is possible for a student to pass a unit if they miss the last item in the unit, however any reward animation should be delayed.

Picture-word and word-only stages—Categories are initially presented at the picture-word stage (picture+text+aural stimuli: PTA). After a student meets passing criteria for a 4×8 unit in the PTA stage, that category group is repeated at the word-only stage (text+aural: TA) with a 4×8 unit. The same items are presented at the PTA and TA stages. Only the visual stimuli and the random order of presentation change. Note: students who transition out of the PTA stage of a Category group due to plateau-based transitions should proceed to the PTA stage of the next open group, not the TA stage of the same group. Those that plateau-transition out of the TA stage should repeat the PTA stage for the category group at the 4×8 grid level, when they return to this group.

The first time a new group is entered, two bins are presented at the PTA stage. Items are presented in blocks of eight (randomly sampled from the two categories). To pass this unit, the student should correctly answer all eight items. If the 2×4 PTA unit is passed, four bins will be presented at the PTA stage, representing all four categories from a group. To pass this unit, the student should correctly answer 90% of the items (i.e., 29 of the 32). If the 4×8 PTA unit is passed, four bins will be presented at the TA stage. If the 4×8 TA unit is passed, four bins will be presented at the fluency stage.

In the PTA stage, the 2×4 grid is presented after the 1×4 grid or the first time a student enters any other Category Group. The 2×4 grid is also presented after a student fails a 4×8 grid in the PTA stage. Students get 3 chances to reach criterion and pass the 2×4 grid. If a student does NOT pass the first 2×4 grid, they will transition to a second 2×4 grid for the same group. The second 2×4 grid should be constructed from the two remaining categories in the same Category Group. Again, the student gets 3 chances to pass the new 2×4 grid. If a student passes any 2×4 grid, they will proceed to the 4×8 PTA grid in the same Category Group. If a student does NOT pass any 2×4 grid, they will proceed to the next open unit (i.e., plateau-based transition to a new Category Group).

Students get 3 chances to reach criterion and pass the 4×8 grid. If a student passes a 4×8 grid, the student progresses to a 4×8 TA (word only) grid for the same Category Group. Once a Category Group has been passed at the 4×8 grid level, the student will not return to the 2×4 level for this group. If a student fails a 4×8 grid, they will transition to the next open unit (i.e., the next Category Group). When the student returns to this category group, they will begin at the 2×4 grid level.

In the Text-Aural (word only) Stage, once a Category Group has been passed at the PTA stage, it is repeated at the TA stage with text+aural stimuli only (no picture). Only 4×8 grids are presented at the TA stage. When the criteria have been met in the Text-Aural stage for a Category Group, the student advances to the Fluency Round for that group (there is no Fluency Round for Basic categories at the Introductory Level or in the Picture-Text-Aural stage). After completion of the Fluency Round, this Category Group is closed. If a student fails a 4×8 grid in the TA stage, they will transition to the next open unit. When the student returns to this Category Group, they will begin at the 4×8 grid level in the PTA stage.

Figure 52:
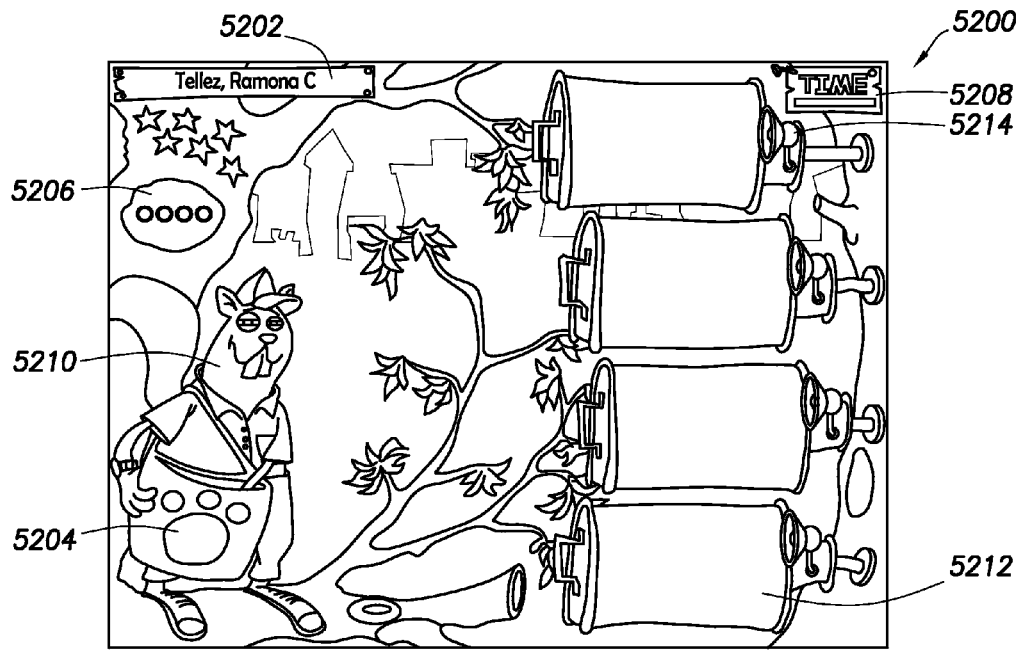
FIG. 52 is a screen shot at the beginning of the exercise Quail Mail.

Referring now to FIG. 52, a screen shot 5200 is shown of an initial screen in the exercise Quail Mail. As in the other exercises, screen 5200 includes a student indicator 5202, a Paw select 5204, a count indicator 5206, and a time indicator 5208. In addition, the screen 5200 includes a bear postman 5210, a number of mailboxes 5212, and a number of speakers 5214. In operation, the bear 5210 will present a target item, as a picture-text-aural, or as text-aural, and the student must sort the presented target item into one of the mailboxes 5212. If the student forgets what the mailboxes refer to, s/he may click on the corresponding speaker 5214 and have the category associated with that mailbox repeated.

Figure 53:
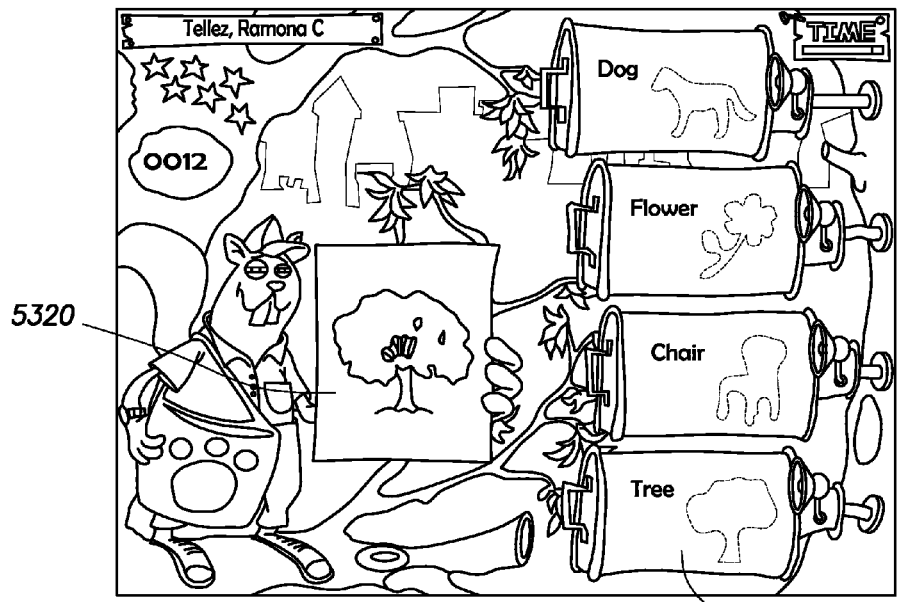
FIG. 53 is a screen shot in Quail Mail of an initial trial.

Referring now to FIG. 53, a screen shot 5300 is shown of a trial within the exercise Quail Mail. In this trial, a target 5320 (a picture of a tree) is presented to the student, pictorially, and aurally, and the student must select the appropriate mailbox for the target 5320 to go in. The choices are: dog, flower, chair and tree. The correct selection is tree 5322. If the student selects this mailbox, a "ding" is played, and the score is incremented. If the student selects another mailbox, a "thunk" is played, the score is not incremented, and the correct answer "tree" is highlighted.

Figure 54:
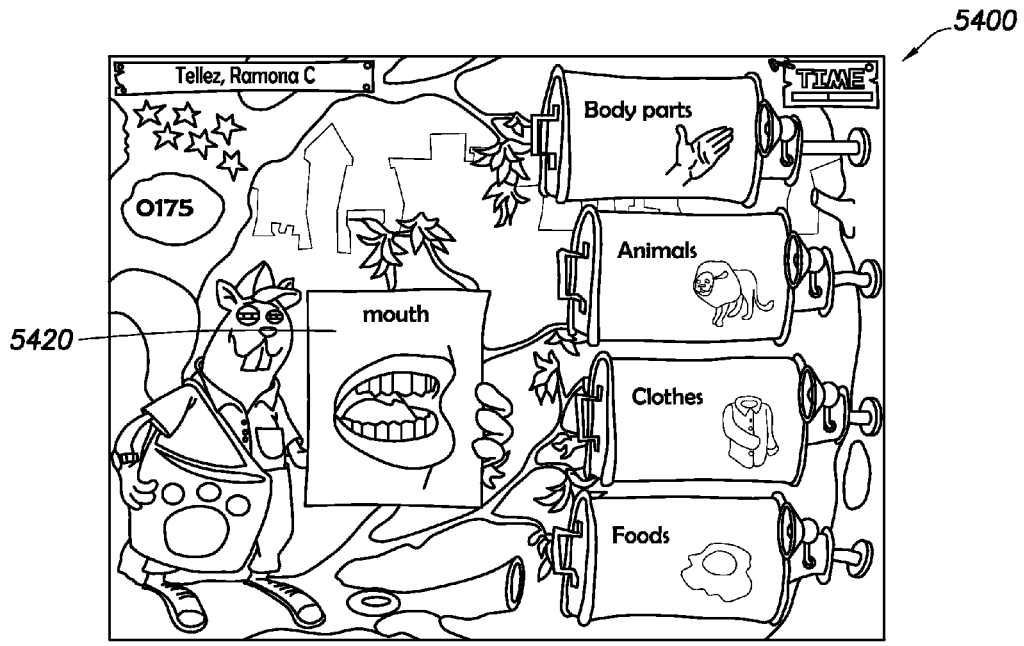
FIG. 54 is a screen shot in Quail Mail of a first type of trial.

Referring now to FIG. 54, a screen shot 5400 is shown of a slightly more advanced trial. In this trial, the student is given a target stimulus 5420 that includes an aural presentation, a pictorial presentation, and, a textual presentation. The student is required to sort the target stimulus 5420 (i.e., "mouth") into the correct bin or mailbox "body parts".

Figure 55:
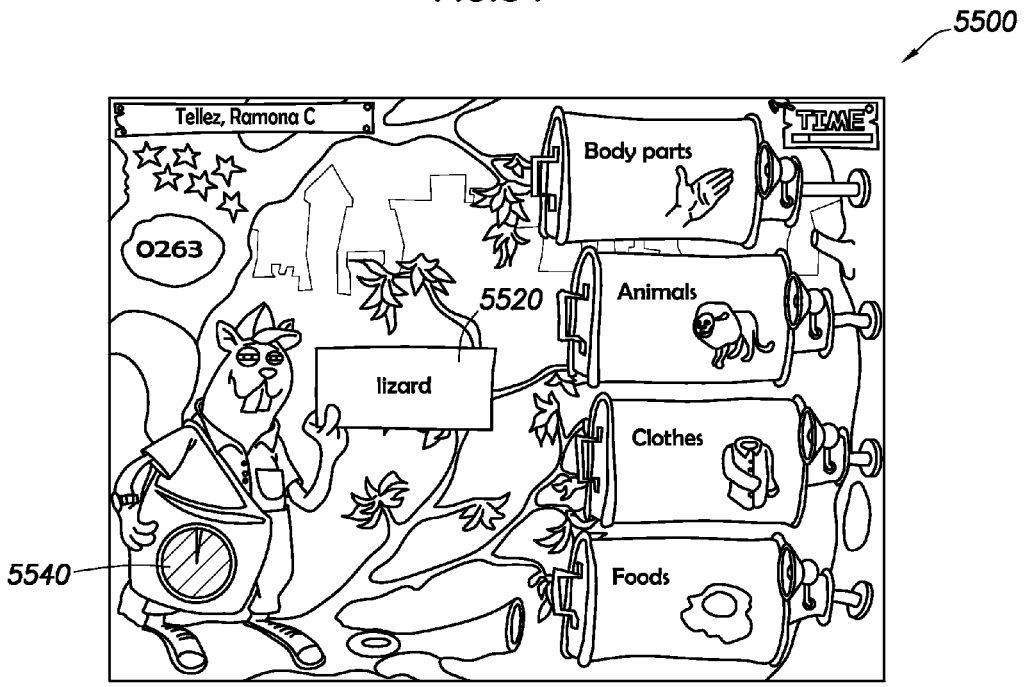
FIG. 55 is a screen shot in Quail Mail of a second type of trial.

Referring now to FIG. 55, a screen shot 5500 is shown of another trial. In this instance, the target 5520 is not shown pictorially, but simply aurally and textually. The student must sort the target 5520 "lizard" into one of the four categories. Further, the Paw select has been replaced with a timer 5540, indicating that this is a timed fluency round, as described above.

As mentioned above, there are two types of target stimulus in the present exercise: basic types; and advanced types. Basic types present pictures of stimulus only. Advance types present either pictures+text+aural, or just text+aural. Basic type presentations are referred to as Type 1. Either of the advanced types are referred to as Type 2.

Figure 56:
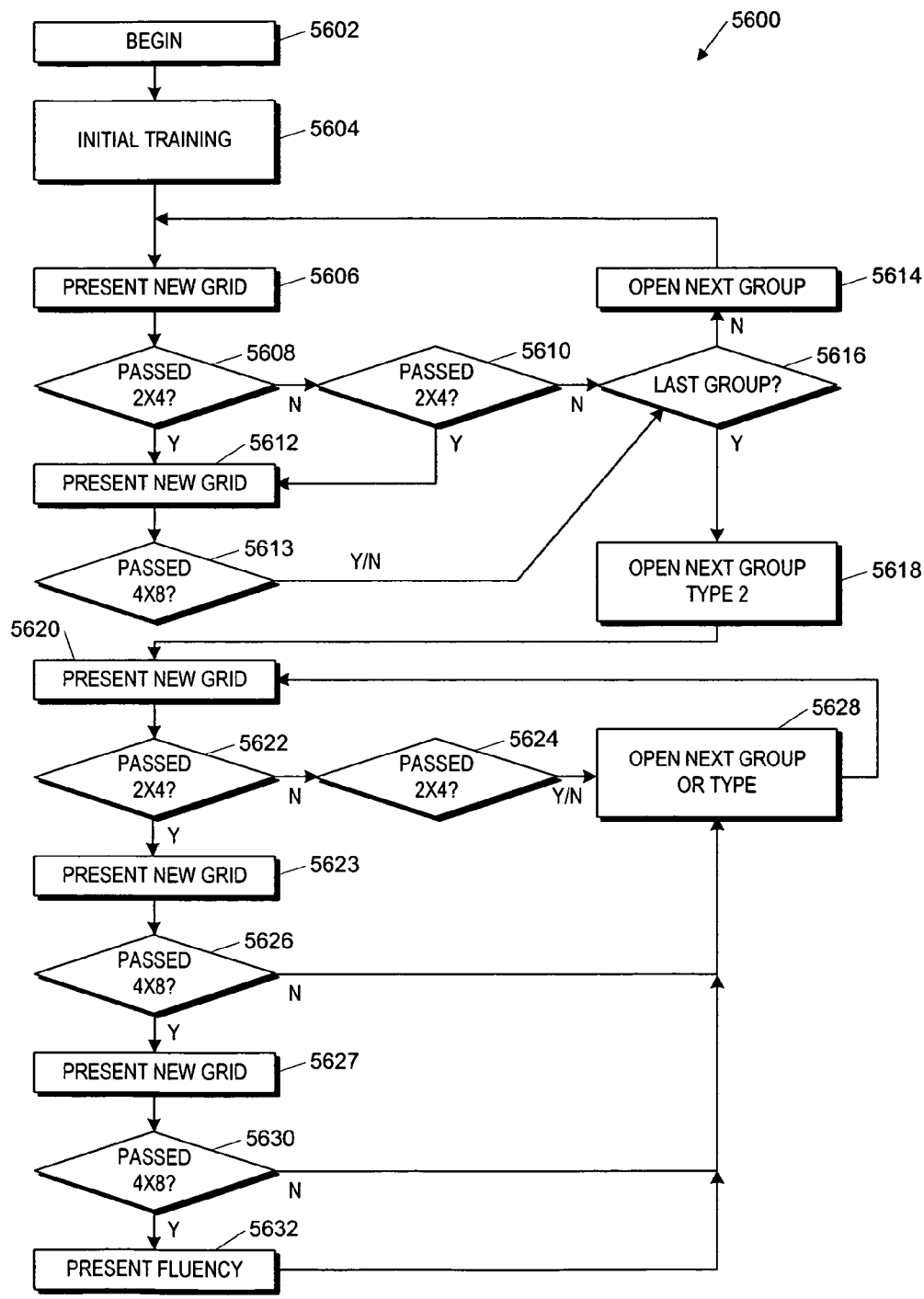
FIG. 56 is a flow chart illustrating the method of the exercise Quail Mail.

Referring now to FIG. 56, a flow chart 5600 is shown which illustrates the method of the present exercise. Flow begins at block 5602 and proceeds to block 5604.

At block 5604, an initial training exercise is presented. More specifically, a 1×4 grid is started. That is, four trials are presented using just 1 mailbox for sorting. The purpose of the initial training is to teach the student to select the target stimulus that corresponds to the category in the mailbox. There is no incorrect answer in the initial training. Flow then proceeds to decision block 5606.

At decision block 5606, a 2×4 grid is presented. That is, 4 trials are presented where the student has two mailbox options for sorting. Two sets of 2×4 grids are presented, or eight total trials. The student is required to correctly respond to all eight trials to advance. If they do, flow proceeds to block 5612. If the student does not correctly respond to all eight trials, they are given 3 more opportunities, at decision block 5608. If they still do not pass, flow proceeds to decision block 5610.

At decision block 5610, a second 2×4 grid is constructed from the two remaining categories in the same category group. Again, the student gets three opportunities to pass the new 2×4 grid. If the student passes this grid, at 100%, flow proceeds to block 5612. Otherwise, flow proceeds to decision block 5616.

At decision block 5616, a determination is made as to whether there are any remaining groups in the present type (type 1). If so, flow proceeds to block 5614. Otherwise, flow proceeds to block 5618.

At block 5614, the next group within type 1 is opened, and flow proceeds back to block 5606 for presentation of another 2×4 grid. The student is required to pass any 2×4 grid, before they are allowed to advance to block 5612 for presentation of a 4×8 grid. If they cannot pass any of the 2×4 grids in type 1, a next group is opened, in type 2, and flow proceeds to block 5620.

At block 5612, a 4×8 grid set of trials is presented to the student, in type 1. Flow then proceeds to decision block 5613.

At decision block 5613 a determination is made as to whether the student has correctly passed 90% of the trials (or 29 out of 32 trials). They are given 3 chances to pass this grid. If they do, flow proceeds to decision block 5616. If they do not, flow still proceeds to decision block 5616, but the present unit remains open.

At block 5618, the next group is opened in type 2 (picture+text+aural). Flow then proceeds to block 5620.

At block 5620, a 2×4 grid is presented for the new group in type 2. Flow then proceeds to decision block 5622.

At decision block 5622, a determination is made as to whether the student has passed this grid. For this 2×4 grid, the student is given three chances to pass at 100% (or 8 out of 8 trials). If they do not, flow proceeds to decision block 5624. However, if they pass, flow proceeds to block 5623.

At decision block 5624, a new 2×4 grid is presented from another group in the same category. The student is given 3 opportunities to pass this grid. Whether they pass or not, flow proceeds to block 5628. However, if they pass, the present group is closed, whereas if they do not pass, the present group remains open for completion later.

At block 5628, the next group is opened. If all of the groups have been closed for the present type in type 2 (PTA), then another group is opened for the next type (TA). Flow then proceeds back to block 5620 for presentation of another 2×4 grid for the new group and/or type.

At block 5623, a presentation of a new 4×8 grid is presented. Flow then proceeds to decision block 5626.

At decision block 5626, a determination is made as to whether the student has passed the 4×8 grid. As above, the student is given three chances to pass the 4×8 grid at 90% (or 29 out of 32). If they do not, the present unit remains open and flow proceeds to block 5628. Otherwise, flow proceeds to block 5627.

At block 5627, a new 4×8 grid is presented. This grid is stage 2 of type 2 (text+aural). Flow then proceeds to decision block 5630.

At decision block 5630, a determination is made as to whether the student correctly passed this grid. As above, for a 4×8 grid, the student is given three chances to pass at 90% (or 29 out of 32). If they do not, the unit remains open, and flow proceeds to block 5628. Otherwise, flow proceeds to block 5632.

At block 5632, a timed fluency round is presented to the student for the present unit. Upon completion, flow proceeds to block 5628.

Program Set—Reading 2

Exercise—6: Ant Antics

The goal of this exercise is to improve vocabulary skills, syntax skills, and sentence-level comprehension. The student is asked to choose which one of four sentences (or phrases) best describes a picture. The sentences sample the basic grammatical structures of spoken English as mastered by the second grade. Foil sentences use vocabulary that is relevant to the picture, but say something that is not true about the picture, often by changing word order and/or word. To respond correctly, students must focus on the syntactic features of the sentences. Because this task requires students to carefully read, analyze, and compare the possible answers, it exercises working memory and logic skills as well as syntactic abilities.

The participant sees one picture along with four sentences (or phrases), and must pick the sentence (or phrase) that correctly describes something in the picture. Sentences will be created based on 24 selected syntactic forms. These forms are syntactic constructions that typically develop between ages 3 and 9.

| Reading Difficulty: Vocabulary | Reading Difficulty: Length | Syntactic Complexity levels | Structures per level | Items per structure | Items per vocab/length level |
|---|---|---|---|---|---|
| Easy | Short | 8 | 3 | 4 | 96 |
| Easy | Long | 8 | 3 | 4 | 96 |
| Hard | Short | 8 | 3 | 4 | 96 |

Difficulty will be manipulated along 2 primary dimensions, reading difficulty and syntactic complexity. The dimension of reading difficulty is a combination of non-grammatical factors: sentence length and vocabulary. Sentence length increases across two levels: short and long. Short sentences are the minimal length for that sentence structure: on average 3-6 words long. Long sentences are the minimal length for that structure plus 1 to 3 extra words: on average 4-8 words long. The extra words consist of adjectives, complements, and prepositional phrases, in order to make sentences longer with minimal impact on syntactic complexity. Vocabulary increases across two levels: easy and hard. Easy vocabulary items were based on a restricted set of 74 familiar and/or easily decodable Kindergarten level words, designed to minimize the burdens of decoding and word recognition. Hard vocabulary items were based on an unrestricted set of $1^{st}$ and $2^{nd}$ grade level words. No items will use both long sentences and hard vocabulary.

Syntactic complexity increases across 8 levels. The age of acquisition for the targeted sentence structures increases across syntactic levels from an average of 2.8 to 5.5. In addition, the average minimal length (shortest sentence that can have the target structure) increases from approximately 3 words at the lowest levels (e.g., "The cats read.") to approximately 6 words at the highest levels (e.g., "The cow that is sad is walking.").

There are eight grammatical levels and three reading difficulty levels (sentence length+vocabulary). Because individual students will respond differently to these two dimensions of difficulty, it is possible for students to proceed through these levels following different sequences (see "Progression" section). There are 24 forms—three per grammatical difficulty level. Reading difficulty refers to the combination of a sentence's length/vocabulary. There are 3 levels of reading difficulty: short/easy, long/easy, and short/hard. There are 24 units—one for each combination of grammatical level and reading difficulty level. As shown below, syntactic difficulty increases moving left to right across columns, with reading difficulty increasing moving down the rows.

| 1 | 2 | 3 | 4 | 5 | 6 | 7 | 8 |
|---|---|---|---|---|---|---|---|
| 9 | 10 | 11 | 12 | 13 | 14 | 15 | 16 |
| 17 | 18 | 19 | 20 | 21 | 22 | 23 | 24 |

All students will begin with unit 1, with all units marked "open." If a unit is passed, that unit is marked "closed," and the student proceeds to the next row in the same column (i.e., if unit y is passed, move to unit y+8.) If a unit in row 3 is passed, move to the next open unit. If a unit is not passed, repeat the same unit. If a unit is not passed on the third attempt, it should be marked as "attempted," and the student should make a plateau-based transition to the next open unit. When the student transitions from unit 24 (i.e., there are no open units, because all have been marked closed or attempted) those units not yet passed should be marked open again, and the student should return to the incomplete units, following the same progression rules.

A unit includes all trials from a given level (12 trials). All the trials from a unit are presented before any trials are evaluated. At that point, the trials are evaluated for criterion. Each syntactic structure within a level is evaluated separately, and the student must correctly answer 3 of the 4 trials for each of the three structures to pass a unit. Students cannot pass individual syntactic structures, rather, they must reach criterion for all three structures in a single evaluation cycle and pass the entire unit.

As the student begins taking trials in unit 1, the syntactic structures and items within that unit will be chosen randomly. Once all trials in all syntactic categories have been presented the unit is evaluated. If the student attains the passing criterion they will advance to a unit with the same grammatical structure but more challenging reading level, otherwise the same unit is repeated, with the trials presented in a new random order.

Figure 57:
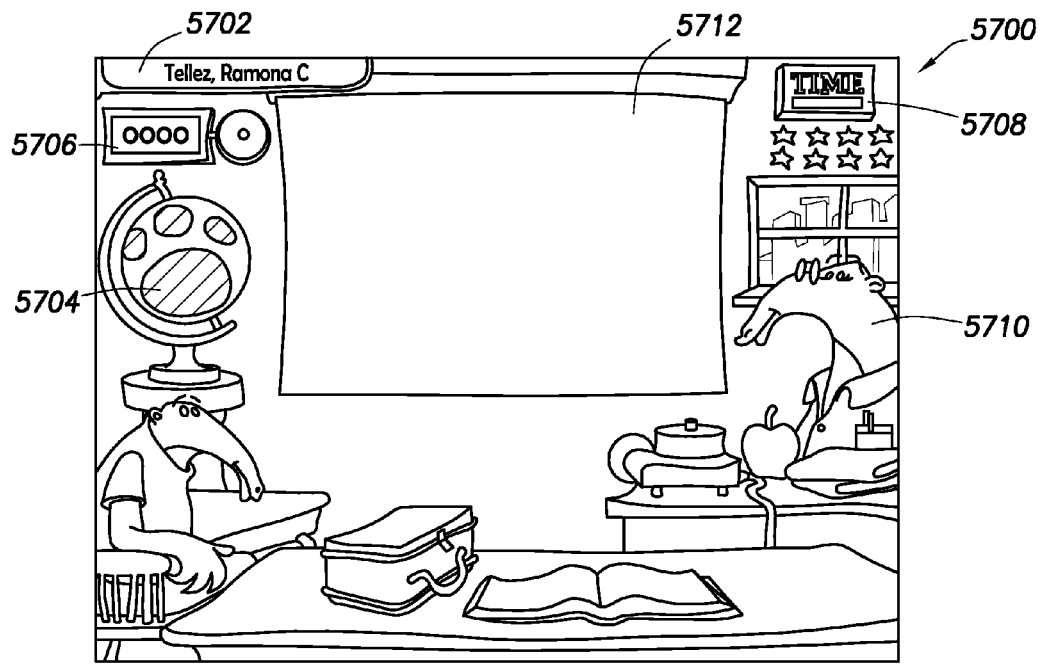
FIG. 57 is a screen shot at the beginning of the exercise Ant Antics.

Referring to FIG. 57, a screen shot 5700 is shown of an initial screen in the exercise Ant Antics. As in the other exercises, the screen 5700 includes a student indicator 5702, a Paw select 5704, a count indicator 5706 and a time indicator 5708. An ant eater 5710 is provided to present slides to the student on a slide screen 5712. As mentioned above, the student is required to match the best description of the slides with the presented slide.

Figure 58:
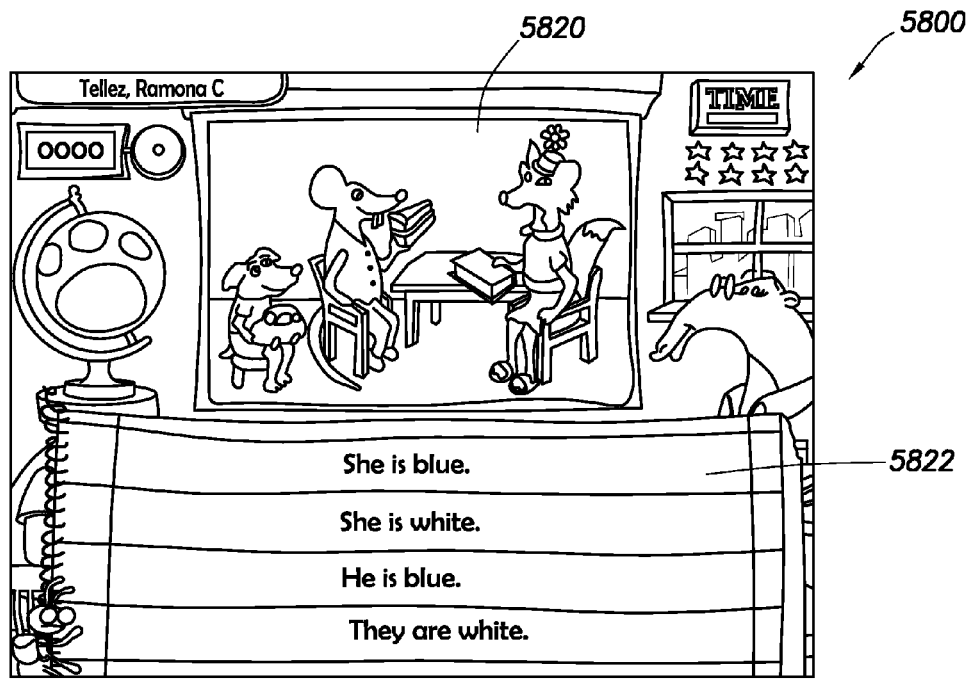
FIG. 58 is a screen shot in Ant Antics of a trial.

Referring now to FIG. 58, a screen shot 5800 is shown of a trial. A slide 5820 is presented at the top of the screen. At the bottom are four sentences 5822. that describe the slide 5820. As mentioned above, it is possible that several choices are true. The student is required to select the best description from the choices. In this trial, the best description (not readily viewable in this description) is "She is blue." If the student selects this choice, the counter increments, and a "ding" is played. If the student does not select the correct choice, a "thunk" is played, all incorrect sentences are grayed out, and the correct sentence is highlighted.

As mentioned above, the present exercise includes 3 levels of reading difficulty, and 8 levels of grammar complexity. For each level of reading difficulty (level 1=short/easy, level 2=long/easy, level 3=short/hard) there are 3 types of structure (ID 1=short/easy (4 trials), ID 2=long/easy (4 trials), and ID 3=short/hard (4 trials)). A unit=1 level of reading difficulty×1 grammar complexity for a total of 24 units. The content is presented visually only (and textually), no audio.

Figure 59:
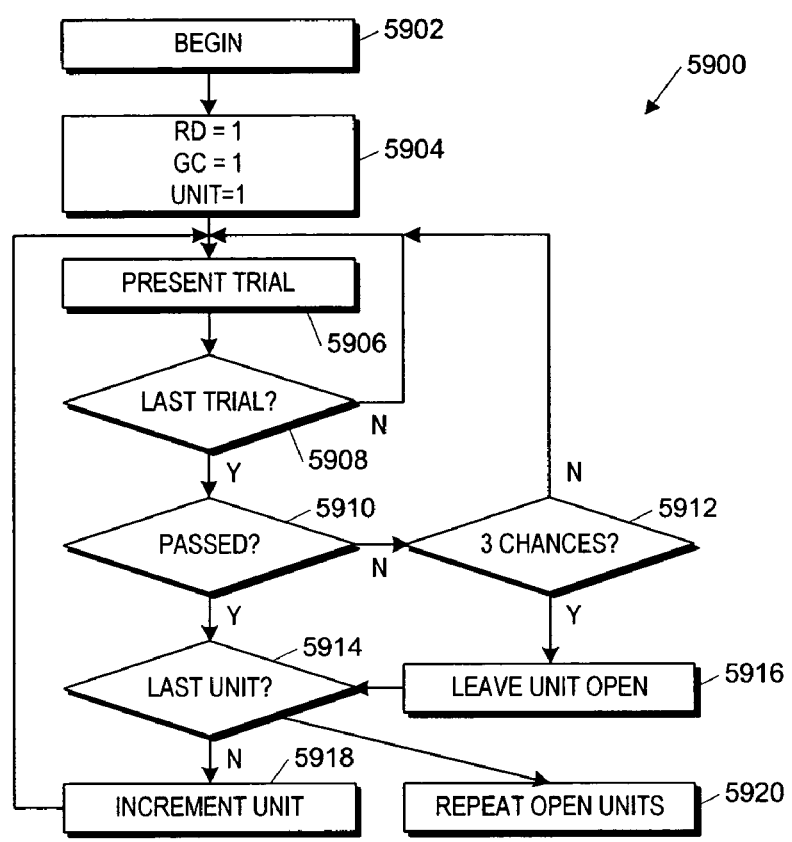
FIG. 59 is a flow chart illustrating the method of Ant Antics.

Referring now to FIG. 59, a flow chart 5900 is shown which illustrates the method of Ant Antics. Flow begins at block 5902 and proceeds to block 5904.

At block 5904, the reading difficulty (RD) is set to 1, the grammar complexity (GC) is set to 1, and the Unit is set to 1. Flow then proceeds to block 5906.

At block 5906, a trial is presented. In one embodiment, there are 12 available trials for each unit, four from each of three ID's. The method randomly selects one of these 12 for presentation to the student, as shown in FIG. 58. After the student responds, Flow proceeds to decision block 5908.

At decision block 5908, a determination is made as to whether another trial remains. As just mentioned, there are 12 trials within each unit. The loop between block 5906 and decision block 5908 continues for those 12 trials. If another trial remains, flow proceeds back to block 5906. Otherwise, flow proceeds to decision block 5910.

At decision block 5910 a determination is made as to whether the subject passed the unit. In one embodiment, the student must past 3 out of 4 trials for each ID in a unit. If they do, flow proceeds to decision block 5914. If not, flow proceeds to decision block 5912.

At decision block 5912, a determination is made as to whether the student has tried to pass the unit 3 times. If not, flow proceeds back to block 5906 where the unit is repeated. However, if the student has attempted the unit unsuccessfully 3 times, flow proceeds to block 5916.

At block 5916, the present unit is marked uncompleted (or open). Flow then proceeds to decision block 5914.

At decision block 5914, a determination is made as to whether the present unit is the last unit in the exercise. If not, flow proceeds to block 5918. However, if the present unit is the last unit in the exercise, flow proceeds to block 5920.

At block 5918, the unit is incremented. Then, flow proceeds back to block 5906 for presentation of a trial in the next unit. This loop continues until all units have been presented.

At block 5920, all units have been presented. But, if any units were not passed, they remain open. These units are repeated, per the above, along 3 chances for each open unit, until all units have been completed.

What has been described above, in the provisional applications which were incorporated by reference, in the drawings, claims and attached appendix, are two sets, each set having multiple exercises which taken alone, and in combination, provide a methodology for helping students cognitive skills in reading and learning. Several embodiments have been illustrated in the described exercises for accomplishing this purpose. However, one skilled in the art will appreciate that modifications to scenes, presentation form, and even content, can be made without departing from the scope of the present invention. Further, what has been described is a methodology for use on a computing device. But, any device capable of producing visual and auditory stimulus, along with a mechanism for recording selections and feedback could be used. That is, the methodology taught in the present application should not be limited to use on the computing device described in FIGS. 1 and 2.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A computer-implemented method for improving spelling and sensitivity to letter-sound correspondences in a person, the method comprising:
  providing a stimulus word set comprising a chained plurality of minimal pairs of stimulus words,
    wherein each chain comprises at least four words,
    wherein all of the words in the chain are legitimate English words,
    wherein each word in the chain differs in spelling from the previous word in the chain, if any, by a single letter, and wherein each word in the chain differs in spelling from the next word in the chain, if any, by a single letter; and
    wherein the chain includes spelling transitions in multiple different letter positions;
  presenting a stimulus word from the chained plurality of minimal pairs of stimulus words to the person via a computing device, comprising:
    audibly presenting the stimulus word; and
    textually presenting the stimulus word;

removing a letter from the textually presented stimulus word, after said audibly and textually presenting the stimulus word;

audibly presenting the next stimulus word in the chain, which becomes the most recently presented stimulus word, and which differs from the preceding stimulus word by one letter corresponding to the removed letter;

wherein the most recently presented stimulus word is audibly presented while still textually displaying all of the letters, except for the removed letter, of the word;

presenting a plurality of letters to the person via the computing device, wherein one of the letters from the plurality of letters correctly replaces the removed letter to textually spell the most recently audibly presented stimulus word, wherein the other of the plurality of letters are foils that do not correctly replace the removed letter to textually spell the most recently audibly presented stimulus word, and wherein the visual and phonetic similarity of the foils with respect to the correct letter is regulated in order to control the discriminability of the correct letter from the foils;

requiring the person to select a letter from the plurality of letters to replace the removed letter to spell the most recently audibly presented stimulus word;

determining if the person selected the letter correctly; and if incorrect, informing the person that the selected letter was not the correct letter to form the most recently audibly presented stimulus word, and preventing the incorrect letter from replacing the removed letter, in order to prevent the person from being exposed to an incorrectly spelled word; and if correct, textually presenting the most recently audibly presented stimulus word with a missing letter and repeating said audibly presenting the next stimulus word in the chain, said presenting the plurality of letters, said requiring, and said determining for each stimulus word in the chain;

wherein said repeating improves spelling and sensitivity to letter-sound correspondences in the person;

wherein presenting the words in the chained plurality of minimal pairs of stimulus words further comprises:
  presenting a first stimulus word in the chain aurally and in a textually scrambled manner, but the remaining stimulus words of the chain, each with one letter omitted, in an unscrambled manner;
  requiring the person to rearrange the presented letters to spell the first stimulus word;
  determining if the person spelled the first stimulus word correctly; and
  if correct, textually presenting the first stimulus word, with an omitted letter, in an unscrambled manner;
  then performing said repeating, said audibly presenting the next stimulus word in the chain, said presenting the plurality of letters, said requiring, and said determining for each stimulus word in the chain.

2. The method of claim 1, further comprising:
presenting a graphical illustration of the first stimulus word approximately when audibly presenting the first stimulus word.

3. The method of claim 1,
wherein said presenting the stimulus word, said removing, said audibly presenting the next stimulus word, said presenting the plurality of letters, said requiring, and said determining if the person selected the letter correctly, compose performing a trial in a beginning level of one or more beginning levels;

wherein said presenting the first stimulus word, said requiring the person to rearrange the presented letters, and said determining compose performing a trial in an advanced level of one or more advanced levels; and wherein the one or more beginning levels and the one or more advanced levels are comprised in a plurality of levels.

4. The method of claim 3,
wherein the stimulus word set comprises a plurality of open units, each comprising a respective chained plurality of minimal pairs of stimulus words; and wherein a unit comprises a specified set of trials, the method further comprising:
  performing trials for each of the plurality of open units comprised in the stimulus word set.

5. The method of claim 4, further comprising:
if the person fails a unit, repeating the unit until:
  the person passes the unit; or
  the person fails the unit a specified number of times.

6. The method of claim 4, wherein said performing trials for each of the plurality of open units comprised in the stimulus word set comprises:
  setting a current level to a first level, wherein the first level comprises the first beginning level of the one or more beginning levels;
  setting a current unit to a first unit of the plurality of open units at the first level; and
  performing said presenting the stimulus word, said removing, said audibly presenting the next stimulus word, said presenting the plurality of letters, said requiring, and said determining for each stimulus word in the current unit at the first level.

7. The method of claim 6, wherein passing a unit comprises successfully performing a specified percentage of trials in the unit, wherein said performing trials for each of the plurality of open units comprised in the stimulus word set comprises:
  if the person fails the current unit a specified number of times, leaving the current unit open for later presentation to the person; and
  if there are further open units at the current level, incrementing the current unit to a next open unit in the first level and performing trials in the current unit.

8. The method of claim 7, wherein said performing trials for each of the plurality of open units comprised in the stimulus word set comprises:
  if the person passes the current unit and there are more open units at the first level, incrementing the current unit to the next open unit in the first level and performing trials in the current unit.

9. The method of claim 8, wherein said performing trials for each of the plurality of open units comprised in the stimulus word set comprises:
  if the person passes the current unit and there are no more open units at the first level, opening a second level as the current level, wherein the second level comprises the first advanced level as the current level;
  setting the current unit to a first open unit in the second level; and
  performing trials in the current unit.

10. The method of claim 9, wherein said performing trials for each of the plurality of open units comprised in the stimulus word set comprises:
  if the person fails the current unit a specified number of times, leaving the current unit open for later presentation to the person; and if there are further open units at the second level, incrementing the current unit to a next open unit in the second level and performing trials in the current unit.

11. The method of claim 10, wherein said performing trials for each of the plurality of open units comprised in the stimulus word set comprises:

if the person passes the current unit and there are more open units at the second level, incrementing the current unit to the next open unit in the second level and performing trials in the current unit.

12. The method of claim 11, wherein said performing trials for each of the plurality of open units comprised in the stimulus word set comprises:

if the person passes the current unit and there are no more open units at the second level, opening a third level as the current level, wherein the third level comprises a second beginning level;

setting the current unit to a first open unit in the third level; and performing trials in the current unit.

13. The method of claim 12, wherein said performing trials for each of the plurality of open units comprised in the stimulus word set comprises:

if the person fails the current unit a specified number of times, leaving the current unit open for later presentation to the person; and if there are further open units at the third level, incrementing the current unit to a next open unit in the third level and performing trials in the current unit.

14. The method of claim 13, wherein said performing trials for each of the plurality of open units comprised in the stimulus word set comprises:

if the person passes the current unit and there are more open units at the third level, incrementing the current unit to the next open unit in the third level and performing trials in the current unit.

15. The method of claim 14, wherein said performing trials for each of the plurality of open units comprised in the stimulus word set comprises:

if the person passes the current unit and there are no more open units at the third level, opening a fourth level as the current level, wherein the fourth level comprises a second advanced level;

setting the current unit to a first open unit in the fourth level; and performing trials in the current unit.

16. The method of claim 15, wherein said performing trials for each of the plurality of open units comprised in the stimulus word set comprises:

if the person fails the current unit a specified number of times, leaving the current unit open for later presentation to the person; and if there are further open units at the fourth level, incrementing the current unit to a next open unit in the fourth level and performing trials in the current unit.

17. The method of claim 16, wherein said performing trials for each of the plurality of open units comprised in the stimulus word set comprises:

if the person passes the current unit and there are more open units at the fourth level, incrementing the current unit to the next open unit in the fourth level and performing trials in the current unit.

18. The method of claim 17, wherein said performing trials for each of the plurality of open units comprised in the stimulus word set comprises:

if there are no more open units at the fourth level, and if there are further open units, for each unit in the further open units:

setting the current unit to a next unit of the further open units; and performing a trial for each stimulus word set in the current unit according to the level for the current unit;

if the person fails the current unit a specified number of times, keeping the current unit open for later presentation to the person.

19. The method of claim 4, wherein said performing trials for each of the plurality of open units comprised in the stimulus word set is performed over a plurality of sessions, and wherein each successive session begins approximately where a previous session ends.

20. The method of claim 19, wherein the sessions occur a specified number times each day, for a specified number of days.

21. The method of claim 3, wherein, for each beginning level, stimulus words are grouped to represent a reduced set of letters, wherein respective pluralities of letters presented to the person are from the reduced set of letters; and wherein, for each advanced level, stimulus words are not grouped to represent a reduced set of letters, and wherein the respective pluralities of letters presented to the person are not constrained to the reduced set of letters.

22. The method of claim 21, wherein the plurality of letters comprises one or more foil letters that do not correctly replace the removed letter to textually spell the next stimulus word;

wherein for the first level and the second level, the foil letters are from a fixed list of easy to discriminate letters; and wherein for the third level and the fourth level, the foil letters are from a fixed list of hard to discriminate letters.

23. The method of claim 1, further comprising:

providing initial training, comprising:

demonstrating said presenting the stimulus word, said removing, said audibly presenting the next stimulus word, and automatically replacing the removed letter to spell the next stimulus word.

24. The method of claim 1, wherein at least a portion of the stimulus words comprises consonant-vowel-consonant letter sequences.

25. The method of claim 1, further comprising:

presenting a graphical illustration of the next stimulus word approximately when audibly presenting the next stimulus word.

26. The method of claim 1, further comprising:

if the person selected the letter incorrectly, performing one or more of:

playing a sound indicating the incorrectness of the selection; and graying out the incorrectly selected letter.

27. The method of claim 1, wherein said textually presenting the stimulus word and said presenting the plurality of letters comprise presenting letters on respective tiles.

28. The method of claim 1, wherein said presenting the stimulus word, said removing, said audibly presenting the next stimulus word, said presenting the plurality of letters, said requiring, and said determining are performed via a graphical user interface (GUI) displayed on a display of the computing device.

29. The method of claim 28, wherein the GUI displays two or more of:
- a student indicator;
- a time indicator;
- an initiation button, whereby the person invokes presenting stimulus words; and
- a score indicator.

30. The method of claim 29, wherein the GUI further displays a main character, wherein the main character performs said presenting the stimulus word and said presenting the next stimulus word.

31. The method of claim 30, wherein the main character is animated.

32. The method of claim 30, wherein the main character performs said presenting the stimulus word and said presenting the next word aurally and textually, and/or graphically.

33. The method of claim 1, wherein said requiring the person to select a letter from the plurality of letters to replace the removed letter to spell the next stimulus word comprises requiring the person to perform one or more of:
- selecting the letter with a pointing device;
- selecting a button indicating the letter in the GUI with the pointing device; and
- pressing a key on a keyboard coupled to the computing device corresponding to the letter.

34. The method of claim 33, further comprising:
indicating if the person selected the letter correctly.

35. The method of claim 34, wherein said indicating if the person selected the letter correctly comprises one or more of:
- presenting a respective sound indicating correctness or incorrectness of the selected letter;
- presenting a respective graphical indication of correctness or incorrectness of the selected letter; and
- awarding points based on the correctness of the selected letter.

36. The method of claim 1, further comprising:
repeating said audibly presenting the next stimulus word in response to user input.

37. The method of claim 1, wherein said audibly presenting the stimulus word and said audibly presenting the next stimulus word are performed via headphones attached to the computing device.

38. The method of claim 1, wherein the plurality of letters does not include the removed letter.

39. A computer accessible memory medium that stores program instructions for improving spelling and sensitivity to letter-sound correspondences in a person, wherein the program instructions are executable by a processor to perform:
providing a stimulus word set comprising a chained plurality of minimal pairs of stimulus words,
wherein each chain comprises at least four words,
wherein all of the words in the chain are legitimate English words,
wherein each word in the chain differs in spelling from the previous word in the chain, if any, by a single letter, and wherein each word in the chain differs in spelling from the next word in the chain, if any, by a single letter; and
wherein the chain includes spelling transitions in multiple different letter positions;
presenting a stimulus word from the chained plurality of minimal pairs of stimulus words to the person via a computing device, comprising:
audibly presenting the stimulus word; and
textually presenting the stimulus word;
removing a letter from the textually presented stimulus word, after said audibly and textually presenting the stimulus word;
audibly presenting the next stimulus word in the chain, which becomes the most recently presented stimulus word, and which differs from the preceding stimulus word by one letter corresponding to the removed letter;
wherein the most recently presented stimulus word is audibly presented while still textually displaying all of the letters, except for the removed letter, of the word;
presenting a plurality of letters to the person via the computing device, wherein one of the letters from the plurality of letters correctly replaces the removed letter to textually spell the most recently audibly presented stimulus word, wherein the other of the plurality of letters are foils that do not correctly replace the removed letter to textually spell the most recently audibly presented stimulus word, and wherein the visual and phonetic similarity of the foils with respect to the correct letter is regulated in order to control the discriminability of the correct letter from the foils;
requiring the person to select a letter from the plurality of letters to replace the removed letter to spell the most recently audibly presented stimulus word;
determining if the person selected the letter correctly; and
if incorrect, informing the person that the selected letter was not the correct letter to form the most recently audibly presented stimulus word, and preventing the incorrect letter from replacing the removed letter, in order to prevent the person from being exposed to an incorrectly spelled word; and
if correct, textually presenting the most recently audibly presented stimulus word with a missing letter and repeating said audibly presenting the next stimulus word in the chain, said presenting the plurality of letters, said requiring, and said determining for each stimulus word in the chain;
wherein said repeating improves spelling and sensitivity to letter-sound correspondences in the person;
wherein presenting the words in the chained plurality of minimal pairs of stimulus words further comprises:
presenting a first stimulus word in the chain aurally and in a textually scrambled manner, but the remaining stimulus words of the chain, each with one letter omitted, in an unscrambled manner;
requiring the person to rearrange the presented letters to spell the first stimulus word;
determining if the person spelled the first stimulus word correctly; and
if correct, textually presenting the first stimulus word, with an omitted letter, in an unscrambled manner;
then performing said repeating, said audibly presenting the next stimulus word in the chain, said presenting the plurality of letters, said requiring, and said determining for each stimulus word in the chain.

40. The memory medium of claim 39, wherein the program instructions are further executable to perform:
presenting a graphical illustration of the first stimulus word approximately when audibly presenting the first stimulus word.

41. The memory medium of claim 39,
wherein said presenting the stimulus word, said removing, said audibly presenting the next stimulus word, said presenting the plurality of letters, said requiring, and said determining if the person selected the letter correctly, compose performing a trial in a beginning level of one or more beginning levels;
wherein said presenting the first stimulus word, said requiring the person to rearrange the presented letters, and said determining compose performing a trial in an advanced level of one or more advanced levels; and wherein the one or more beginning levels and the one or more advanced levels are comprised in a plurality of levels.

42. The memory medium of claim 41, wherein the stimulus word set comprises a plurality of open units, each comprising a respective chained plurality of minimal pairs of stimulus words; and wherein a unit comprises a specified set of trials, the method further comprising:

performing trials for each of the plurality of open units comprised in the stimulus word set.

43. The memory medium of claim 42, wherein the program instructions are further executable to perform:

if the person fails a unit, repeating the unit until:

the person passes the unit; or the person fails the unit a specified number of times.

44. The memory medium of claim 42, wherein said performing trials for each of the plurality of open units comprised in the stimulus word set is performed over a plurality of sessions, wherein each successive session begins approximately where a previous session ends, and wherein the sessions occur a specified number times each day, for a specified number of days.

45. The memory medium of claim 41, wherein, for each beginning level, stimulus words are grouped to represent a reduced set of letters, wherein respective pluralities of letters presented to the person are from the reduced set of letters; and wherein, for each advanced level, stimulus words are not grouped to represent a reduced set of letters, and wherein the respective pluralities of letters presented to the person are not constrained to the reduced set of letters.

46. The memory medium of claim 45, wherein the plurality of letters comprises one or more foil letters that do not correctly replace the removed letter to textually spell the next stimulus word;

wherein for the first level and the second level, the foil letters are from a fixed list of easy to discriminate letters; and wherein for the third level and the fourth level, the foil letters are from a fixed list of hard to discriminate letters.

47. The memory medium of claim 39, wherein the program instructions are further executable to perform:

presenting a graphical illustration of the next stimulus word approximately when audibly presenting the next stimulus word.

48. The memory medium of claim 39, wherein the program instructions are further executable to perform:

if the person selected the letter incorrectly, performing one or more of:

playing a sound indicating the incorrectness of the selection; and graying out the incorrectly selected letter.

49. The memory medium of claim 39, wherein said presenting the stimulus word, said removing, said audibly presenting the next stimulus word, said presenting the plurality of letters, said requiring, and said determining are performed via a graphical user interface (GUI) displayed on a display of the computing device.

50. The memory medium of claim 49, wherein the GUI displays a main character, wherein the main character, wherein the main character performs said presenting the stimulus word and said presenting the next stimulus word aurally and textually, and/or graphically.

51. The memory medium of claim 50, wherein the program instructions are further executable to perform:

indicating if the person selected the letter correctly, wherein said indicating if the person selected the letter correctly comprises one or more of:

presenting a respective sound indicating correctness or incorrectness of the selected letter;

presenting a respective graphical indication of correctness or incorrectness of the selected letter; and awarding points based on the correctness of the selected letter.

52. The memory medium of claim 39, wherein the plurality of letters does not include the removed letter.

* * * * *